(12) United States Patent
Shimura

(10) Patent No.: US 11,545,847 B2
(45) Date of Patent: Jan. 3, 2023

(54) CHARGING DEVICE AND CHARGING METHOD

(71) Applicant: MURATA MANUFACTURING CO., LTD., Kyoto (JP)

(72) Inventor: Jusuke Shimura, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 274 days.

(21) Appl. No.: 16/774,817

(22) Filed: Jan. 28, 2020

(65) Prior Publication Data

US 2020/0177009 A1 Jun. 4, 2020

Related U.S. Application Data

(63) Continuation of application No. PCT/JP2018/027666, filed on Jul. 24, 2018.

(30) Foreign Application Priority Data

Jul. 28, 2017 (JP) .............................. JP2017-146372

(51) Int. Cl.
*H02J 7/00* (2006.01)
*H01M 4/525* (2010.01)
*H01M 10/0525* (2010.01)
*H01M 10/0561* (2010.01)

(52) U.S. Cl.
CPC ......... *H02J 7/00714* (2020.01); *H01M 4/525* (2013.01); *H01M 10/0525* (2013.01); *H01M 10/0561* (2013.01)

(58) Field of Classification Search
CPC ............ H02J 7/00714; H02J 7/35; H02J 7/04; H02J 7/007192; H01M 4/525; H01M 10/0525; H01M 10/0561; H01M 2004/028; H01M 10/44; H01M 10/443; H01M 10/486; Y02E 60/10
See application file for complete search history.

(56) References Cited

U.S. PATENT DOCUMENTS 4,736,150 A * 4/1988 Wagner ................ H02J 7/00711
320/129
2018/0013179 A1* 1/2018 Nomura ................ H01M 10/44

FOREIGN PATENT DOCUMENTS

| CN | 1185860 A * | 6/1998 | ........ H01M 10/0525 |
| JP | H06-113474 A | 4/1994 | |
| JP | H07-296853 A | 11/1995 | |
| JP | 2003-045426 A | 2/2003 | |
| JP | 2003-109672 A | 4/2003 | |

(Continued)

OTHER PUBLICATIONS

International Search Report and Written Opinion issued in connection with PCT/JP2018/027666, dated Aug. 28, 2018 (6 pages).

(Continued)

*Primary Examiner* — Stacy Whitmore
(74) *Attorney, Agent, or Firm* — K&L Gates LLP

(57) ABSTRACT

A charging device for charging a lithium-ion secondary battery based on at least a constant voltage method is provided. In the charging device, before starting charging with a constant voltage or while performing charging with a constant voltage, a first current pulse having a peak current value $i_1$ larger than a charge current value $i_0$ is applied at least once.

13 Claims, 24 Drawing Sheets

(56) References Cited

FOREIGN PATENT DOCUMENTS

JP         2014-236525 A      12/2014
JP          2014236525 A1  *  12/2014

OTHER PUBLICATIONS

Jan N. Reimers and J. R Dahn, "Electrochemical and In Situ X-Ray Diffraction Studies of Lithium Intercalation in LixCoO2", J. Electrochem. Soc. 139(8), 1992, pp. 2091-2097. (7 pages).

* cited by examiner

| CYCLE SYMBOL | PATTERN |
|---|---|
| FIG. 3A $C_{M0}$ | 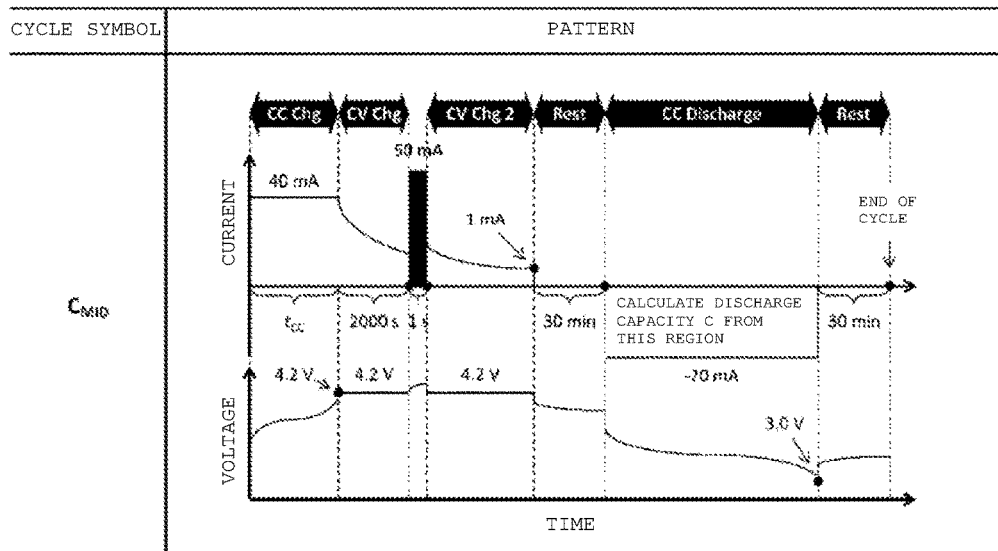 |
| FIG. 3B $C_{0M}$ | 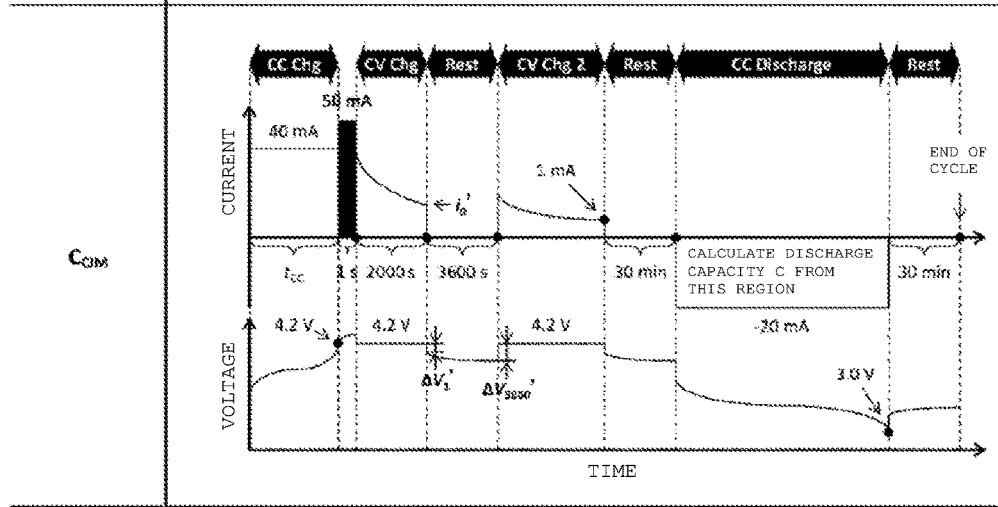 |
| FIG. 3C $N_{0M}$ | 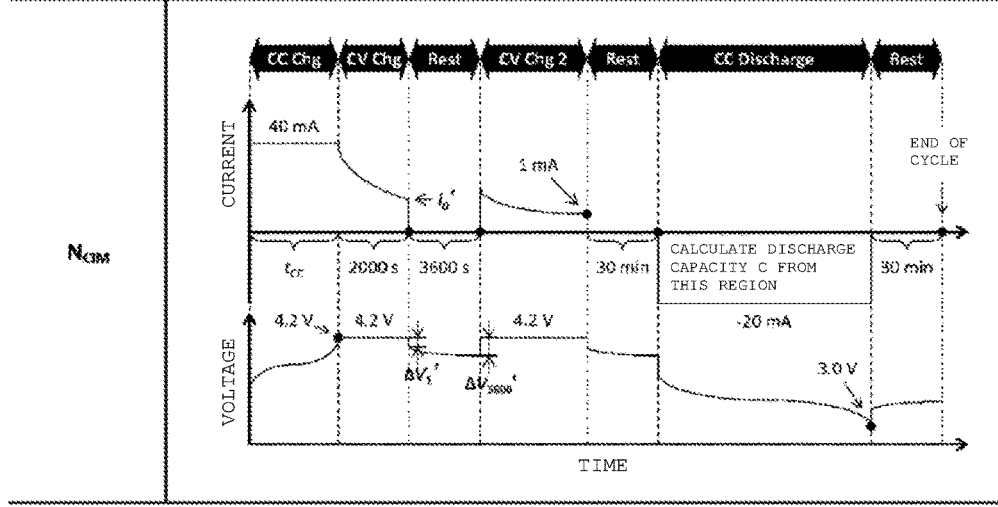 |

CHARGING DEVICE AND CHARGING METHOD

CROSS REFERENCE TO RELATED APPLICATIONS

The present application is a continuation of PCT patent application no. PCT/JP2018/027666, filed on Jul. 24, 2018, which claims priority to Japanese patent application no. JP2017-146372 filed on Jul. 28, 2017, the entire contents of which are being incorporated herein by reference.

BACKGROUND

The present disclosure generally relates to a charging device and a charging method. More specifically, the present disclosure relates to a charging device and a charging method for charging a lithium-ion secondary battery.

With the recent expansion of smartphones, hybrid vehicles, electric vehicles, and the like, demand for quick charging technology for lithium-ion secondary batteries is increasing. There are several quick charging methods.

One of the relatively simple methods is a method of making a large current flow in the initial stage of charging. This method is based on the idea that a charge capacity is secured as much as possible in the initial stage of charging, in which charging can be relatively safely performed, using a property that it is difficult to exceed a predetermined upper limit voltage set in consideration of safety even if the lithium-ion secondary battery is charged with a large current since the voltage of the lithium-ion secondary battery is low in the initial stage of charging.

However, such method of making a large current flow in the initial stage of charging have a disadvantage of reducing the charge/discharge capacity of the lithium-ion secondary battery and shortening the life. In the initial stage of charging, the stage structure of a carbon material (specifically, for example, graphite) used as a negative electrode active material changes quickly in multiple stages from stage 4 to stage 3 and stage 2. Along with such a change, the volume of the active material changes, an internal stress occurs, or an overvoltage changes. It is considered that when the charge current is large, these changes are also abrupt, so that a load is applied to materials forming the electrode, resulting in a decrease in charge/discharge capacity.

SUMMARY

The present disclosure generally relates to a charging device and a charging method. More specifically, the present disclosure relates to a charging device and a charging method for charging a lithium-ion secondary battery.

a conventional method in which the charge current value in the initial stage of charging (SOC, State-Of-Charge value is approximately 0.40 to 0.75) is maintained at 0.4 C or less and the charge current value is increased in the final stage of charging. However, since the voltage of the lithium-ion secondary battery is high in the final stage of charging, the upper limit voltage is easily exceeded, and it is difficult to flow a large current. Therefore, it is difficult to expect a sufficiently speed-up effect with the method of increasing the current value in the final stage of charging. That is, at present, there is a problem in both the initial charging stage and the final charging stage in a case where an attempt is made to increase the charge current for quick charging.

Therefore, it is an object of the present disclosure to provide a charging device and a charging method capable of realizing effective quick charging without increasing a current value in the initial stage of charging.

According to an embodiment of the present disclosure, a charging device is provided. The charging device for charging a lithium-ion secondary battery based on at least a constant voltage method (CV charging method, Constant Voltage charging method), and before starting charging with a constant voltage or while performing charging with a constant voltage, a first current pulse having a peak current value $i_1$ larger than a charge current value $i_0$ is applied at least once.

A charging device according to an embodiment of the present disclosure is provided. The charging device for charging a lithium-ion secondary battery, in which a positive electrode material includes $Li_xCoO_2$, based on at least a constant voltage method, and includes: an x value calculator configured to calculate a value of x during charging of the lithium-ion secondary battery; and a temperature detector configured to measure a temperature of the positive electrode material during charging of the lithium-ion secondary battery, in which a point in time, at which a first current pulse having a peak current value $i_1$ larger than a charge current value $i_0$ immediately before applying the first current pulse is applied at least once, is determined based on the value of x calculated by the x value calculator and a value of the temperature of the positive electrode material measured by the temperature detector.

According to an embodiment of the present disclosure, a charging method is provided. The charging method for charging a lithium-ion secondary battery based on at least a constant voltage method, and includes: before starting charging with a constant voltage or while performing charging with a constant voltage, applying a first current pulse having a peak current value $i_1$ larger than a charge current value $i_0$ at least once.

According to an embodiment of the present disclosure, a charging method is provided. The charging method for charging a lithium-ion secondary battery, in which a positive electrode material includes $Li_xCoO_2$, based on at least a constant voltage method, and includes: calculating a value of x and measuring a temperature of the positive electrode material during charging of the lithium-ion secondary battery; and determining a point in time, at which a first current pulse having a peak current value $i_1$ larger than a charge current value $i_0$ immediately before applying the first current pulse is applied at least once, based on the calculated value of x and a value of the measured temperature of the positive electrode material.

In the charging devices according to the embodiments of the present disclosure and the charging methods according to the embodiments of the present disclosure, the internal impedance of the lithium-ion secondary battery can be reduced by applying a current pulse at least once. As a result, since the charge current value in the constant voltage charging stage can be increased, the lithium-ion secondary battery can be fully charged in a shorter time.

In addition, the effects described in the present specification are merely examples and are not limited, and there may be additional effects.

BRIEF DESCRIPTION OF FIGURES

FIG. 3A (uppermost stage) is a diagram showing the conditions of a charge and discharge cycle test in Example 1, and is a diagram showing the conditions of a charge and discharge cycle test at a cycle symbol $C_{MID}$. FIG. 3B (middle stage) is a diagram showing the conditions of a charge and discharge cycle test in Example 1, and is a diagram showing the conditions of a charge and discharge cycle test at a cycle symbol $C_{CIM}$. FIG. 3C (bottom stage) is a diagram showing the conditions of a charge and discharge cycle test in Example 1, and is a diagram showing the conditions of a charge and discharge cycle test at a cycle symbol $N_{CIM}$.

DETAILED DESCRIPTION

Figure 1:
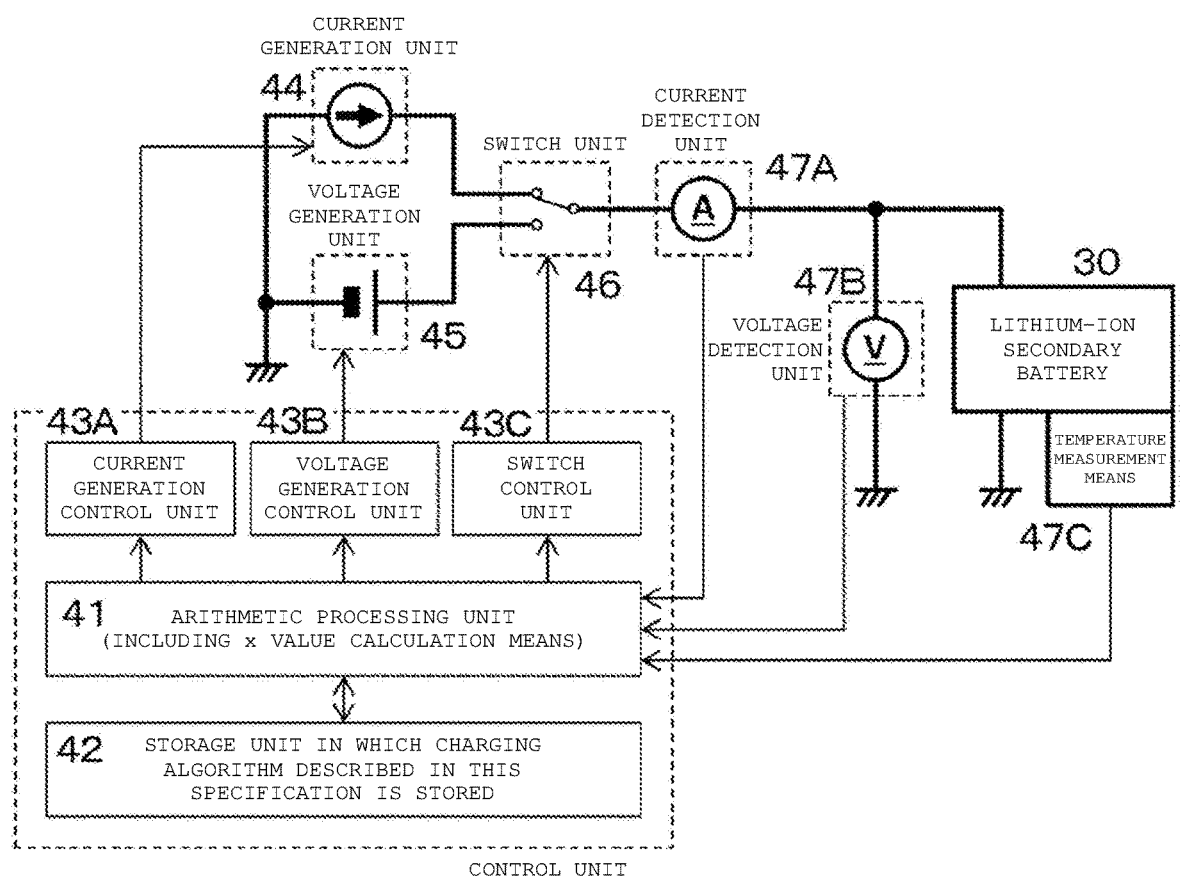
FIG. 1 is a circuit diagram of a charging device of Example 1 according to an embodiment of the present disclosure.

As described herein, the present disclosure will be described based on examples with reference to the drawings, but the present disclosure is not to be considered limited to the examples, and various numerical values and materials in the examples are considered by way of example.

In a charging device according to a first aspect of the present disclosure or a charging method according to the first aspect of the present disclosure (hereinafter, these are collectively referred to as "charging device and the like according to the first aspect of the present disclosure"), a lithium-ion secondary battery can be charged based on a constant current-constant voltage method (CC-CV charging method, Constant Current-Constant Voltage charging method), and after charging is completed with a constant current (after a CC charging method is completed), a current pulse can be applied before charging is started with a constant voltage (charging is started with a CV charging method). In addition, in some cases, a multi-step CC charging method such as that described in Non-Patent Document 1 may be adopted as the CC charging method. That is, the present disclosure is not limited to charging with a single-step constant current.

In the charging device and the like according to the first aspect of the present disclosure including the preferred form described above or a charging device according to a second aspect of the present disclosure or a charging method according to the second aspect of the present disclosure (hereinafter, these are collectively referred to as "charging device and the like according to the second aspect of the present disclosure"), it is preferable to perform charging without interruption.

In the charging device and the like according to the first and second aspects of the present disclosure including the various preferable forms described above can be configured to satisfy $1 < i_1/i_0 \leq 10$.

In addition, in the charging device and the like according to the first and second aspects of the present disclosure including the various preferable forms described above, the time during which a current pulse is applied can be 0.01 seconds or more and 10 seconds or less.

In addition, in the charging device and the like according to the first and second aspects of the present disclosure including the various preferable forms described above, 1 to 10 times can be exemplified as the number of times of application of the current pulse, but the number of times of application of the current pulse is preferably once. In addition, the peak current value $i_1$ may be different for each current pulse, or may be the same.

In addition, in the charging device and the like according to the first and second aspects of the present disclosure including the various preferred forms described above, assuming that the impedance of the lithium-ion secondary battery and the charging end set current value at the time of ending charging with a constant voltage after applying a current pulse are $Z_A$ and $I_{comp-A}$ and the impedance of the lithium-ion secondary battery and the charging end set current value at the time of ending charging with a constant voltage in a case where no current pulse is applied are $Z_B$ and $I_{comp-B}$, $I_{comp-A}$ can be determined by the expression $I_{comp-A} = (Z_B/Z_A) \times I_{comp-B}$. A charge cut current value in the specification of the lithium-ion secondary battery may be used as it is as the value of $I_{comp-B}$, and the value of $Z_A$ and the value of $Z_B$ may be determined in advance by performing a test, such as a current interrupt method described later.

Even if the impedance $Z_A$ of the lithium-ion secondary battery at the time of ending charging with a constant voltage after applying a current pulse and the impedance $Z_B$ of the lithium-ion secondary battery at the time of ending charging with a constant voltage in a case where no current pulse is applied are not determined in advance by testing or the like, $I_{comp-A}$ may be determined in the range of $I_{comp-B} < I_{comp-A} \leq 5 \times I_{comp-B}$ since the value of $Z_B/Z_A$ is generally in the range of more than 1 and 5 or less.

Alternatively, assuming that the charging end set time at the time of ending charging with a constant voltage after applying a current pulse is $t_{comp-A}$ and the charging end set time at the time of ending charging with a constant voltage in a case where no current pulse is applied is $t_{comp-B}$, the value of $t_{comp-A}$ may be determined in the range of $0.7 \times t_{comp-B} \leq t_{comp-A} < t_{comp-B}$ since the time reduction due to the application of the current pulse is about 30% at most. In addition, a charge cut time in the specification of the lithium-ion secondary battery may be used as it is as the value of $t_{comp-B}$.

In addition, in the charging device and the like according to the first aspect of the present disclosure including the various preferable forms and configurations described above, the lithium-ion secondary battery contains a positive electrode material whose crystal structure is different between when the lithium-ion secondary battery is fully charged and when the lithium-ion secondary battery is fully discharged, and the positive electrode material can be configured such that the change in crystal structure according to charging and discharging is reversible (phase transition according to charging and discharging is reversible). Alternatively, the positive electrode material of the lithium-ion secondary battery can be configured to contain $Li_xCoO_2$, or can be configured to contain $Li_xNiO_2$. In addition, in a case where $Li_xCoO_2$ is contained in the positive electrode material of the lithium-ion secondary battery, $LiCoO_2$ (crystal structure: hexagonal system. All cobalt atoms are trivalent) is present theoretically at the time of full discharge, and $Li_{0.5}CoO_2$ (crystal structure: monoclinic system. Trivalent cobalt atom and tetravalent cobalt atom are mixed) is present theoretically at the time of full charge.

In the lithium-ion secondary battery, at the time of charging, for example, lithium ions are released from the positive electrode material (positive electrode active material) and occluded in the negative electrode active material through a non-aqueous electrolyte solution. In addition, at the time of discharging, for example, lithium ions are released from the negative electrode active material and occluded in the positive electrode material (positive electrode active material) through a non-aqueous electrolyte solution.

In the lithium-ion secondary battery, members configuring the lithium-ion secondary battery are housed in an electrode structure housing member (battery can). Examples of the member configuring the lithium-ion secondary battery include a positive electrode member, a negative electrode member, an electrolyte, and a separator. For example, the positive electrode member is formed of a positive electrode current collector and a positive electrode active material. For example, the negative electrode member is formed of a negative electrode current collector and a negative electrode active material. The positive electrode active material corresponds to a positive electrode material. In addition, a positive electrode lead portion is attached to the positive electrode current collector, and a negative electrode lead portion is attached to the negative electrode current collector.

In the lithium-ion secondary battery, the electrode structure configured by the positive electrode member, the separator, and the negative electrode member may be in a state in which the positive electrode member, the separator, the negative electrode member, and the separator are wound, or may be in a state in which the positive electrode member, the separator, the negative electrode member, and the separator are stacked. The electrode structure or the wound electrode structure can be housed in the electrode structure housing member in a wound state, and the electrode structure can be housed in the electrode structure housing member in a stacked state. In these cases, the outer shape of the electrode structure housing member can be a cylindrical shape or a prismatic shape (flat plate type). As the shape or form of the lithium-ion secondary battery (hereinafter, may be simply referred to as a "secondary battery"), coin type, button type, disk type, flat plate type, prismatic type, cylindrical type, laminate type (laminate film type), and the like can be mentioned.

Examples of the electrode structure housing member (battery can) configuring the cylindrical secondary battery include iron (Fe), nickel (Ni), aluminum (Al), titanium (Ti), or an alloy thereof, and stainless steel (SUS). The battery can may be plated with, for example, nickel in order to prevent electrochemical corrosion due to charging and discharging of the secondary battery. An exterior member in a laminate type (laminate film type) secondary battery preferably has a laminate structure of a plastic material layer (fusion layer), a metal layer, and a plastic material layer (surface protection layer), that is, a laminate film. In the case of a laminate film type secondary battery, for example, the exterior member is folded so that the fusion layers face each other with the electrode structure interposed therebetween, and then the outer peripheral edge portions of the fusion layers are fused. However, the exterior member may be formed by bonding two laminate films to each other with an adhesive or the like interposed therebetween. The fusion layer is formed of, for example, an olefin resin film that is a polymer such as polyethylene, polypropylene, modified polyethylene, and/or modified polypropylene. The metal layer is formed of, for example, aluminum foil, stainless steel foil, or nickel foil. The surface protection layer is formed of, for example, nylon and/or polyethylene terephthalate. Among these, the exterior member is preferably an aluminum laminate film in which a polyethylene film, an aluminum foil, and a nylon film are laminated in this order. However, the exterior member may be a laminate film having another laminate structure, may be a polymer film such as polypropylene, or may be a metal film.

Details of the positive electrode member, the negative electrode member, the positive electrode active material, the negative electrode active material, the binder, the conductive agent, the separator, and the non-aqueous electrolyte solution will be described later.

In the present disclosure, there may be one secondary battery or a plurality of secondary batteries. In the latter case, a plurality of secondary batteries may be connected in series or may be connected in parallel. In addition, in the latter case, a plurality of sets of secondary batteries connected in series may be connected in parallel to form an assembled battery, or a plurality of sets of secondary batteries connected in parallel may be connected in series to form an assembled battery.

The secondary battery in the present disclosure can be used as a driving power source or an auxiliary power source for notebook personal computers, battery packs used in personal computers as removable power supplies, various display devices, personal digital assistants (PDAs), mobile phones, smartphones, master units and slave units of cordless phones, video movies (video cameras or camcorders), digital still cameras, electronic papers such as electronic books and electronic newspapers, electronic dictionaries, music players, portable music players, radios, portable radios, headphones, headphone stereos, game consoles, wearable devices (for example, smart watches, wristbands, smart eyeglasses, medical devices, and healthcare products), navigation systems, memory cards, cardiac pacemakers, hearing aids, electric tools, electric shavers, refrigerators, air conditioners, television receivers, stereos, water heaters, microwave ovens, dishwashers, washing machines, dryers, lighting devices including room lights, various electric devices (including portable electronic devices), toys, medical devices, robots, IoT devices or IoT terminals, road conditioners, traffic lights, railway vehicles, golf carts, electric carts, electric vehicles (including hybrid vehicles), and the like. In addition, the secondary battery in the present disclosure can be mounted in a power source for power storage for a building, such as a house, or a power generation facility, or can be used to supply power to these. In the electric vehicle, a conversion device that converts power into driving force by supplying power is generally a motor. Examples of a control device (control unit) that performs information processing relevant to vehicle control include a control device that performs secondary battery remaining amount display based on information relevant to the remaining amount of the secondary battery. In addition, the secondary battery can also be used in a power storage device in a so-called smart grid. Such a power storage device can not only supply power but also store power by receiving power supplied from another power source. As other power sources, for example, thermal power generation, nuclear power generation, hydroelectric power generation, solar cells, wind power generation, geothermal power generation, and/or fuel cells (including biofuel cells) can be used.

Control means in a battery pack having a secondary battery and control means (control unit) that performs control relevant to the secondary battery can be configured to include each of the charging devices according to the first and second aspects of the present disclosure. In addition, a secondary battery in an electronic device that receives power supplied from the secondary battery can be configured to include each of the charging devices according to the first and second aspects of the present disclosure.

A control device in an electric vehicle having a conversion device that receives power supplied from the secondary battery and converts the power into the driving force of the vehicle and a control device (control unit) that performs information processing relevant to vehicle control based on information regarding the secondary battery can be configured to include each of the charging devices according to the first and second aspects of the present disclosure. In the electric vehicle, typically, the conversion device receives power supplied from the secondary battery and drives a motor to generate a driving force. In order to drive the motor, regenerative energy can also be used. In addition, the control device performs information processing relevant to vehicle control based on the remaining amount of the secondary battery, for example. Examples of the electric vehicle include not only an electric vehicle, an electric motorcycle, an electric bicycle, and a railway vehicle but also a so-called hybrid vehicle.

The secondary battery can also be used in a power storage device in a so-called smart grid. Such a power storage device can not only supply power but also store power by receiving power supplied from another power source. The power storage device can be configured to include each of the charging devices according to the first and second aspects of the present disclosure. As other power sources, for example, thermal power generation, nuclear power generation, hydroelectric power generation, solar cells, wind power generation, geothermal power generation, and/or fuel cells (including biofuel cells) can be used.

A power storage system (or a power supply system) configured to receive power supplied from a secondary battery and/or to supply power from a power source to the secondary battery can be configured to include a secondary battery and each of the charging devices according to the first and second aspects of the present disclosure. The power storage system may be any power storage system as long as the power storage system uses power approximately, and includes a simple power device. The power storage system includes, for example, a smart grid, a home energy management system (HEMS), a vehicle, and the like, and can also store electricity.

A power source for power storage configured to have a secondary battery and be connected to an electronic device to which power is supplied can be configured to include a secondary battery and each of the charging devices according to the first and second aspects of the present disclosure. The power source for power storage can be used basically for any power storage system, power supply system, or power device regardless of the use of the power source for power storage. For example, the power source for power storage can be used for a smart grid.

Example 1

Example 1 relates to the charging device according to the first aspect of the present disclosure and the charging method according to the first aspect of the present disclosure.

The charging device of Example 1 is a charging device that charges a lithium-ion secondary battery based on at least a constant voltage method (CV charging method). In addition, the charging method of Example 1 is a charging method for charging a lithium-ion secondary battery based on at least a constant voltage method.

Figure 24:
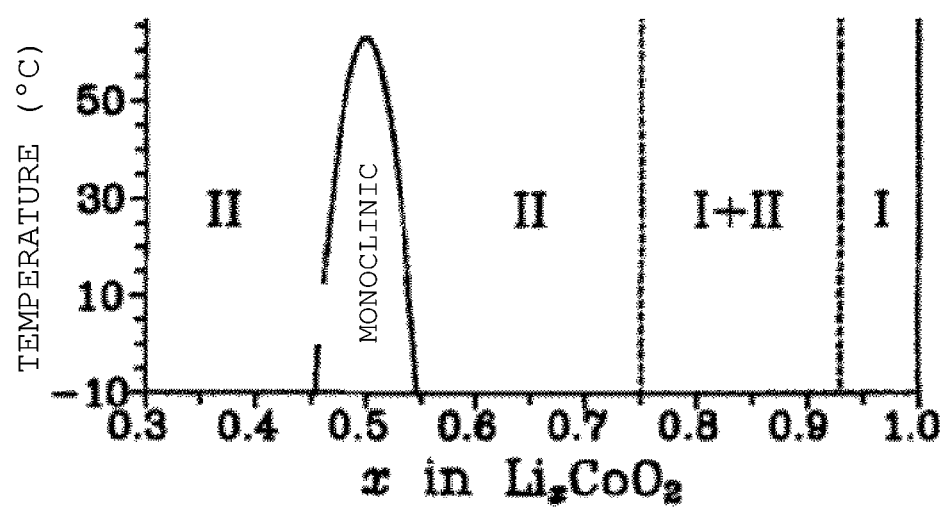
FIG. 24 is a diagram showing a relationship among the value of x, a temperature, and a crystal structure in $Li_xCoO_2$ according to an embodiment of the present disclosure.

In Example 1, the lithium-ion secondary battery contains a positive electrode material whose crystal structure is different between when the lithium-ion secondary battery is fully charged and when the lithium-ion secondary battery is fully discharged. The positive electrode material has a reversible change in crystal structure according to charging and discharging. That is, the phase transition according to charging and discharging is reversible. Alternatively, the positive electrode material of the lithium-ion secondary battery of Example 1 contains $Li_xCoO_2$. Incidentally, the relationship among the value of x, temperature, crystal structure in $Li_xCoO_2$ is shown in FIG. 24. When the value of x is about 0.45 or less or about 0.55 or more, the crystal structure of $Li_xCoO_2$ is hexagonal. When the value of x is about 0.45 to about 0.55, the crystal structure of $Li_xCoO_2$ is monoclinic. That is, the crystal structure of $Li_xCoO_2$ is hexagonal at the time of full discharge and monoclinic at the time of full charge, so that the change in crystal structure according to charging and discharging is reversible. In addition, in FIG. 24, "I" means "hexagonal system I", "II" means "hexagonal system II", and "I+II" means that "hexagonal system I" and "hexagonal system II" are mixed.

FIG. 1 shows a circuit diagram of the charging device of Example 1. The charging device is configured to include an arithmetic processing unit 41 including x value calculation means (calculator) and an MPU and a CPU, a storage unit (EEPROM or the like that is a non-volatile storage) 42 that stores algorithms of the charging methods according to the first and second aspects of the present disclosure, a current generation unit 44, a current generation control unit 43A, a voltage generation unit 45, a voltage generation control unit 43B, a switch unit 46 that is a semiconductor switch such as a field effect transistor (MOSFET) using metal oxide semiconductor, a switch control unit 43C, a current detection unit 47A, a voltage detection unit 47B, and temperature measurement means (temperature detector) 47C. Here, the current generation unit 44 generates a current to charge a lithium-ion secondary battery 30 based on a constant current method (CC charging method), and generates a current pulse. The current generation control unit 43A controls the operation of the current generation unit 44 under the control of the arithmetic processing unit 41. The voltage generation unit 45 generates a voltage for charging the lithium-ion secondary battery 30 based on a constant voltage method (CV charging method). The voltage generation control unit 43B controls the operation of the voltage generation unit 45 under the control of the arithmetic processing unit 41. The switch unit 46 performs switching between an operation for making a current flow through the lithium-ion secondary battery 30 for charging based on a constant current method (CC charging method) and an operation for applying a voltage to the lithium-ion secondary battery 30 for charging based on the constant voltage method (CV charging method) without interruption. The switch control unit 43C controls the operation of the switch unit 46 under the control of the arithmetic processing unit 41. The current detection unit 47A detects the current flowing through the lithium-ion secondary battery 30, and transmits the detection result to the arithmetic processing unit 41. The voltage detection unit 47B detects the voltage applied to the lithium-ion secondary battery 30, and transmits the detection result to the arithmetic processing unit 41. The temperature measurement means (temperature detection unit) 47C measures the temperature of a positive electrode member [in practice, the temperature of the lithium-ion secondary battery 30 (for example, the surface temperature of the lithium-ion secondary battery 30)], and transmits the detection result to the arithmetic processing unit 41. The x value calculator includes a processor or a CPU or the like.

As will be described in detail below, in the charging device of Example 1, before starting charging with a constant voltage or while performing charging with a constant voltage, a current pulse having a peak current value $i_1$ larger than a charge current value $i_0$ at that point in time is applied at least once. In addition, in the charging method of Example 1, before starting charging with a constant voltage or while performing charging with a constant voltage, a current pulse having a peak current value $i_1$ larger than a charge current value $i_0$ at that point in time is applied at least once. Specifically, a lithium-ion secondary battery is charged based on a constant current-constant voltage method (CC-CV charging method), and after charging with a constant current is completed (after the CC charging method is completed), a current pulse is applied before starting charging with a constant voltage (starting charging with the CV charging method). In addition, charging is performed without interruption.

Figure 13:
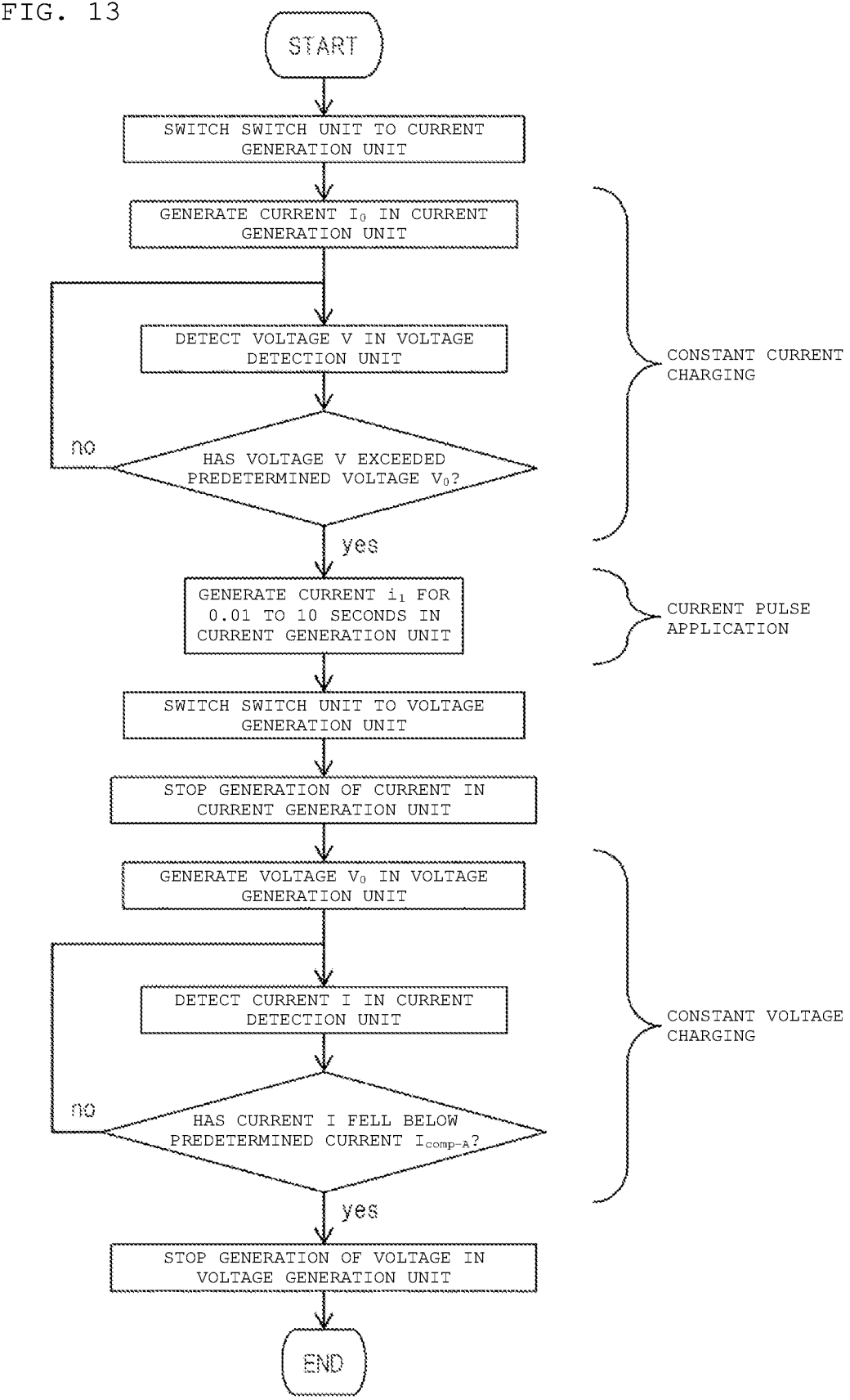
FIG. 13 is a flowchart of a charging method of Example 1 according to an embodiment of the present disclosure.

That is, as shown in the flowchart of FIG. 13, first, constant current charging (CC charging) is started. That is, under the control of the arithmetic processing unit 41 and the current generation control unit 43A, the current generation unit 44 generates a charge current having a predetermined value $I_0$, and the charge current starts to flow through the lithium-ion secondary battery 30. The voltage V of the lithium-ion secondary battery 30 rises. The voltage V of the lithium-ion secondary battery 30 is detected by the voltage detection unit 47B, and the detection result is transmitted to the arithmetic processing unit 41. In addition, the charge current $I_0$ ($=i_0$) flowing through the lithium-ion secondary battery 30 is detected by the current detection unit 47A, and the detection result is transmitted to the arithmetic processing unit 41. When the voltage of the lithium-ion secondary battery 30 reaches a predetermined value $V_0$ (for example, 4.2 V), the current generation unit 44 applies a current pulse (peak current value $i_1$, application time $t_{pulse}$) to the lithium-ion secondary battery 30 under the control of the arithmetic processing unit 41 and the current generation control unit 43A. Then, constant voltage charging (CV charging) is started. That is, the switch unit 46 performs switching instantaneously under the control of the arithmetic processing unit 41 and the switch control unit 43C. At the same time, under the control of the arithmetic processing unit 41 and the voltage generation control unit 43B, the voltage generation unit 45 generates a charge voltage $V_0$ having a predetermined value and applies the charge voltage $V_0$ to the lithium-ion secondary battery 30. The voltage ($=V_0$) of the lithium-ion secondary battery 30 is detected by the voltage detection unit 47B, and the detection result is transmitted to the arithmetic processing unit 41. In addition, the current flowing through the lithium-ion secondary battery 30 is detected by the current detection unit 47A, and the detection result is transmitted to the arithmetic processing unit 41. When the value of the charge current flowing through the lithium-ion secondary battery 30 decreases to a predetermined value ($I_{comp-A}$), the charging of the lithium-ion secondary battery is ended.

Figure 14:
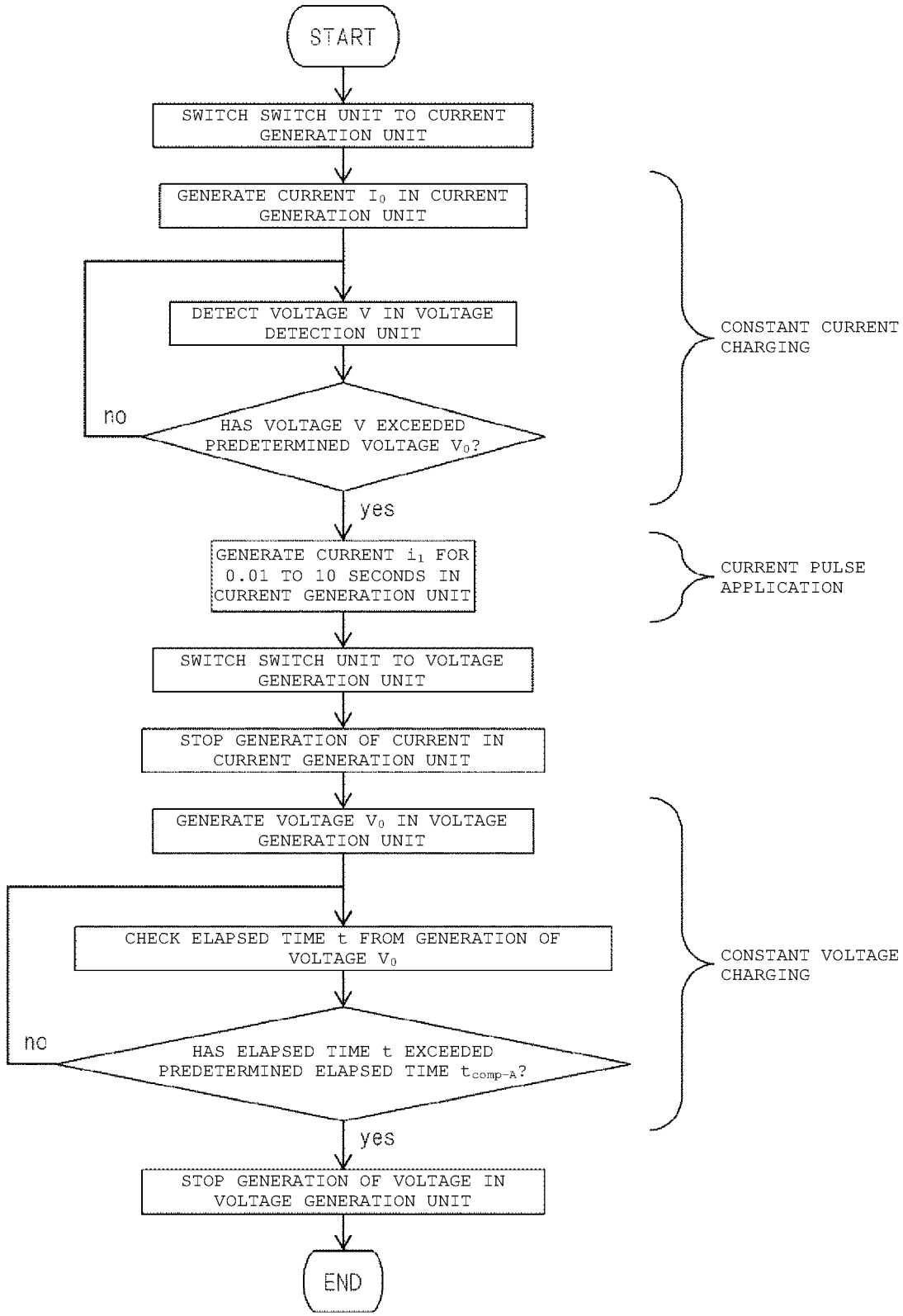
FIG. 14 is a flowchart of a modification example of the charging method of Example 1 according to an embodiment of the present disclosure.

Alternatively, as shown in the flowchart of FIG. 14, after the CV charging is started, when the CV charge time exceeds the charging end set time $t_{comp-A}$, the charging of the lithium-ion secondary battery is ended.

In Example 1, for the commercially available lithium-ion secondary battery LIR2023 (nominal capacity 40 mAh), a charging experiment based on the charging method according to the first aspect of the present disclosure, in which CC-CV charging (charging method in which constant current charging is performed first and then constant voltage charging was performed) was modified, was performed. Specifically, a current pulse was inserted at the time of switching from the constant current charging stage to the constant voltage charging stage. That is, at the time of switching from the constant current charging stage of $i_0=1C$ (40 mA) to the constant voltage charging stage, a current pulse of $i_1=1.2C$ (50 mA) was applied for $t_{pulse}=1$ second. As a result, the time required for charging in the constant voltage charging stage (hereinafter, referred to as "CV charge time") was shortened by 9.6 minutes (576 seconds), as will be described later, compared with a case where no current pulse was applied.

Incidentally, inserting a current pulse after the end of the constant current charging stage means that the battery is charged excessively by the amount of the current pulse. Therefore, as a matter of course, the CV charge time is shortened by the amount of the current pulse. However, the charge capacity of the inserted current pulse is 50 mA×1 second, 50 mAs. When the charge current value falls below 1 milliampere, the constant voltage charging stage is set to end. Therefore, the shortening of the CV charge time corresponding to 50 mAs is at most about 50 seconds. That is, the shortening of the CV charge time of 9.6 minutes cannot be explained only by the charge capacity of the inserted current pulse.

When the waveform of the charge current in the constant voltage charging stage was observed in detail, it was confirmed that the charge current value increased due to the insertion of the current pulse. It is considered that the increase in the charge current value during the constant voltage charging is caused by a decrease in the internal impedance of the lithium-ion secondary battery, as will be described in detail later. That is, it is considered that the internal impedance of the lithium-ion secondary battery is reduced by inserting a current pulse at the time of switching from the constant current charging stage to the constant voltage charging stage and accordingly the charge current value in the constant voltage charging stage can be increased, and as a result, the lithium-ion secondary battery can be fully charged in a shorter time.

Hereinafter, the charging method of Example 1 will be described in detail.

In Example 1, a source measure unit uniquely designed as a charging and discharging test device was used. In addition, the specifications of the source measure unit are shown in Table 1. An oscilloscope was used to observe the transient response of voltage and current, and a data logger was used to observe the slower behavior.

COMSOL Multiphysics 5.2 that was finite element method simulation software was used for the charging and discharging simulation. As a simulation model, "Newman model of one-dimensional and isothermal model" (refer to M, Doyle, J. Newman, A. S. Gozdz, C. N. Schmutz and J.-M. Tarascon, J. Electrochem. Soc. 143(6), 1996, 1890-1903) attached to "Battery & Fuel Cell Module" of this software was used.

TABLE 1

Main specifications of source measure unit

Figure 2:
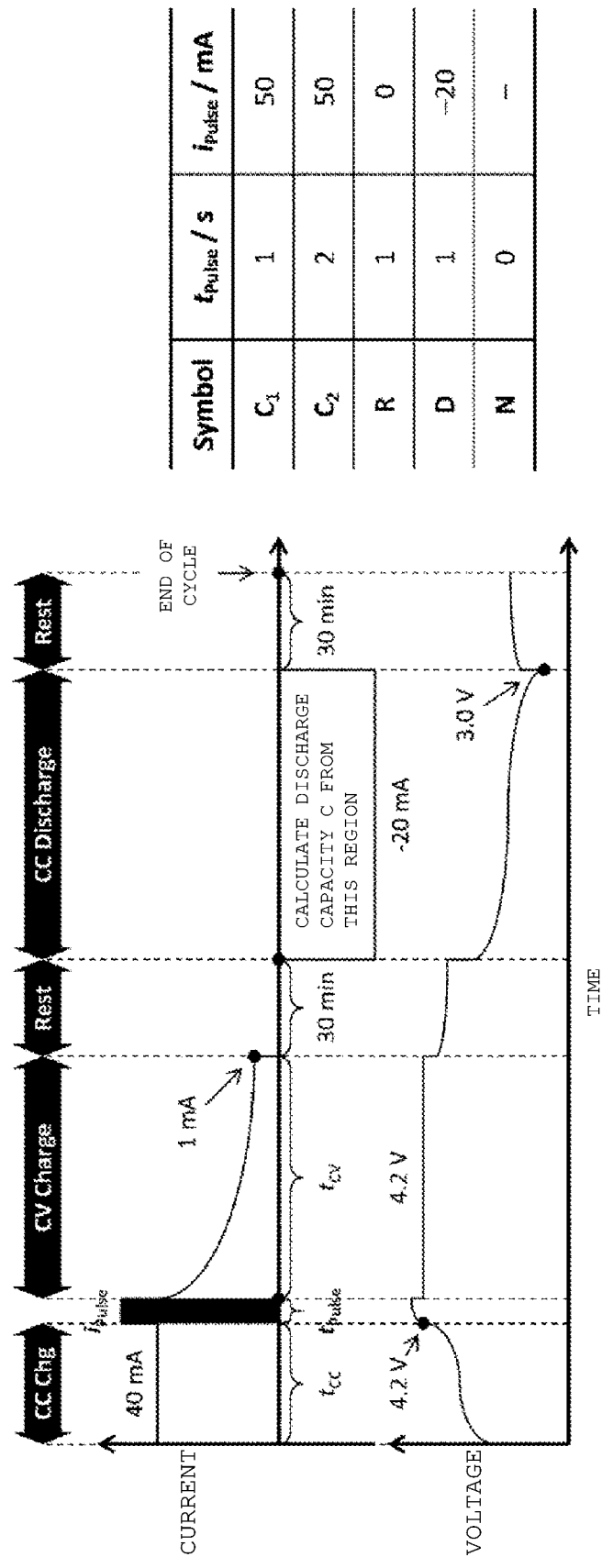
FIG. 2 is a diagram showing the conditions of a charge and discharge cycle test in Example 1, and is a diagram showing the conditions of a charge and discharge cycle test at cycle symbols $C_1$, $C_2$, R, D, and N.

Voltage range
   −2.5 V to 4.9 V
   Measurement resolution: 3.5 µV
   Setting resolution: 120 µV
Current range
   −51 mA to 51 mA
   Measurement resolution: 49 nA
   Setting resolution: 1.6 µA
Time resolution
   50 ms
Operation mode
   Constant current mode (CC)/constant voltage mode (CV)/open mode The conditions of the charge and discharge cycle test are shown in FIGS. 2, 3A, 3B, and 3C. A current pulse having an application time $t_{pulse}$ and a current $i_{pulse}$ was inserted between CC charging and CV charging. Cycle symbols are shown in Table 2 and Table 3 below. In addition, FIG. 2 is a diagram showing the conditions of the charge and discharge cycle test at cycle symbols $C_1$, $C_2$, R, D, and N. In addition, FIG. 3A is a diagram showing the conditions of the charge and discharge cycle test at a cycle symbol $C_{MID}$, FIG. 3B is a diagram showing the conditions of the charge and discharge cycle test at a cycle symbol $C_{CIM}$, and FIG. 3C is a diagram showing the conditions of the charge and discharge cycle test at a cycle symbol $N_{CIM}$. In FIGS. 2, 3A, 3B, and 3C, "CC Chg" means CC charging, "CV Chg" and "CV Charge" means CV charging, "Rest" means the pause of charging and discharging, and "CC Discharge" means discharging at a constant current.

TABLE 2

| Cycle symbol | | |
|---|---|---|
| | $t_{pulse}$ | $i_{pulse}$ |
| $C_1$ | 1 second | 50 mA |
| $C_2$ | 2 seconds | 50 mA |
| R | 1 second | 0 mA |
| D | 1 second | −20 mA |
| N | None | None |

TABLE 3

Cycle symbol (continued)

Cycle symbol $C_{MID}$: After CC charging is completed, a current pulse of 50 mA × 1 second is inserted 2000 seconds after starting CV charging.
Cycle symbol $C_{CIM}$: After CC charging is completed, a current pulse of 50 mA × 1 second is inserted before starting CV charging. Then, 2000 seconds after starting CV charging, an open state occurs first, and after 3600 seconds, CV charging is resumed.
Cycle symbol $N_{CIM}$: Charging similar to the cycle symbol $C_{CIM}$ except that no current pulse is applied is performed.

The difference between the cycle symbols "$C_1$" and "$C_2$" is a difference in current pulse application time such that $t_{pulse}=1$ second for $C_1$ and $t_{pulse}=2$ seconds for $C_2$ although both current pulses to be inserted are charge pulses. The cycle symbol "R" means that the flow of the charge current is interrupted for 1 second. In the cycle symbol "D", the direction of the current of the current pulse is reversed, which is a discharge pulse. The cycle symbol "N" means a normal charge and discharge cycle in which no current pulse is inserted.

The charge and discharge cycle test was performed with the charge and discharge cycles of the various cycle symbols described above as combinations as follows.

Experiment-1: Charge and discharge cycle test using {R-N-D-N-R-N-$C_1$-N} as a repetition unit
Experiment-2: Charge and discharge cycle test using {$C_1$-N-$C_2$-N} as a repetition unit
Experiment-3: Charge and discharge cycle test using {$C_1$-N-$C_{MID}$-N} as a repetition unit
Experiment-4: Simulation of charge and discharge cycle test using {$C_1$-N} as a repetition unit
Experiment-5: Charge and discharge cycle test using {$C_{CIM}$-$N_{CIM}$} as a repetition unit Here, "Experiment-1" is an experiment for evaluating the influence of the insertion itself of a current pulse and the current value dependency of the current pulse. "Experiment-2" is an experiment for evaluating the application time dependency of a current pulse. "Experiment-3" is an experiment in which the timing of inserting a current pulse is changed. "Experiment-5" is an experiment in which a charge current is interrupted during CV charging. "Experiment-4" is a simulation of a charge and discharge cycle test, and is an experiment for qualitatively examining whether or not the effect of inserting a current pulse is a physical phenomenon included in the Newman model of the one-dimensional and isothermal model.

In the charge and discharge cycle at the cycle symbol $C_{CIM}$ and the cycle symbol $N_{CIM}$, current $i_0'$ and voltage $V_0'$ immediately before the open state, voltage $V_1'$ after one second from the open state, and voltage $V_{3600}'$ after 3600 seconds from the open state were measured to calculate voltage change amounts $\Delta V_1'$ ($=V_1'-V_0'$) and $\Delta V_{3600}'$ ($=V_{3600}'-V_0'$). In addition, in Experiment-1, Experiment-2, Experiment-3, and Experiment-5, an actual lithium-ion secondary battery was used. However, in Experiment-4, a finite element method simulation using COMSOL Multiphysics 5.2 described above was performed.

[Experiment-1]

Figure 4A:
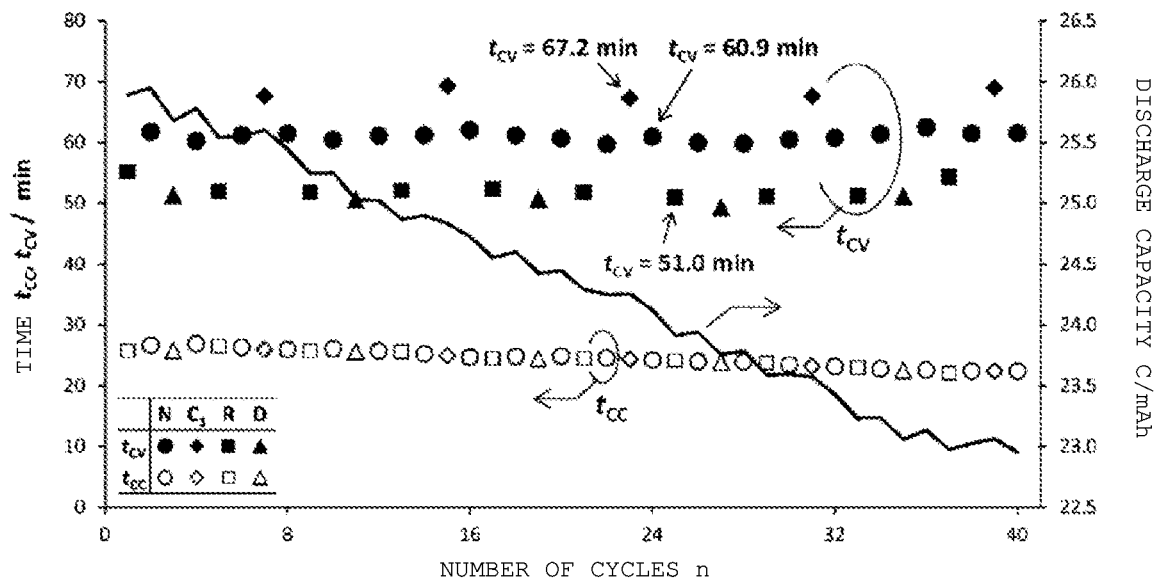
FIG. 4A is a graph showing a result of Experiment-1 in Example 1 according to an embodiment of the present disclosure.

The result of Experiment-1 is shown in FIG. 4A. The discharge capacity C of the lithium-ion secondary battery tended to monotonously decrease with respect to the number of charge and discharge cycles n. A CC charge time $t_{CC}$ also showed a tendency to decrease gradually monotonously with respect to the number of charge and discharge cycles n. The dependency of the CC charge time $t_{CC}$ on the type of charge and discharge cycle (N, $C_1$, R, D) was hardly observed. On the other hand, a CV charge time $t_{CV}$ showed high dependency on the type of cycle. Specifically, compared with a case where no current pulse was applied (refer to cycle symbol N), the CV charge time increased in a case where the current pulse was in a charge direction (refer to cycle symbol $C_1$), and the CV charge time decreased in a case where the current pulse was in a pause (refer to cycle symbol R) or discharge direction (refer to cycle symbol D).

Figure 4B:
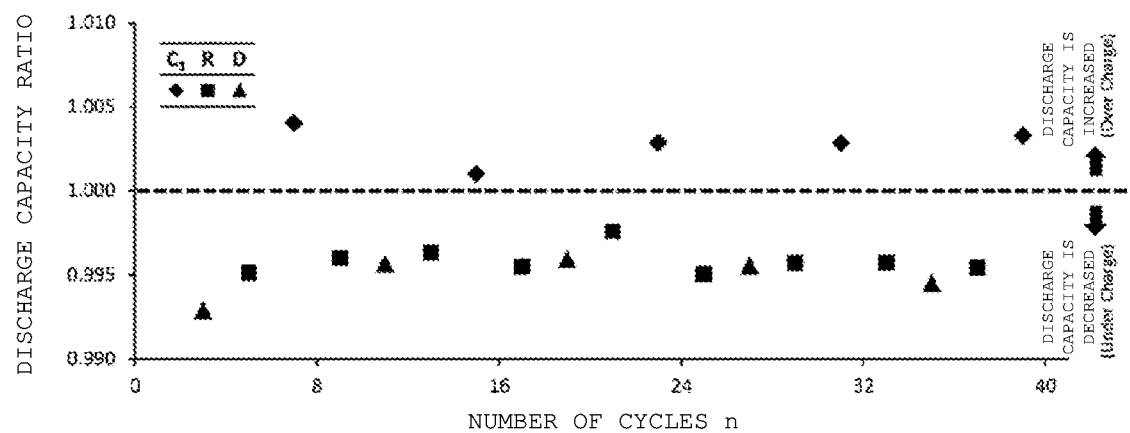
FIG. 4B is a diagram showing a result obtained by comparing the discharge capacity $C_n$ in the n-th cycle with the average value of the discharge capacities $C_{n-1}$ and $C_{n+1}$ in cycles immediately before and after the n-th cycle in Experiment-1 in Example 1 according to an embodiment of the present disclosure.

Next, FIG. 4B shows a result (discharge capacity ratio) obtained by comparing the discharge capacity $C_n$ in the n-th cycle with the average value of the discharge capacities $C_{n-1}$ and $C_{n+1}$ in cycles immediately before and after the n-th cycle. In addition, the vertical axis in FIGS. 4B and 6B indicates a discharge capacity ratio, and the discharge capacity ratio is expressed by the following equation. In a case where the current pulse was in the charge direction (refer to cycle symbol $C_1$), the discharge capacity was larger than that in a case where no current pulse was applied (refer to cycle symbol N). On the other hand, in a case where the current pulse was in the pause (refer to cycle symbol R) or discharge direction (refer to cycle symbol D), the discharge capacity was reduced.

Discharge capacity ratio$=2 \cdot C_n/(C_{n-1}+C_{n+1})$

Figure 5A:
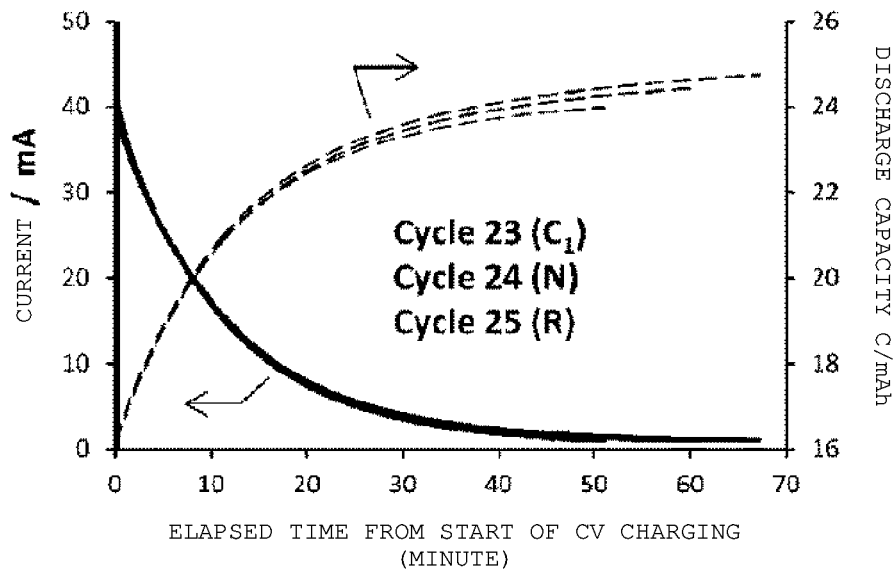
FIG. 5A is a diagram showing a result of analysis focusing on the CV charging part of the charge and discharge cycle, 23rd cycle, 24th cycle, and 25th cycle in Experiment-1 in Example 1 according to an embodiment of the present disclosure.
Figure 5B:
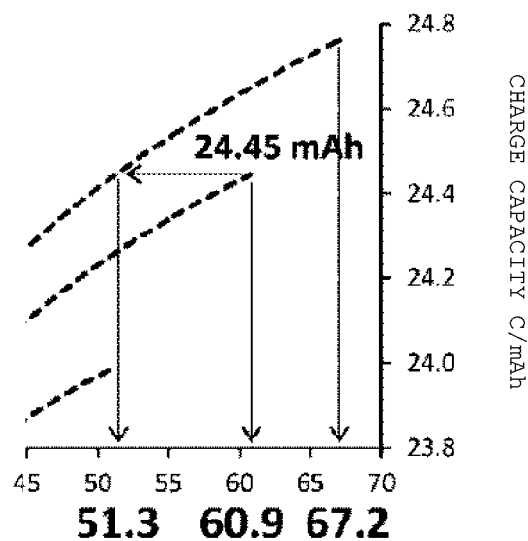
FIG. 5B is a partially enlarged view of FIG. 5A.

From FIG. 4A and FIG. 4B, it was found that not only the CV charge time but also the discharge capacity was increased by applying a current pulse between the CC charging and the CV charging. The fact that the discharge capacity was greater than when no current pulse was applied (refer to cycle symbol N) means that an overcharging state occurred due to the application of the current pulse. Therefore, an analysis on the CV charge time in a case where charging was stopped when the charge capacity reached the same charge capacity as when no current pulse was applied (refer to cycle symbol N) so that overcharge did not occur was performed focusing on the CV charging part of the 23rd, 24th and 25th cycles (refer to FIGS. 5A and 5B). In addition, FIG. 5B is an enlarged view of a part of FIG. 5A. As a result, it was found that the CV charge time was 67.2 minutes in a case where the current pulse was in the charge direction (refer to cycle symbol $C_1$) and the CV charge time was 51.3 minutes in a case where CV charging was stopped when the same charge capacity (24.45 mAh) as when no current pulse was applied (refer to cycle symbol N) was obtained. This means that the CV charge time could be 9.6 minutes shorter than 60.9 minutes that was the CV charge time when no current pulse was applied (refer to cycle symbol N), that is, the CV charge time of 9.6 minutes could be shortened by applying a current pulse of 1 second.

[Experiment-2]

Figure 6A:
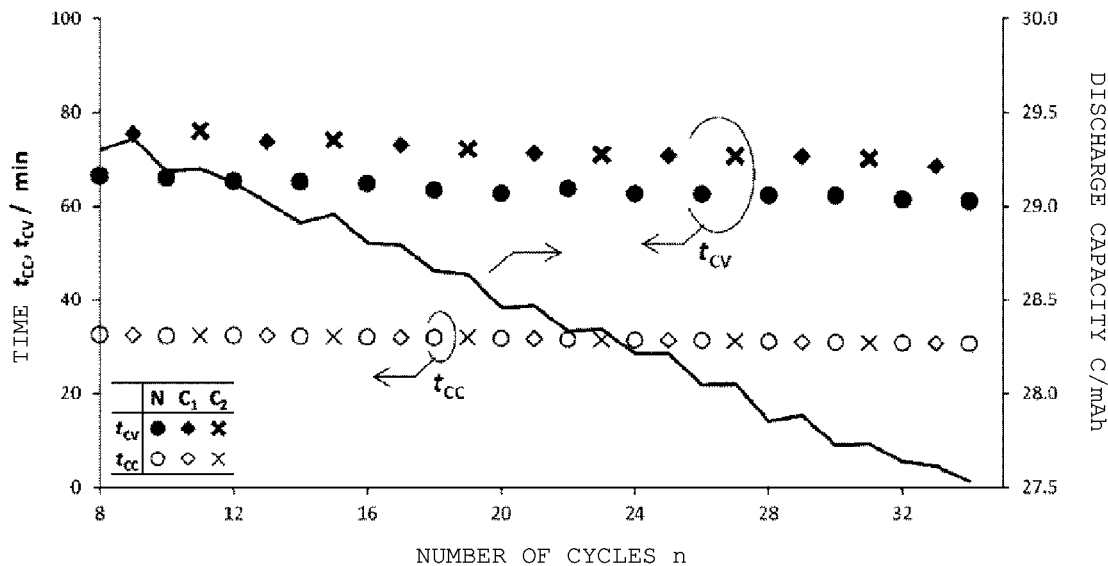
FIG. 6A is a graph showing a result of Experiment-2 in Example 1 according to an embodiment of the present disclosure.
Figure 6B:
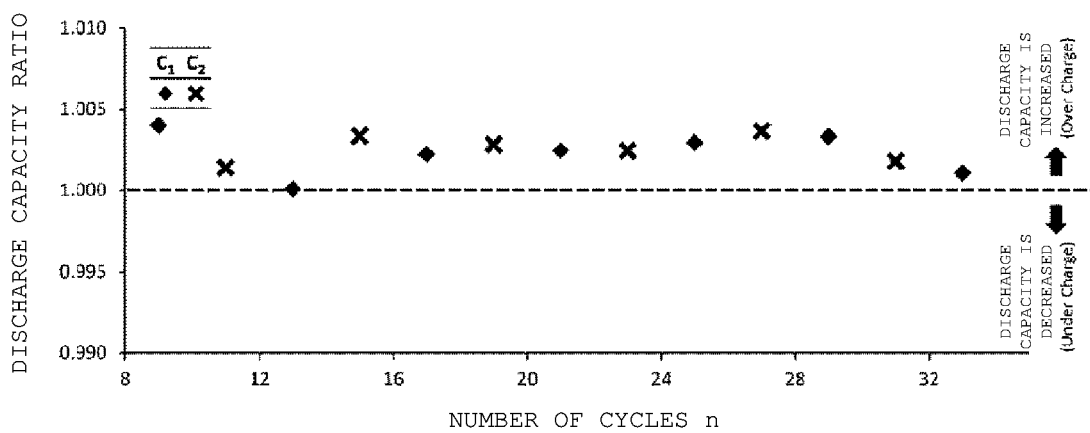
FIG. 6B is a diagram showing a result obtained by comparing the discharge capacity $C_n$ in the n-th cycle with the average value of the discharge capacities $C_{n-1}$ and $C_{n+1}$ in cycles immediately before and after the n-th cycle in Experiment-2 in Example 1 according to an embodiment of the present disclosure.

Next, Experiment-2 was performed to examine the dependency of the current pulse application time $t_{pulse}$. The result is shown in FIG. 6A. The current pulse application time $t_{pulse}$ at the cycle symbol $C_1$ is 1 second, and the current pulse application time $t_{pulse}$ at the cycle symbol $C_2$ is 2 seconds. As in Experiment-1, the discharge capacity C almost monotonously decreased as the number of charge and discharge cycles n increased. In addition, the tendency of the CC charge time $t_{CC}$ was the same as the result of Experiment-1, and the CC charge time $t_{CC}$ decreased gradually monotonously regardless of the type of charge and discharge cycle (N, $C_1$, $C_2$). The CV charge time $t_{CV}$ changed greatly depending on whether or not a current pulse was applied. Specifically, compared with a case where no current pulse was applied (refer to cycle symbol N), the CV charge time increased in a case where the current pulse was applied. However, there was no clear difference in CV charge time between the current pulse application time $t_{pulse}=1$ second and the current pulse application time $t_{pulse}=2$ seconds. FIG. 6B shows a result (discharge capacity ratio) obtained by comparing the discharge capacity $C_n$ in the n-th cycle with the average value of the discharge capacities $C_{n-1}$ and $C_{n+1}$ in cycles immediately before and after the n-th cycle. Also from this result, there was no clear difference in CV charge time between the current pulse application time $t_{pulse}=1$ second and the current pulse application time $t_{pulse}=2$ seconds.

[Experiment-3]

Figure 7:
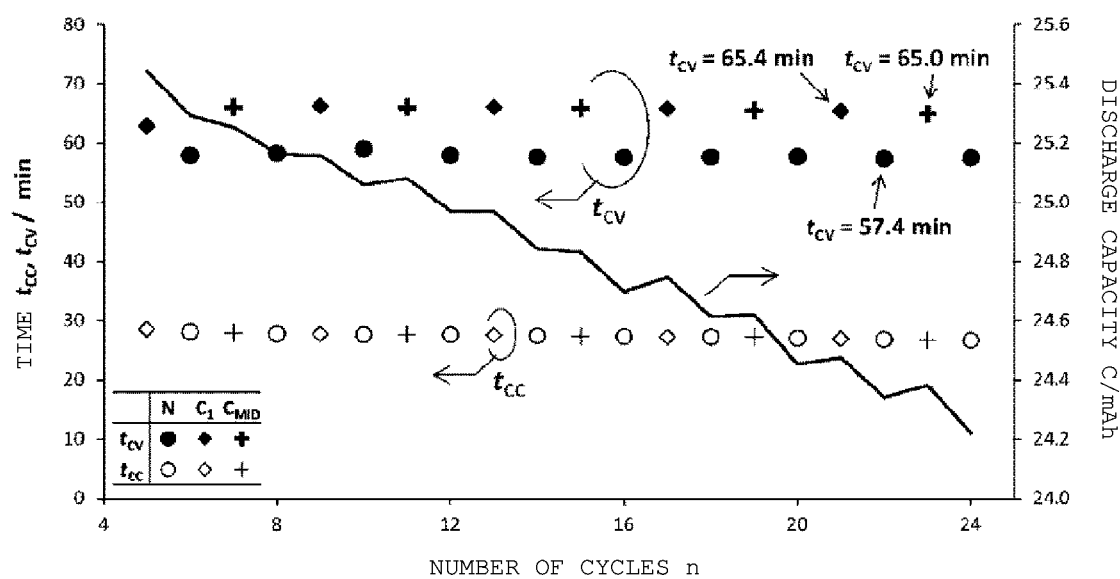
FIG. 7 is a graph showing a result of Experiment-3 in Example 1 according to an embodiment of the present disclosure.

Next, Experiment-3 was performed to examine the influence of the timing of inserting the current pulse (refer to FIG. 7). In the charge and discharge cycle of the cycle symbol $C_1$, a current pulse is inserted between CC charging and CV charging. However, in the charge and discharge cycle of the cycle symbol $C_{MID}$, a current pulse is inserted 2000 seconds after the start of CV charging. Experiment-3 is an experiment to see the difference in current pulse insertion timing.

The discharge capacity C almost monotonously decreased with respect to the number of cycles n as in Experiment-1 and Experiment-2. The tendency of the CC charge time $t_{CC}$ was the same, and the CC charge time $t_{CC}$ decreased gradually monotonously regardless of the type of charge and discharge cycle (N, $C_1$, $C_{MID}$). The CV charge time $t_{CV}$ changed greatly depending on whether or not a current pulse was applied. Specifically, compared with a case where no current pulse was applied (refer to cycle symbol N), the CV charge time increased in a case where the current pulse was applied. However, there was no clear difference in CV charge time $t_{CV}$ between the charge and discharge cycle of the cycle symbol $C_1$ and the charge and discharge cycle of the cycle symbol $C_{MID}$.

Figure 8A:
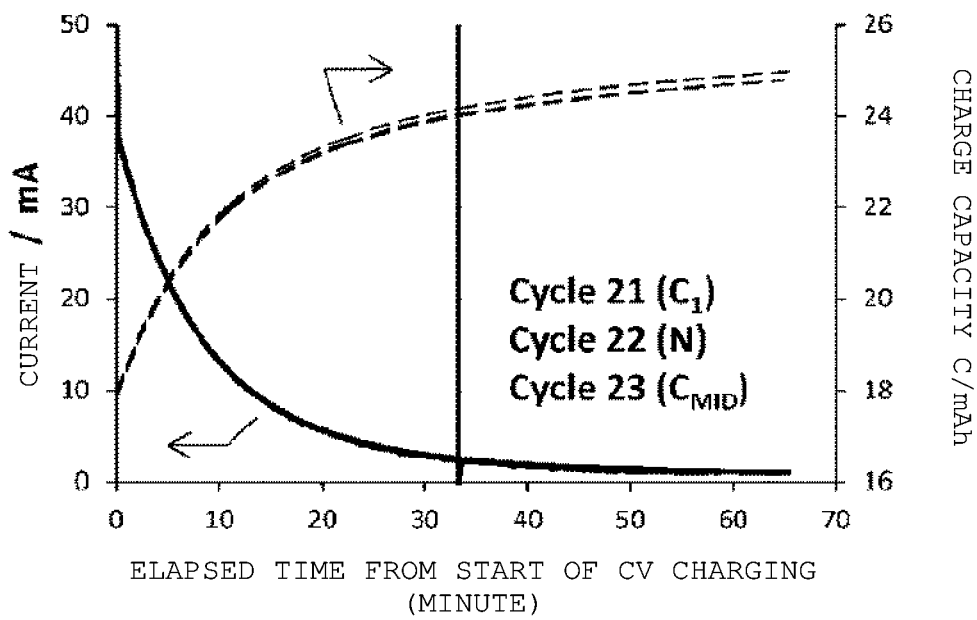
FIG. 8A is a diagram of analysis of the net charge time focusing on the CV charging part of the charge and discharge cycle, 21st cycle, 22nd cycle, and 23rd cycle in Experiment-3 in Example 1 according to an embodiment of the present disclosure.
Figure 8B:
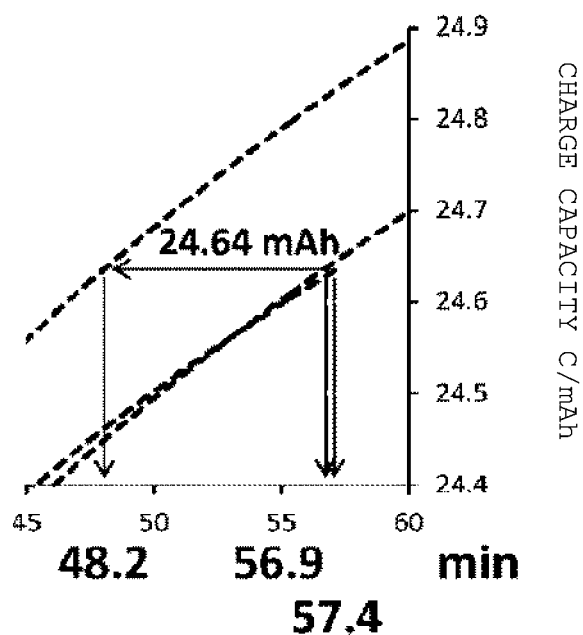
FIG. 8B is a partially enlarged view of FIG. 8A.

FIGS. 8A and 8B are diagrams in which the net CV charge time is analyzed focusing on the CV charging part of the 21st cycle, the 22nd cycle, and the 23rd cycle. In addition, FIG. 8B is an enlarged view of a part of FIG. 8A. The CV charge time in the charge and discharge cycle of the cycle symbol N was 57.4 minutes, and the full charge capacity was 24.64 mAh. The time to reach the same charge capacity in the charge and discharge cycle of the cycle symbol $C_{MID}$ is 56.9 minutes, and accordingly can be shortened by 0.5 minutes. The time to reach the same charge capacity in the charge and discharge cycle of the cycle symbol $C_1$ is 48.2 minutes, and accordingly can be shortened by 9.2 minutes. As described above, it was found that delaying the timing of inserting the current pulse reduced the effect of shortening the CV charge time by the amount of delay.

Figure 9A:
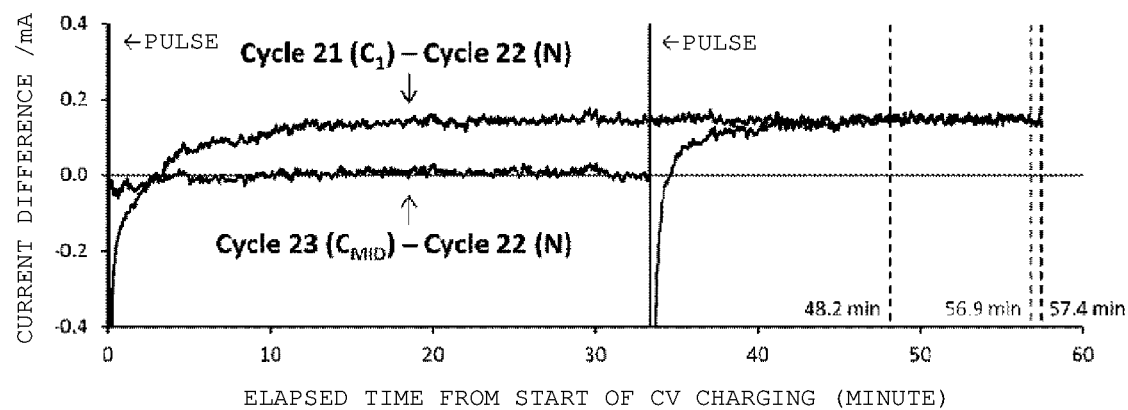
FIG. 9A is a diagram showing a difference in CV charge current value between the charge and discharge cycle of the cycle symbol $C_1$ and the charge and discharge cycle of the cycle symbol N and a difference in CV charge current value between the charge and discharge cycle of the cycle symbol $C_{MID}$ and the charge and discharge cycle of the cycle symbol N in Experiment-3 in Example 1 according to an embodiment of the present disclosure.

FIG. 9A shows a difference in CV charge current value between the charge and discharge cycle of the cycle symbol $C_1$ and the charge and discharge cycle of the cycle symbol N and a difference in CV charge current value between the charge and discharge cycle of the cycle symbol $C_{MID}$ and the charge and discharge cycle of the cycle symbol N. In both cases, the difference became negative immediately after applying the current pulse. Thereafter, however, the difference gradually increased over a period of several minutes to several tens of minutes and changed from negative to positive, and finally, asymptotically approached a value around +0.15 mA.

[Experiment-4]

Figure 9B:
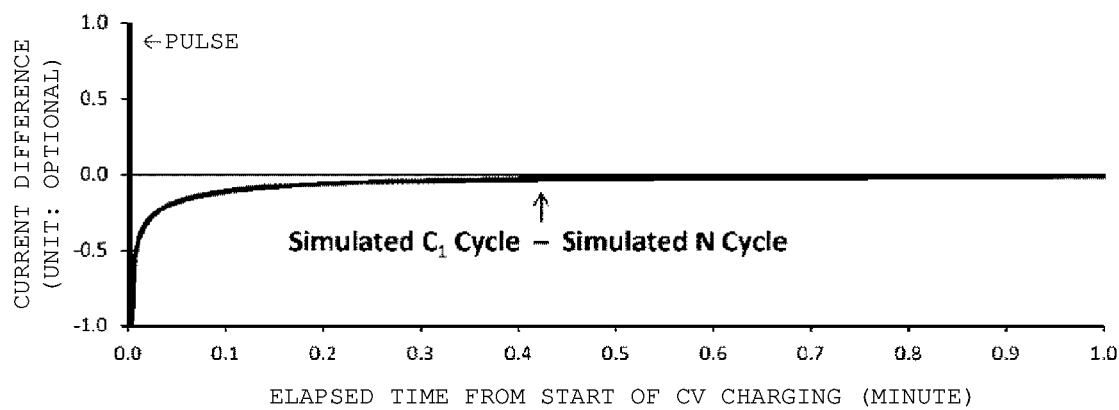
FIG. 9B is a diagram showing a difference in CV charge current value between the charge and discharge cycle of the cycle symbol $C_1$ and the charge and discharge cycle of the cycle symbol N obtained by simulation in Experiment-4 in Example 1 according to an embodiment of the present disclosure.

In order to examine whether or not a current difference relaxation behavior can be explained using the Newman model of the one-dimensional and isothermal model, a qualitative simulation of Experiment-4 was performed using a finite element method. FIG. 9B shows a difference in CV charge current value between the charge and discharge cycle of the cycle symbol $C_1$ and the charge and discharge cycle of the cycle symbol N obtained by simulation. From FIG. 9B, the behavior in which the difference becomes negative immediately after the application of the current pulse and the behavior in which the difference gradually increases thereafter are consistent with an experimental result using the actual lithium-ion secondary battery (refer to FIG. 9A). However, the current asymptotic value in the simulation was 0 mA, and the current asymptotic value was about +0.15 mA in the experimental result using an actual lithium-ion secondary battery. That is, by simulation, the transient response behavior immediately after the application of the current pulse was reproduced, but the subsequent steady state was not reproduced. This suggests that the transient response after the application of the current pulse can be explained by the Newman model of the one-dimensional and isothermal model but the subsequent steady state cannot be explained by the Newman model of the one-dimensional and isothermal model. That is, for example, a result suggesting that the behavior is caused by elements ignored in the Newman model, such as an effect or a temperature change due to a structure having two or more dimensions.

[Experiment-5]

Figure 10:
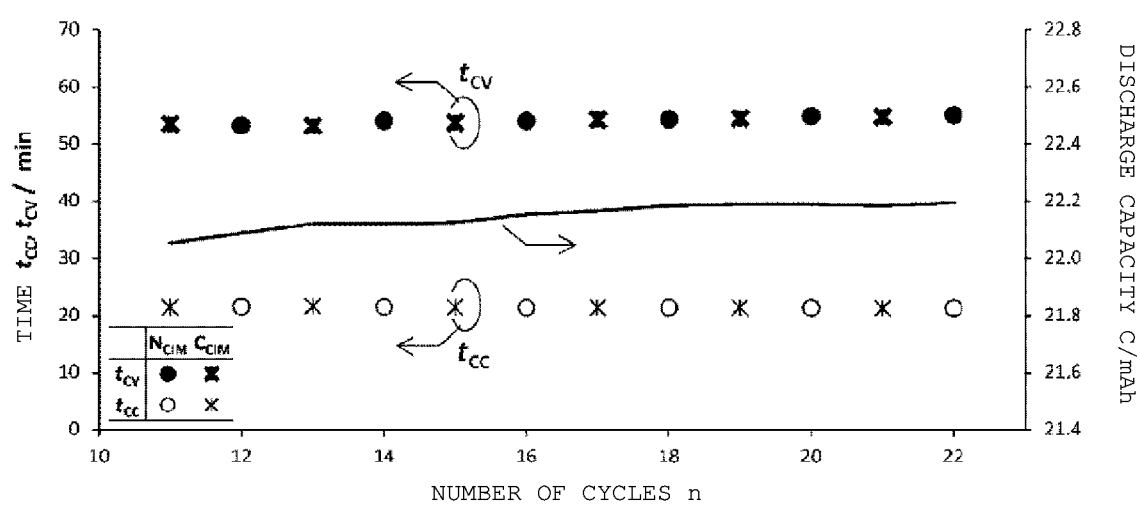
FIG. 10 is a diagram showing a result of Experiment-5 in Example 1 according to an embodiment of the present disclosure.
Figure 11A:
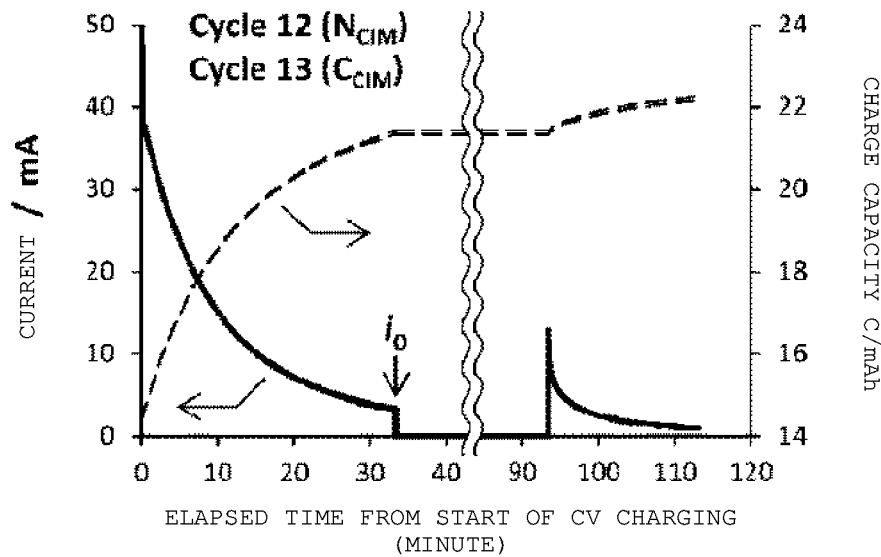
FIG. 11A is a diagram showing a calculation result of voltage change amounts $\Delta V_1'$ ($=V_1'-V_0'$) and $\Delta V_{3600}'$ ($=V_{3600}'-V_0'$) in Experiment-5 in Example 1 according to an embodiment of the present disclosure.
Figure 11B:
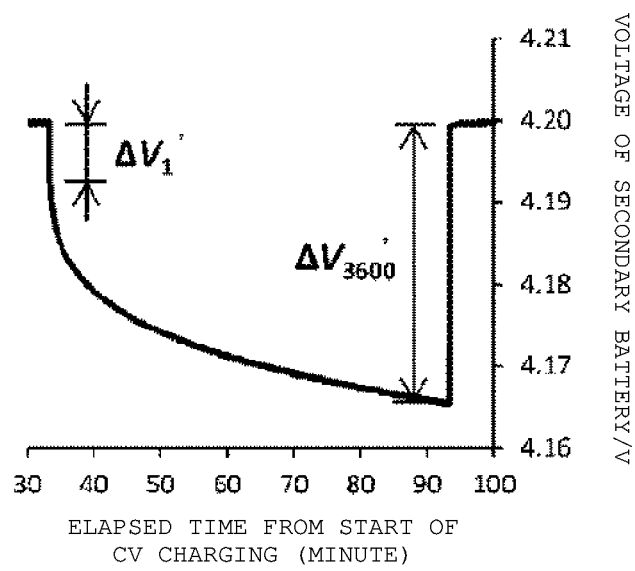
FIG. 11B is a partially enlarged view of FIG. 11A.

Next, Experiment-5 was performed to examine whether or not the internal impedance of the lithium-ion secondary battery changes due to application of a current pulse (refer to FIG. 10). In the charge and discharge cycles of the cycle symbols $C_{CIM}$ and $N_{CIM}$, the current is interrupted for 3600 seconds after 2000 seconds from the start of CV charging where the transient response caused by application of the current pulse pauses. Then, voltage change amounts $\Delta V_1'$ ($=V_1'-V_0'$) and $\Delta V_{3600}'(=V_{3600}'-V_0')$ were calculated (refer to FIGS. 11A and 11B). In addition, FIG. 11B is an enlarged view of a part of FIG. 11A. Then, the ohmic component $R_{Ohmic}$ and the Faraday component $R_{Faradaic}$ of the internal impedance were calculated by the following equations. In addition, these internal impedances can be calculated by, for example, a current interrupt method, and the details are described in K. R. Cooper and M. Smith, "Electrical test methods for on-line fuel cell ohmic resistance measurement", Journal of Power Sources 160(2), 2006, 1088-1095.

$$R_{Ohmic}=\Delta V_1'/i_0'$$

$$R_{Faradaic}=(V_{3600}'/i_0')-R_{Ohmic}$$

From FIG. 10, the discharge capacity C increased gradually monotonically with respect to the number of charge and discharge cycles n, unlike the behavior of the experimental results up to now. The behavior of the charge time was also different from the behavior of the experimental results so far, and the CC charge time $t_{CC}$ and the CV charge time $t_{CV}$ were almost constant regardless of whether or not a current pulse was applied.

Figure 12A:
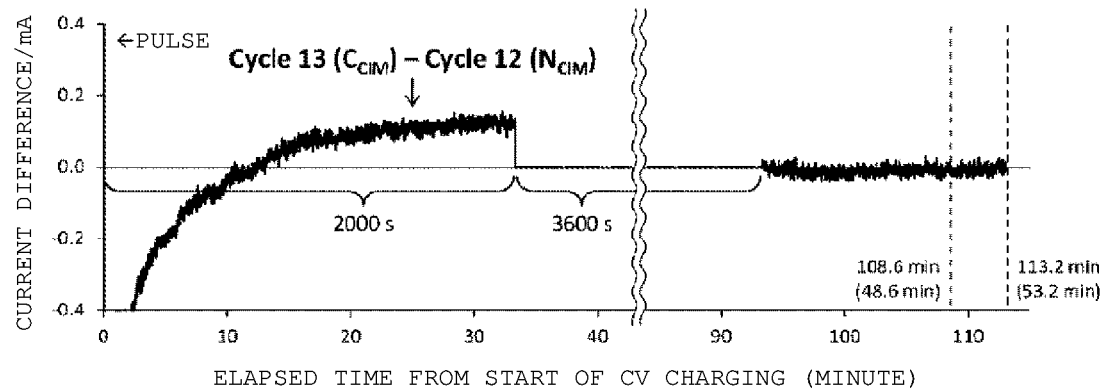
FIG. 12A is a diagram showing a difference in CV charge current value between the charge and discharge cycle of the cycle symbol $C_{CIM}$ and the charge and discharge cycle of the cycle symbol $N_{CIM}$ in Experiment-5 in Example 1 according to an embodiment of the present disclosure.

FIG. 12A shows a difference in CV charge current value between the charge and discharge cycle of the cycle symbol $C_{CIM}$ and the charge and discharge cycle of the cycle symbol $N_{CIM}$. The difference became negative immediately after applying the current pulse. Thereafter, however, the difference gradually increased over a period of several minutes to several tens of minutes and changed from negative to positive, and finally, asymptotically approached a value around +0.15 mA. The behavior so far was the same as the behavior of the difference in CV charge current value between the charge and discharge cycle of the cycle symbol $C_1$ and the charge and discharge cycle of the cycle symbol N seen in FIG. 9A. However, when current interruption was performed for 3600 seconds after 2000 seconds from the start of CV charging, the difference in charge current value after CV charging resumed was almost zero. That is, the effect of applying the current pulse disappeared.

Figure 12B:
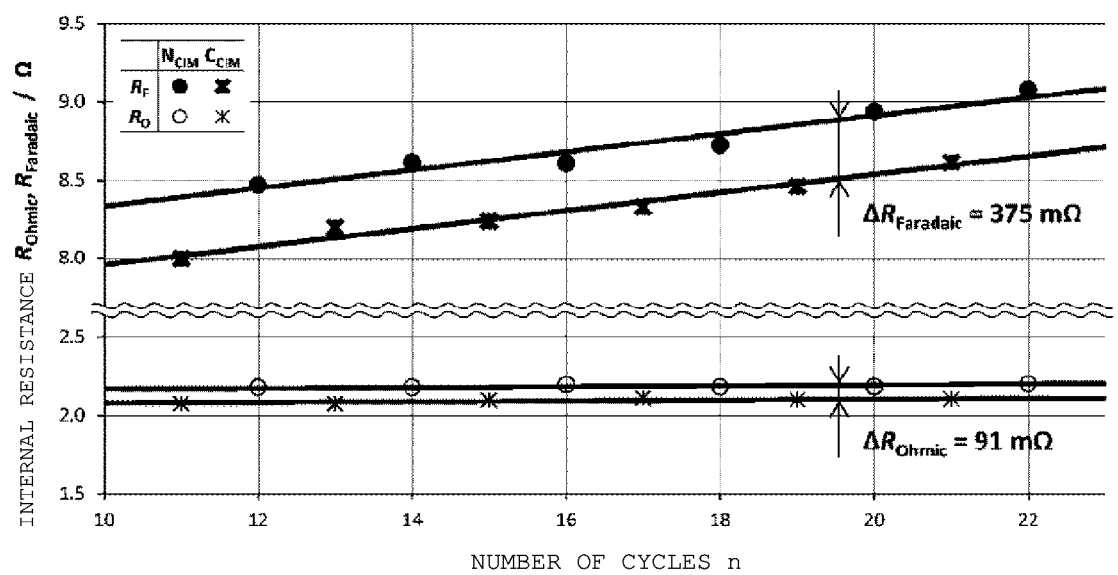
FIG. 12B is a diagram showing the cycle dependency of an ohmic component $R_{Ohmic}$ and a Faraday component $R_{Faradaic}$ of an internal impedance obtained in Example 1 according to an embodiment of the present disclosure.

FIG. 12B shows the cycle dependency of the ohmic component $R_{Ohmic}$ and the Faraday component $R_{Faradaic}$ of the internal impedance. From FIG. 12B, it was found that the ohmic component $R_{Ohmic}$ and the Faraday component $R_{Faradaic}$ of the internal impedance in the charge and discharge cycle of the cycle symbol $C_{CIM}$ to which a current pulse was applied decreased compared with those of the internal impedance in the charge and discharge cycle of the cycle symbol $N_{CIM}$ to which no current pulse was applied. The amount of decrease in internal impedance due to current pulse application was estimated by regression analysis based on linear approximation. As a result, the amount of decrease in ohmic component due to current pulse application was $\Delta R_{ohmic}$=91 mΩ and the amount of decrease in faradaic component due to current pulse application was $\Delta R_{Faradaic}$=375 mΩ, indicating that the amount of decrease in faradaic component was several times larger. This can be said to be a result suggesting that a part where the change occurred is not the electrolyte but mainly the electrode.

From the above various experiments, it was found that $1<i_1/i_0 \leq 10$ was preferably satisfied. In addition, the time during which a current pulse is applied may be 0.01 seconds or more and 10 seconds or less. In addition, it was found that the number of times of application of the current pulse could be 1 to 10 times but one time was sufficient.

In addition, assuming that the impedance of the lithium-ion secondary battery and the charging end set current value at the time of ending charging with a constant voltage after applying a current pulse are $Z_A$ and $I_{comp-A}$ and the impedance of the lithium-ion secondary battery and the charging end set current value at the time of ending charging with a constant voltage in a case where no current pulse is applied are $Z_B$ and is $I_{comp-B}$, it is preferable that $I_{comp-A}$ satisfies $I_{comp-A}=(Z_B/Z_A)\times I_{comp-B}$. Alternatively, assuming that the charging end set current value at the time of ending charging with a constant voltage after applying a current pulse is $I_{comp-A}$ and the charging end set current value at the time of ending charging with a constant voltage in a case where no current pulse is applied is $I_{comp-B}$, it is preferable that $I_{comp-B}<I_{comp-A}\leq 5\times I_{comp-B}$ is satisfied. Alternatively, assuming that the charging end set time at the time of ending charging with a constant voltage after applying a current pulse is $t_{comp-A}$ and the charging end set time at the time of ending charging with a constant voltage in a case where no current pulse is applied is $t_{comp-B}$, it is preferable that $0.7\times t_{comp-B} \leq t_{comp-A} < t_{comp-B}$ is satisfied.

In the charging method of Example 1, the net CV charge time was shortened by 9.6 minutes by applying a current pulse for 1 second. Here, since the time $t_{pulse}$ of the applied current pulse is 1 second and the peak current value $i_1$ is 50 mA, the charge capacity due to this current pulse is 50 mAs. In Example 1, the charging end set current value is set to 1 mA. That is, the charge current waveform at the end of CV charging is a waveform asymptotic to 1 mA, and the charge current value can be regarded as approximately 1 mA. That is, the time corresponding to the capacity (50 mAs) of charging by the current pulse is about 50 seconds. Therefore, if the amount of shortening of the CV charge time is about 50 seconds, it can be explained that the shortening of the CV charge time is simply due to charging by the current pulse. In practice, however, the amount of shortening is 9.6 minutes (576 seconds), which is actually 11 times. From this, it can be said that the application of the current pulse has an effect more than the increase in the charge capacity due to the current pulse.

Figure 17:
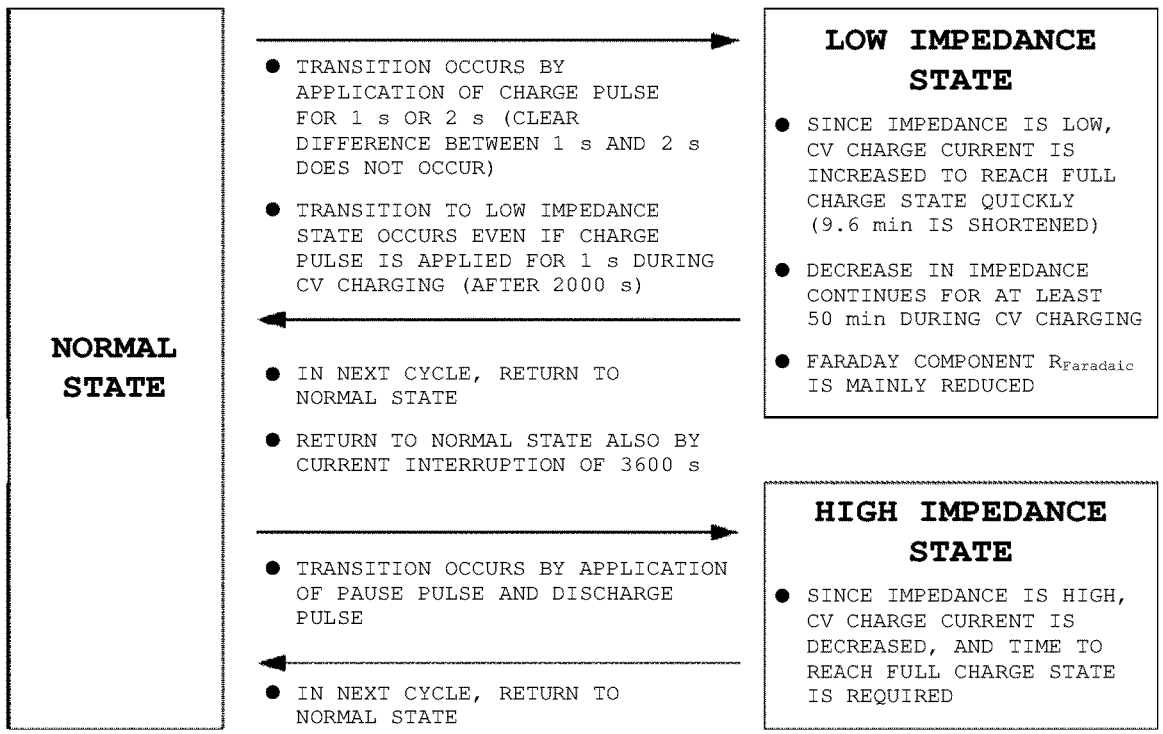
FIG. 17 is a state transition diagram in which phenomena observed in Experiment-1 to Experiment-5 of Example 1 are written according to an embodiment of the present disclosure.

A state transition model in which the state of a lithium-ion secondary battery itself is changed by applying a current pulse is considered. The lithium-ion secondary battery has three states of a normal state, a low impedance state, and a high impedance state, and these states are models in which transition is performed in both directions by satisfying predetermined conditions. A state transition diagram in which phenomena observed in Experiment-1 to Experiment-5 are written is shown in FIG. 17. As shown in FIG. 17, the transition from the normal state to the low impedance state and the high impedance state occurs with the application of a current pulse as a trigger. Then, the state returns to the original normal state in the next cycle or by performing current interruption for 3600 seconds during CV charging. If the current pulse is applied again in the next cycle after returning to the normal state, the state transitions again to the low impedance state or the high impedance state. That is, this transition is reversible, and back-and-forth movement between the two states can be made several times. In addition, it was found that this state transition was a state change due to an element not included in the Newman model of the one-dimensional and isothermal model. Then, as a result of the state change, it was found that particularly a Faraday component (component not caused by the electrolyte but caused by the electrode) of the internal impedance changed.

A state change due to an element not included in the Newman model of the one-dimensional and isothermal model, which is a state change causing a decrease in impedance not caused by the electrolyte but caused by the electrode and which is a reversible state change, is specifically considered.

First, as the first possibility, a possibility that the "low impedance state is a state in which the electrode temperature has slightly increased (=high temperature state)" will be considered. If heat is generated inside the lithium-ion secondary battery by the current pulse, this increases the temperature inside the lithium-ion secondary battery, and as a result, the internal impedance decreases. In addition, the change in internal impedance due to such heat generation or temperature change is an element not included in the Newman model of the isothermal model used this time, and there is no contradiction in that respect. In addition, if the state change is just a temperature change, it can also be explained that there is reversibility.

However, this possibility is very low. That is, it is already known that the amount of heat $Q_{Total}$ of the lithium-ion secondary battery is the sum of a component $Q_{Reaction}$ due to the entropy change of the charging and discharging reaction, a component $Q_{Polarization}$ due to polarization loss, and a Joule heat component $Q_{Joule}$. In addition, it is known that, among these, $Q_{Reaction}$ indicates an odd function response that generates or absorbs heat depending on the sign of the current and $Q_{Polarization}$ and $Q_{Joule}$ indicate an even function response that generates heat during charging and discharging (refer to Y, Saito, Netsu Sokutei 30(1), 2003, 18-24).

$$Q_{Total}=Q_{Reaction}+Q_{Polarization}+Q_{Joule}$$

The phenomenon of shortening the charge time is a phenomenon in which transition to the low impedance state is made by applying a current pulse and transition to the high impedance state is made by applying a pause or discharge pulse. Therefore, it can be said that the phenomenon is an odd function response to the charge current. That is, the only component that should be considered herein is $Q_{Reaction}$ that should theoretically be an odd function response. There are many papers on the behavior of $Q_{Reaction}$ associated with the charging and discharging reaction of the lithium-ion secondary battery, but according to those reports, $Q_{Reaction}$ becomes positive during discharging to generate heat and becomes negative during charging to absorb heat. That is, this means that the effect of $Q_{Reaction}$ by the current pulse works to lower the temperature inside the lithium-ion secondary battery. The internal impedance increases as the temperature decreases, which contradicts the result of transitioning to the low impedance state.

The second reason why it is negative that the low impedance state is a high temperature state is a time constant. The decrease in impedance continues for at least 50 minutes during CV charging. Members configuring the lithium-ion secondary battery are those having high thermal conductivity, such as copper, aluminum, and carbon, and the exterior member is also a metal can with good heat dissipation. For this reason, it is unlikely that the temperature change caused by a current pulse of only 1 second will last for 50 minutes.

For the above reasons, it is unlikely that the low impedance state is caused by the high temperature state.

As described above, since the Faraday component of the internal impedance is changed by the state transition, it can be said that this is a change occurring not in the electrolyte but in the electrode. Next, the phenomenon of a low impedance state is a physical phenomenon that is not included in the Newman model of the one-dimensional and isothermal model, and the cause of temperature is negative due to the above considerations. Therefore, from the viewpoint of the elimination method, the phenomenon of a low impedance state is considered to be relevant to an electrode structure change or a change in physical properties of the electrode material itself (for example, phase transition). However, the structure change phenomenon is generally less reversible. For example, a large structure change, such as generation of cracks in the active material layer or crushing of the active material particles, is naturally not reversible. The reversible structure change phenomenon is limited to a very microscopic phenomenon, such as phase transition of a crystal structure.

As a deductive conclusion of the above discussion, it is estimated that the phenomenon of a low impedance state is relevant to some phase transition phenomena of the electrode material.

The phenomenon of a low impedance state has another important feature. This is a feature that the low impedance state returns to the original normal state by current interruption of 3600 seconds. One interpretation of this behavior may be that the low impedance state is a state that cannot be maintained unless a current is continuously applied. Assuming that this phenomenon is relevant to a phase transition phenomenon, the conclusion that the phenomenon is a current-induced phase transition phenomenon, in which transition to a certain phase is made only while a current is flowing and returning to the original phase occurs when the current is stopped, emerges as one possibility. In addition, as one proof to support the current-induced phase transition phenomenon, $Li_xCoO_2$ used as a positive electrode material for lithium-ion secondary batteries is a material that is very familiar with the phase transition phenomenon. It is known that the value of x goes back and forth between 0.5 and 1.0 by charging and discharging, but the lattice constant when $x>0.93$ and the lattice constant when $x<0.75$ are different. In addition, it is known that the phase transition from the hexagonal system to the monoclinic system occurs near $x=0.5$ (refer to J. N. Reimers and J. R. Dahn, J. Electrochem. Soc. 139(8), 1992, 2091-2097).

As described above, in the charging device and the charging method of Example 1 or Example 2 described later, the internal impedance of the lithium-ion secondary battery can be reduced by applying the current pulse at least once. As a result, since the charge current value in the constant voltage charging stage can be increased, the lithium-ion secondary battery can be fully charged in a shorter time.

Example 2

Example 2 relates to a charging device according to the second aspect of the present disclosure and a charging method according to the second aspect of the present disclosure.

The charging device of Example 2 is a charging device that charges a lithium-ion secondary battery, in which a positive electrode material contains $Li_xCoO_2$, based on at least a constant voltage method. In addition, the charging method of Example 2 is a charging method for charging a lithium-ion secondary battery, in which a positive electrode material contains $Li_xCoO_2$, based on at least a constant voltage method.

Then, the charging device of Example 2 includes x value calculation means for calculating the value of x during charging of the lithium-ion secondary battery, and temperature measurement means for measuring the temperature of the positive electrode material during charging of the lithium-ion secondary battery, and determines a point in time at which a current pulse having a peak current value $i_1$ larger than a charge current value $i_0$ immediately before applying a current pulse is applied at least once based on the value of x calculated by the x value calculation means and the value of the temperature of the positive electrode material measured by the temperature measurement means.

Then, the charging method of Example 2 includes X value calculation means for calculating the value of x during charging of the lithium-ion secondary battery, and temperature measurement means for measuring the temperature of the positive electrode material during charging of the lithium-ion secondary battery, and determines a point in time at which a current pulse having a peak current value $i_1$ larger than a charge current value $i_0$ immediately before applying a current pulse is applied at least once based on the calculated value of x and the measured value of the temperature of the positive electrode material.

Here, the value of x in $Li_xCoO_2$ can be calculated by applying, for example, dV/dQ analysis described in Hannah M. Dahn, A. J. Smith, J. C. Burns, D. A. Stevens, and J. R. Dahn, "User-Friendly Differential Voltage Analysis Freeware for the Analysis of Degradation Mechanisms in Li-Ion Batteries", Journal of The Electrochemical Society 159(9), 2012, A1405-A1409.

That is, by detecting the voltage of the lithium-ion secondary battery during charging of the lithium-ion secondary battery and differentiating the voltage by capacitance, it is possible to know a kind of step portion generated in the voltage change of the lithium-ion secondary battery. In addition, it is possible to know the accumulated charge capacity at that time. Then, the arithmetic processing unit 41 can obtain the value of x by performing dV/dQ analysis based on these pieces of data. In addition, the dV/dQ analysis is a method of calculating the effective active material capacity of the positive and negative electrodes or calculating the SOC ($x=1-SOC/2$ in the case of an $Li_xCoO_2$ electrode) of the positive electrode and the SOC (x=SOC in the case of a $C_6Li_x$ electrode) of the negative electrode by differentiating the charge and discharge curve by capacitance to make microstructures noticeable and examining at how many capacitance values a characteristic microstructure appears.

In addition, in order to calculate the temperature of the positive electrode material, for example, the exterior temperature of the lithium-ion secondary battery can be calculated by reading the resistance value of a thermistor provided in the vicinity of the lithium-ion secondary battery (or attached to the surface of the lithium-ion secondary battery), and this can be read as being almost equal to the temperature of the positive electrode material. Alternatively, an electrochemical impedance spectrum (EIS) is measured based on in-situ measurement, a Cole-Cole plot is analyzed, the impedance of the positive electrode material is calculated from the diameter of the arc corresponding to the positive electrode material, and the temperature of the positive electrode material is calculated using a "temperature vs. impedance" curve prepared in advance. The details of the latter temperature calculation method are described in, for example, Lixia Liao, Pengjian Zuo, Yulin Ma, XinQun Chen, Yongxin An, Yunzhi Gao, Geping Yin, "Effects of temperature on charge/discharge behaviors of LiFePO4 cathode for Li-ion batteries", Electrochimica Acta 60, 2012, 269-273.

Hereinafter, the charging method of Example 2 will be described. Also in Example 2, charging is performed without interruption.

Figure 15:
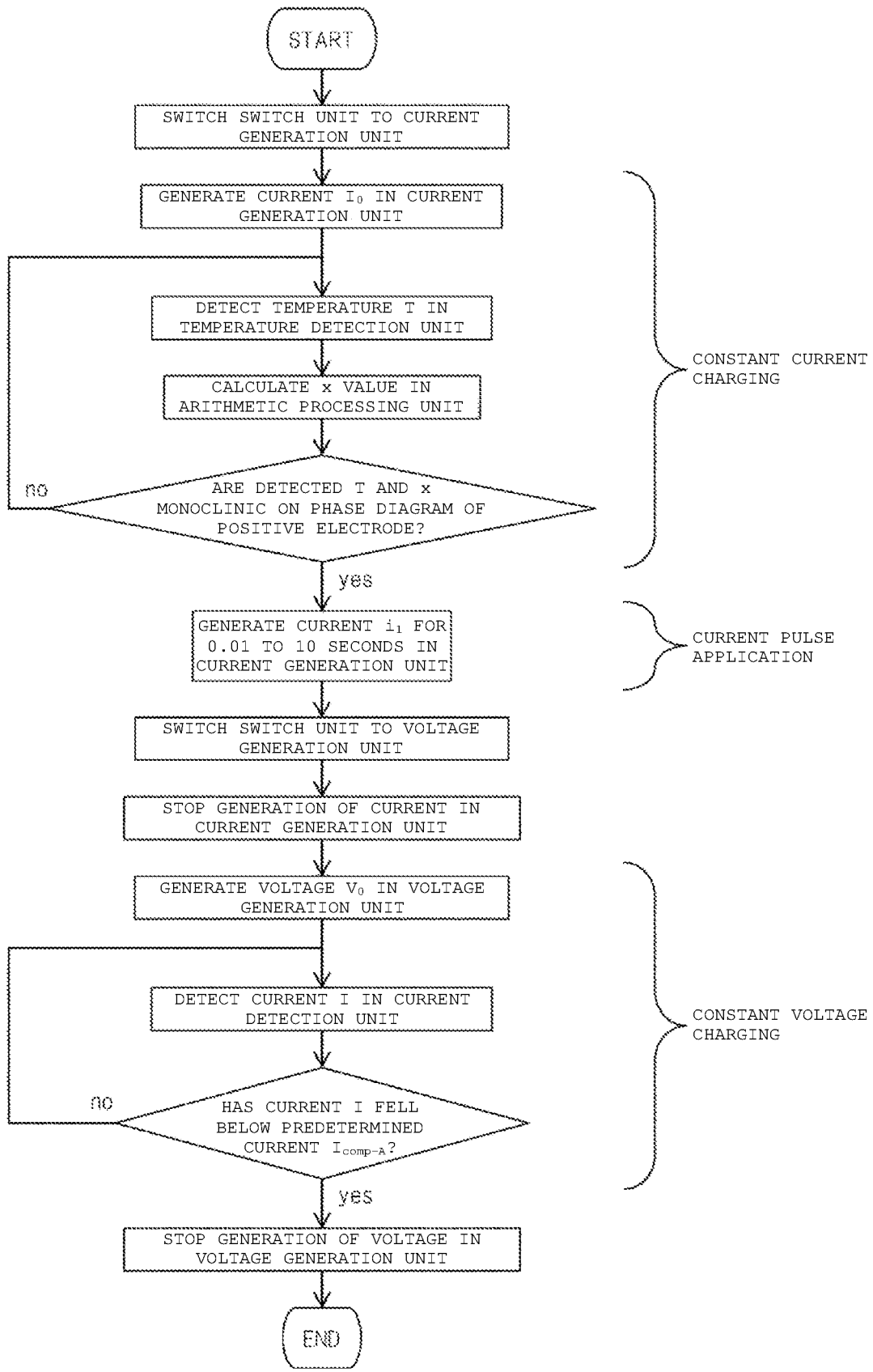
FIG. 15 is a flowchart of a charging method of Example 2 according to an embodiment of the present disclosure.

As shown in the flowchart of FIG. 15, first, CC charging is started. That is, under the control of the arithmetic processing unit 41 and the current generation control unit 43A, the current generation unit 44 generates a charge current having a predetermined value $I_0$, and the charge current starts to flow through the lithium-ion secondary battery 30. The voltage V of the lithium-ion secondary battery 30 rises. The temperature of the lithium-ion secondary battery 30 is measured by the temperature measurement means (temperature detection unit) 47C, and the detection result is transmitted to the arithmetic processing unit 41. In addition, the voltage V of the lithium-ion secondary battery 30 is detected by the voltage detection unit 47B, the detection result is transmitted to the arithmetic processing unit 41, and the value of x is calculated by the arithmetic processing unit 41.

When the value of x reaches a predetermined value, the current generation unit 44 applies a current pulse (peak current value $i_1$, application time $t_{pulse}$) to the lithium-ion secondary battery 30 under the control of the arithmetic processing unit 41 and the current generation control unit 43A. Here, when the value of x reaches a predetermined value, the positive electrode material enters a monoclinic region from a hexagonal system. In addition, it is considered, even if the positive electrode material enters a monoclinic region, the positive electrode material does not immediately change to the monoclinic system but has a metastable state, such as a supercooled state.

Then, by applying a current pulse so that a kind of impact is applied to the positive electrode material, the phase transition from the hexagonal system to the monoclinic system is promoted. In the process of phase transition from the hexagonal system to the monoclinic system, the positive electrode material formed of $Li_xCoO_2$ should release lithium ions. That is, the positive electrode material is in an extremely low overvoltage state. The entire lithium-ion secondary battery is in a low impedance state.

In order to receive the released lithium ions without delay, CV charging is started immediately. That is, the switch unit 46 performs switching instantaneously under the control of the arithmetic processing unit 41 and the switch control unit 43C. At the same time, under the control of the arithmetic processing unit 41 and the voltage generation control unit 43B, the voltage generation unit 45 generates a charge voltage $V_0$ having a predetermined value and applies the charge voltage $V_0$ to the lithium-ion secondary battery 30. The voltage ($=V_0$) of the lithium-ion secondary battery 30 is detected by the voltage detection unit 47B, and the detection result is transmitted to the arithmetic processing unit 41. In addition, the current flowing through the lithium-ion secondary battery 30 is detected by the current detection unit 47A, and the detection result is transmitted to the arithmetic processing unit 41. When the value of the charge current flowing through the lithium-ion secondary battery 30 decreases to a predetermined value ($I_{comp-A}$), the charging of the lithium-ion secondary battery is ended. That is, if the charge current falls below a certain threshold value, the constant voltage control is discontinued. However, since the lithium-ion secondary battery is in a low impedance state, the threshold value is set to be high. Otherwise, the value of State-Of-Charge exceeds 1, so that the lithium-ion secondary battery is likely to deteriorate. In addition, this also applies to Example 1.

Figure 16:
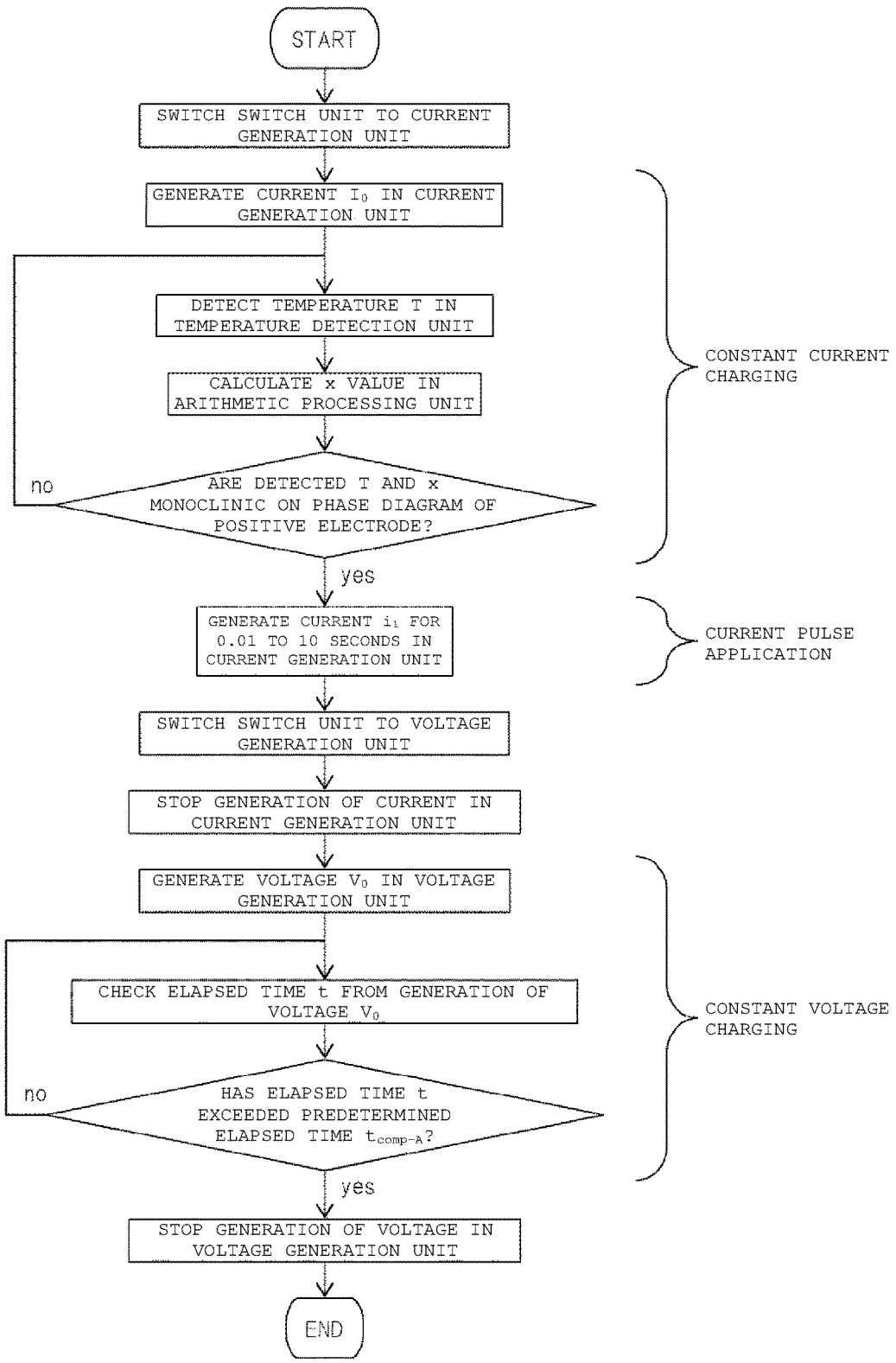
FIG. 16 is a flowchart of a modification example of the charging method of Example 2 according to an embodiment of the present disclosure.

Alternatively, as shown in the flowchart of FIG. 16, after the CV charging is started, when the CV charge time exceeds the charging end set time $t_{comp-A}$, the charging of the lithium-ion secondary battery is ended.

Example 3

Figure 18:
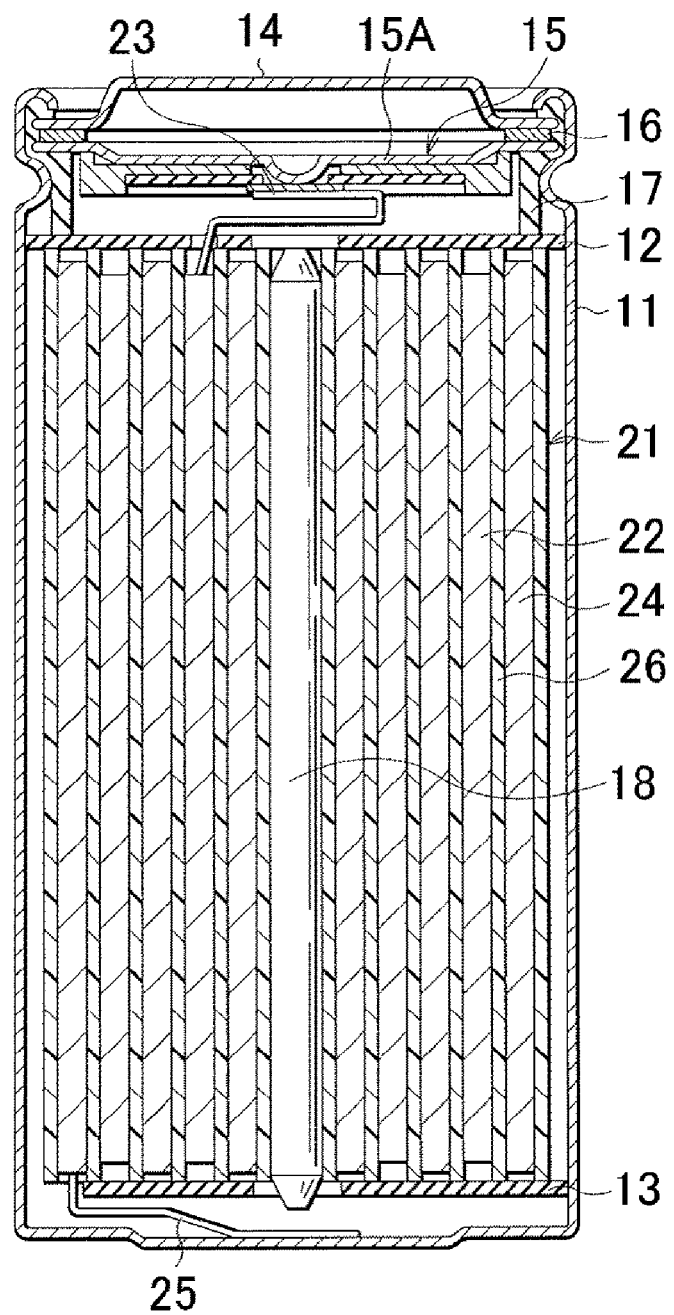
FIG. 18 is a schematic cross-sectional view of a secondary battery of Example 3 according to an embodiment of the present disclosure.
Figure 19:
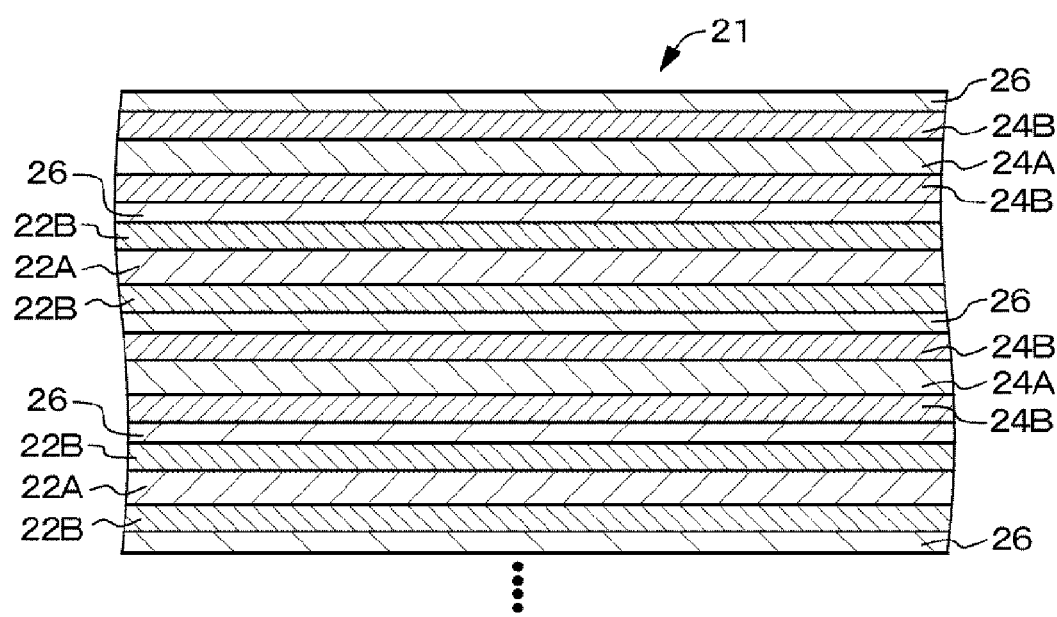
FIG. 19 is a schematic partial cross-sectional view of a wound electrode laminate in the secondary battery of Example 3 according to an embodiment of the present disclosure.

In Example 3, a lithium-ion secondary battery that is a cylindrical lithium-ion secondary battery will be described. FIG. 18 shows a schematic cross-sectional view of the cylindrical lithium-ion secondary battery of Example 3. In addition, FIG. 19 shows a schematic partial cross-sectional view along the longitudinal direction of an electrode structure configuring the lithium-ion secondary battery of Example 3. Here, FIG. 19 is a schematic partial cross-sectional view of a portion where a positive electrode lead portion and a negative electrode lead portion are not disposed. In order to simplify the diagram, the electrode structure is shown flat. In practice, however, since the electrode structure is wound, the electrode structure is curved.

In the lithium-ion secondary battery of Example 3, an electrode structure 21 and a pair of insulating plates 12 and 13 are housed inside an almost hollow cylindrical electrode structure housing member 11. The electrode structure 21 can be manufactured, for example, by laminating a positive electrode member 22 and a negative electrode member 24 with a separator 26 interposed therebetween to obtain an electrode structure and then winding the electrode structure.

The electrode structure housing member (battery can) 11 has a hollow structure in which one end portion is closed and the other end portion is opened, and is formed of iron (Fe) and/or aluminum (Al) or the like. The surface of the electrode structure housing member 11 may be plated with nickel (Ni) or the like. The pair of insulating plates 12 and 13 are disposed so as to interpose the electrode structure 21 therebetween and extend perpendicular to the winding peripheral surface of the electrode structure 21. A battery lid 14, a safety valve mechanism 15, and a heat-sensitive resistance element (PTC element, Positive Temperature Coefficient element) 16 are crimped to the open end portion of the electrode structure housing member 11 with a gasket 17 interposed therebetween, so that the electrode structure housing member 11 is sealed. The battery lid 14 is formed of the same material as the electrode structure housing member 11, for example. The safety valve mechanism 15 and the heat-sensitive resistance element 16 are provided inside the battery lid 14, and the safety valve mechanism 15 is electrically connected to the battery lid 14 with the heat-sensitive resistance element 16 interposed therebetween. In the safety valve mechanism 15, a disk plate 15A is reversed when the internal pressure reaches a predetermined level due to internal short circuit, external heating, or the like. As a result, the electrical connection between the battery lid 14 and the electrode structure 21 is cut. In order to prevent abnormal heat generation due to a large current, the resistance of the heat-sensitive resistance element 16 increases as the temperature rises. The gasket 17 is formed of, for example, an insulating material. Asphalt or the like may be applied onto the surface of the gasket 17.

A center pin 18 is inserted into the winding center of the electrode structure 21. However, the center pin 18 does not have to be inserted into the winding center. A positive electrode lead portion 23 formed of a conductive material, such as aluminum, is connected to the positive electrode member 22. Specifically, the positive electrode lead portion 23 is attached to a positive electrode current collector 22A. A negative electrode lead portion 25 formed of a conductive material, such as copper, is connected to the negative electrode member 24. Specifically, the negative electrode lead portion 25 is attached to the negative electrode current collector 24A. The negative electrode lead portion 25 is welded to the electrode structure housing member 11 so as to be electrically connected to the electrode structure housing member 11. The positive electrode lead portion 23 is welded to the safety valve mechanism 15 so as to be electrically connected to the battery lid 14.

In addition, in the example shown in FIG. 18, the negative electrode lead portion 25 is provided at one place (the outermost peripheral portion of the wound electrode structure). However, the negative electrode lead portion 25 may be provided at two places (the outermost peripheral portion and the innermost peripheral portion of the wound electrode structure).

The electrode structure 21 is formed by laminating the positive electrode member 22, in which a positive electrode active material layer 22B is formed on the positive electrode current collector 22A (specifically, on both surfaces of the positive electrode current collector 22A), and a negative electrode member 24, in which a negative electrode active material layer 24B is formed on the negative electrode current collector 24A (specifically, on both surfaces of the negative electrode current collector 24A), with the separator 26 interposed therebetween. The positive electrode active material layer 22B is not formed in a region of the positive electrode current collector 22A to which the positive electrode lead portion 23 is attached, and the negative electrode active material layer 24B is not formed in a region of the negative electrode current collector 24A to which the negative electrode lead portion 25 is attached.

The specifications of the lithium-ion secondary battery of Example 1 are illustrated in Table 4 below.

TABLE 4

Positive electrode current collector 22A: Aluminum foil having a thickness of 20 μm TABLE 4-continued Positive electrode active material layer 22B: Thickness per side 50 μm
Positive lead portion 23: Aluminum (Al) foil having a thickness of 100 μm
Negative electrode current collector 24A: Copper foil having a thickness of 20 μm
Negative electrode active material layer 24B: Thickness per side 50 μm
Negative lead portion 25: Nickel (Ni) foil having a thickness of 100 μm In the case of manufacturing the positive electrode member 22, first, 91 parts by mass of a positive electrode active material ($Li_xCoO_2$), 3 parts by mass of a positive electrode binder (polyvinylidene fluoride), and 6 parts by mass of a positive electrode conductive agent (graphite) are mixed to obtain a positive electrode mixture. Then, the positive electrode mixture is mixed with an organic solvent (N-methyl-2-pyrrolidone) to obtain a paste-like positive electrode mixture slurry. Then, the positive electrode mixture slurry is applied onto both surfaces of the strip-shaped positive electrode current collector 22A (aluminum foil having a thickness of 20 μm) using a coating apparatus, and then the positive electrode mixture slurry is dried to form the positive electrode active material layer 22B.

Then, the positive electrode active material layer 22B is compression-molded using a roll press.

When manufacturing the negative electrode member 24, first, 97 parts by mass of a negative electrode active material (graphite or a mixed material of graphite and silicon) and 3 parts by mass of a negative electrode binder (polyvinylidene fluoride) are mixed to obtain a negative electrode mixture. The average particle diameter $d_{50}$ of graphite is set to 20 μm. Then, the negative electrode mixture is mixed with an organic solvent (N-methyl-2-pyrrolidone) to obtain a paste-like negative electrode mixture slurry. Then, the negative electrode mixture slurry is applied onto both surfaces of the strip-shaped negative electrode current collector 24A (copper foil having a thickness of 20 μm) using a coating apparatus, and then the negative electrode mixture slurry is dried to form the negative electrode active material layer 24B. Then, the negative electrode active material layer 24B is compression-molded using a roll press.

The separator 26 is formed of a microporous polyethylene film having a thickness of 20 μm. In addition, the electrode structure 21 is impregnated with a non-aqueous electrolyte solution having a composition shown in Table 5 or Table 6 below. In addition, the solvent of the non-aqueous electrolyte solution is a broad concept including not only a liquid material but also an ion conductive material capable of dissociating an electrolyte salt. Therefore, in the case of using a polymer compound having ionic conductivity, the polymer compound is also contained in the solvent.

TABLE 5

Organic solvent: EC/PC 1/1 by mass ratio
Lithium salt configuring a non-aqueous electrolyte solution: $LiPF_6$ 1.0 mol/liter

TABLE 6

Organic solvent: EC/DMC 3/5 by mass ratio
Lithium salt configuring a non-aqueous electrolyte solution: $LiPF_6$ 1.0 mol/liter In the case of preparing a non-aqueous electrolyte solution, a first compound, a second compound, a third compound, and other materials are mixed and stirred. As the first compound, for example, bis(fluorosulfonyl)imide lithium (LiFSI) or bis(trifluoromethylsulfonyl)imide lithium (LiTFSI) is used. In addition, as the second compound, for example, acetonitrile (AN), propionitrile (PN), or butyronitrile (BN) that is a non-oxygen-containing mononitrile compound, or methoxyacetonitrile (MAN) that is an oxygen-containing mononitrile compound is used. In addition, as the third compound, for example, vinylene carbonate (VC), vinyl ethylene carbonate (VEC), or methylene ethylene carbonate (MEC) that is an unsaturated cyclic carbonate, or 4-fluoro-1,3-dioxolan-2-one (FEC) or bis (fluoromethyl) carbonate (DFDMC) that is a halogenated carbonate, or succinonitrile (SN) that is a polynitrile compound is used. In addition, as other materials, for example, ethylene carbonate (EC) that is a cyclic carbonate, dimethyl carbonate (DMC) that is a chain carbonate, lithium hexafluorophosphate (LiPF$_6$) that is an electrolyte salt, and/or lithium tetrafluoroborate (LiBF$_4$) is used. However, the electrolyte is not limited to such a composition.

A lithium-ion secondary battery can be manufactured based on the following procedures, for example.

First, as described above, the positive electrode active material layer 22B is formed on both surfaces of the positive electrode current collector 22A, and the negative electrode active material layer 24B is formed on both surfaces of the negative electrode current collector 24A.

Thereafter, the positive electrode lead portion 23 is attached to the positive electrode current collector 22A using a welding method or the like. In addition, the negative electrode lead portion 25 is attached to the negative electrode current collector 24A using a welding method or the like. Then, the positive electrode member 22 and the negative electrode member 24 are laminated with the separator 26, which is formed of a microporous polyethylene film having a thickness of 20 µm, interposed therebetween and wound (more specifically, the electrode structure (laminate structure) of positive electrode member 22/separator 26/negative electrode member 24/separator 26 is wound) to manufacture the electrode structure 21, and then a protective tape (not shown) is attached to the outermost peripheral portion. Thereafter, the center pin 18 is inserted into the center of the electrode structure 21. Then, the electrode structure 21 is housed inside the electrode structure housing member (battery can) 11 while interposing the electrode structure 21 between the pair of insulating plates 12 and 13. In this case, using a welding method or the like, a distal end portion of the positive electrode lead portion 23 is attached to the safety valve mechanism 15 and a distal end portion of the negative electrode lead portion 25 is attached to the electrode structure housing member 11. Thereafter, an organic electrolyte or a non-aqueous electrolyte solution is injected based on a decompression method, so that the separator 26 is impregnated with the organic electrolyte or the non-aqueous electrolyte solution. Then, the battery lid 14, the safety valve mechanism 15, and the heat-sensitive resistance element 16 are crimped to the opening end portion of the electrode structure housing member 11 with the gasket 17 interposed therebetween.

Example 4

Figure 20:
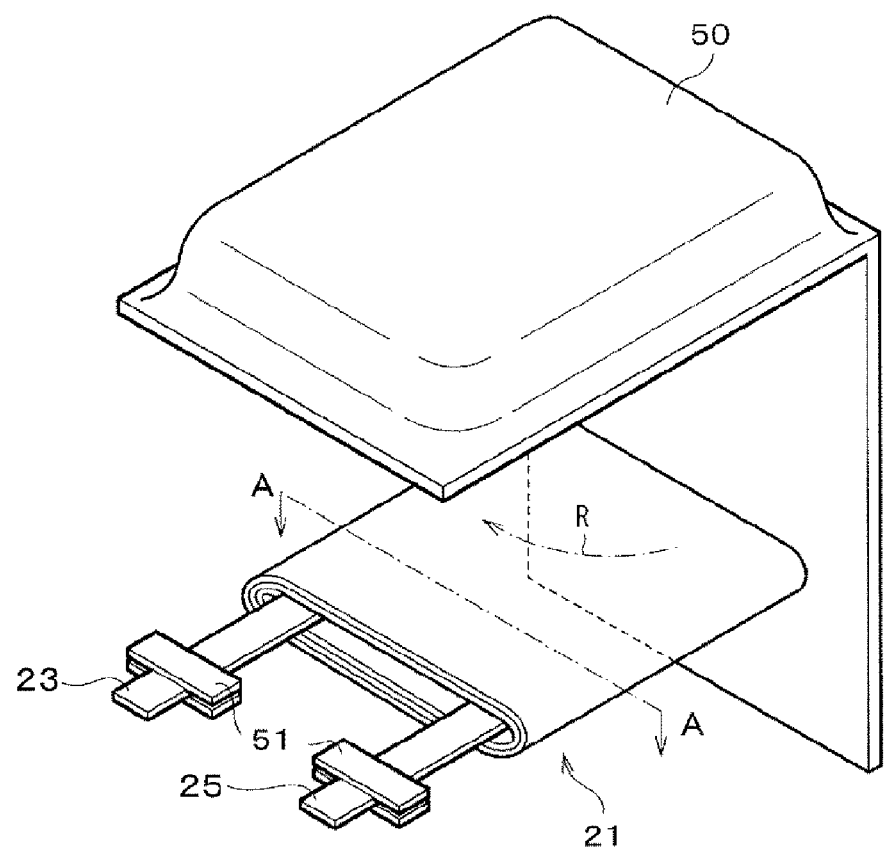
FIG. 20 is a schematic exploded perspective view of a laminate film type prismatic lithium-ion secondary battery of Example 4 according to an embodiment of the present disclosure.
Figure 21A:
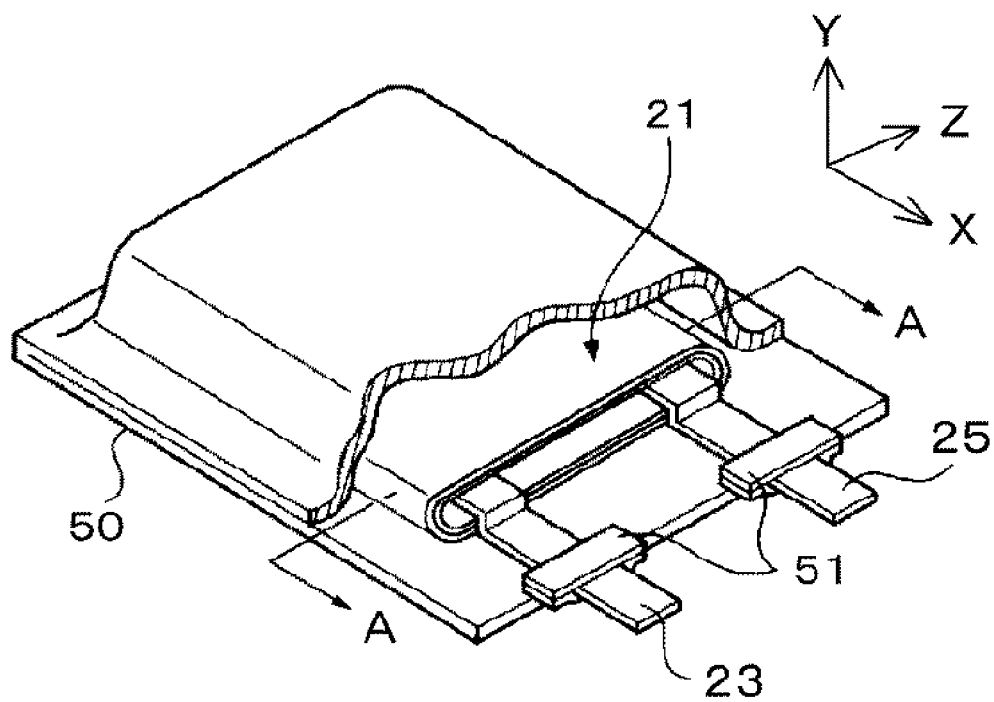
FIG. 21A is a schematic exploded perspective view of the laminate film type lithium-ion secondary battery of Example 4 in a state different from that shown in FIG. 20 according to an embodiment of the present disclosure.
Figure 21B:
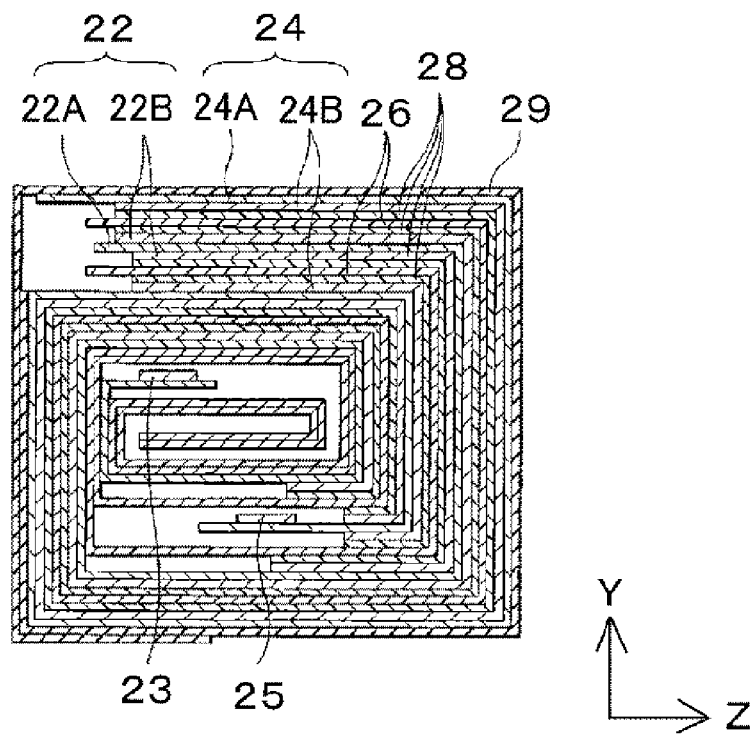
FIG. 21B is a schematic cross-sectional view of an electrode structure in the laminate film type lithium-ion secondary battery of Example 4 taken along the arrow A-A in FIGS. 20 and 21A.

In Example 4, a lithium-ion secondary battery is a flat laminate film type lithium-ion secondary battery, and a positive electrode member, a separator, and a negative electrode member are wound. FIGS. 20 and 21A are schematic exploded perspective views of the secondary battery of Example 4, and FIG. 21B shows a schematic enlarged cross-sectional view along the arrow A-A of the electrode structure (laminate structure) shown in FIG. 21A (schematic enlarged cross-sectional view along the YZ plane). In addition, the schematic partial cross-sectional view (schematic partial cross-sectional view along the XY plane) in which a part of the electrode structure shown in FIG. 21B is enlarged is the same as that shown in FIG. 19.

In the secondary battery of Example 4, the electrode structure 21 that is basically the same as that of Example 1 is housed inside an exterior member 50 formed of a laminate film. The electrode structure 21 can be manufactured by laminating the positive electrode member 22 and the negative electrode member 24 with the separator 26 and an electrolyte layer 28 interposed therebetween and then winding the laminate structure. The positive electrode lead portion 23 is attached to the positive electrode member 22, and the negative electrode lead portion 25 is attached to the negative electrode member 24. The outermost peripheral portion of the electrode structure 21 is protected by a protective tape 29.

The positive electrode lead portion 23 and the negative electrode lead portion 25 protrude in the same direction from the inside of the exterior member 50 toward the outside. The positive electrode lead portion 23 is formed of a conductive material, such as aluminum. The negative electrode lead portion 25 is formed of a conductive material, such as copper, nickel, and/or stainless steel. Each of these conductive materials has, for example, a thin plate shape or a mesh shape.

The exterior member 50 is a single film that can be folded in the direction of the arrow R shown in FIG. 20, and a recess (emboss) for housing the electrode structure 21 is provided in a part of the exterior member 50. The exterior member 50 is, for example, a laminate film in which a fusion layer, a metal layer, and a surface protection layer are laminated in this order. In the manufacturing process of the lithium-ion secondary battery, the exterior member 50 is folded so that fusion layers face each other with the electrode structure 21 interposed therebetween, and then the outer peripheral edge portions of the fusion layers are fused. However, the exterior member 50 may be formed by bonding two laminate films to each other with an adhesive or the like interposed therebetween. The fusion layer is formed of, for example, a film such as polyethylene and/or polypropylene. The metal layer is formed of, for example, aluminum foil. The surface protection layer is formed of, for example, nylon and/or polyethylene terephthalate. Among these, the exterior member 50 is preferably an aluminum laminate film in which a polyethylene film, an aluminum foil, and a nylon film are laminated in this order. However, the exterior member 50 may be a laminate film having another laminate structure, may be a polymer film such as polypropylene, or may be a metal film. Specifically, the exterior member 50 may be a moisture-resistant aluminum laminate film (total thickness of 100 µm) in which a nylon film (thickness of 30 µm), an aluminum foil (thickness of 40 µm), and an unstretched polypropylene film (thickness 30 µm) are laminated in this order from the outside.

In order to prevent intrusion of outside air, an adhesive film 51 is inserted between the exterior member 50 and the positive electrode lead portion 23 and between the exterior member 50 and the negative electrode lead portion 25. The adhesive film 51 is a material having adhesion to the positive electrode lead portion 23 and the negative electrode lead portion 25, for example, a polyolefin resin. More specifically, the adhesive film 51 is formed of a polyolefin resin, such as polyethylene, polypropylene, modified polyethylene, and/or modified polypropylene.

As shown in FIG. 21B, the positive electrode member 22 has a positive electrode active material layer 22B on one surface or both surfaces of the positive electrode current collector 22A. In addition, the negative electrode member 24 has a negative electrode active material layer 24B on one or both surfaces of the negative electrode current collector 24A.

Example 5

In Example 5, an application example of the present disclosure will be described.

The charging device and the charging method of the present disclosure according to the first and second aspects of the present disclosure described in Examples 1 to 4 can be applied without being particularly limited to lithium-ion secondary batteries used in a machine, equipment, an instrument, an apparatus, and a system (a collection of multiple equipment) that can use a secondary battery as a power source for driving and operation or as a power storage source for power storage. The lithium-ion secondary battery used as a power source may be a main power source (a power source used preferentially), or an auxiliary power source (a power source used in place of or switched from the main power source). In a case where the lithium-ion secondary battery is used as an auxiliary power source, the main power source is not limited to the lithium-ion secondary battery.

As applications of the lithium-ion secondary battery, specifically, it is possible to exemplify the driving of video cameras or camcorders, digital still cameras, mobile phones, personal computers, television receivers, various display devices, cordless phones, headphone stereos, music players, portable radios, electronic papers such as electronic books and electronic newspapers, and various electronic devices such as portable information terminals including PDAs, and electric devices (including portable electronic devices); toys; portable living equipment such as electric shavers; lighting equipment such as room lights; medical electronic devices such as pacemakers or hearing aids; storage devices such as memory cards; battery packs used in personal computers and the like as removable power supplies; power tools such as power drills or power saws; power supply systems and power storage systems or home energy servers (home power storage devices) such as home battery systems that store power in case of emergency or the like; power storage units or backup power supplies; electric vehicles such as electric cars, electric motorcycles, electric bicycles, and Segway (registered trademark); and power/driving force conversion devices (specifically, for example, power motors) for aircrafts or ships. However, the present disclosure is not limited to these applications.

Among these, it is effective that the lithium-ion secondary battery in the present disclosure is applied to battery packs, electric vehicles, power storage systems, power supply systems, electric tools, electronic devices, electric devices, and the like. Since excellent battery characteristics are required, it is possible to effectively improve performance by applying the present disclosure to the lithium-ion secondary battery. The battery pack is a power source using a lithium-ion secondary battery, and is a so-called assembled battery or the like. The electric vehicle is a vehicle that operates (travels) using a lithium-ion secondary battery as a driving power source, and may be a vehicle (hybrid vehicle or the like) including a driving source other than the secondary battery. The power storage system (power supply system) is a system that uses a lithium-ion secondary battery as a power storage source. For example, in a household power storage system (power supply system), power is stored in a lithium-ion secondary battery that is a power storage source. Therefore, it is possible to use household electric appliances and the like using the power. The electric tool is a tool whose movable unit (for example, a drill) moves using a lithium-ion secondary battery as a driving power source. The electronic device or the electric device is a device that realizes various functions using a lithium-ion secondary battery as an operating power source (power supply source).

Hereinafter, some application examples of the lithium-ion secondary battery will be specifically described. In addition, the configuration of each application example described below is merely an example, and the configuration can be appropriately changed.

The battery pack is a simple battery pack (so-called soft pack) using one lithium-ion secondary battery, and is mounted on, for example, an electronic device represented by a smartphone. Alternatively, the battery pack includes an assembled battery configured to include six lithium-ion secondary batteries connected in two parallel three series. In addition, the connection form of the lithium-ion secondary batteries may be series, parallel, or mixture of both.

Figure 22:
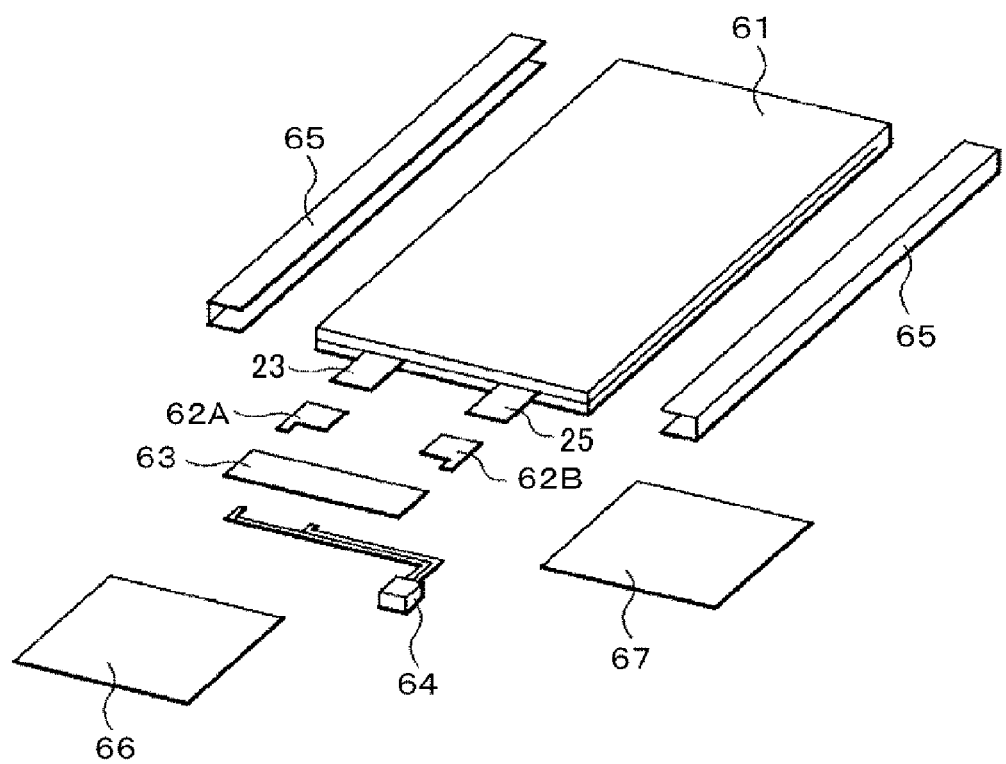
FIG. 22 is a schematic exploded perspective view of an application example (battery pack: single cell) in which the present disclosure in Examples 1 to 4 is applied to a lithium-ion secondary battery according to an embodiment of the present disclosure.

FIG. 22 shows a schematic perspective view of a disassembled battery pack using single cells. The battery pack is a simple battery pack (so-called soft pack) using one lithium-ion secondary battery, and is mounted on, for example, an electronic device represented by a smartphone. The battery pack includes, for example, a power source 61 formed of a lithium-ion secondary battery described in Example 4 and a circuit board 63 connected to the power source 61. The positive electrode lead portion 23 and the negative electrode lead portion 25 are attached to the power source 61.

A pair of adhesive tapes 65 are attached to both side surfaces of the power source 61. A protection circuit (PCM: Protection Circuit Module) is provided on the circuit board 63. The circuit board 63 is connected to the positive electrode lead portion 23 with a tab 62A interposed therebetween, and is connected to the negative electrode lead portion 25 with a tab 62B interposed therebetween. In addition, a lead wire 64 with a connector for external connection is connected to the circuit board 63. In a state where the circuit board 63 is connected to the power source 61, the circuit board 63 is protected from above and below by a label 66 and an insulating sheet 67. By attaching the label 66, the circuit board 63 and the insulating sheet 67 are fixed. The charging device described in each of Examples 1 and 2 is mounted on the circuit board 63. Alternatively, in some cases, a power management integrated circuit mounted on a smartphone can be made to function as the charging device described in each of Examples 1 and 2. That is, the power management integrated circuit may be operated by software that can function as the charging device described in each of Examples 1 and 2.

Figure 23A:
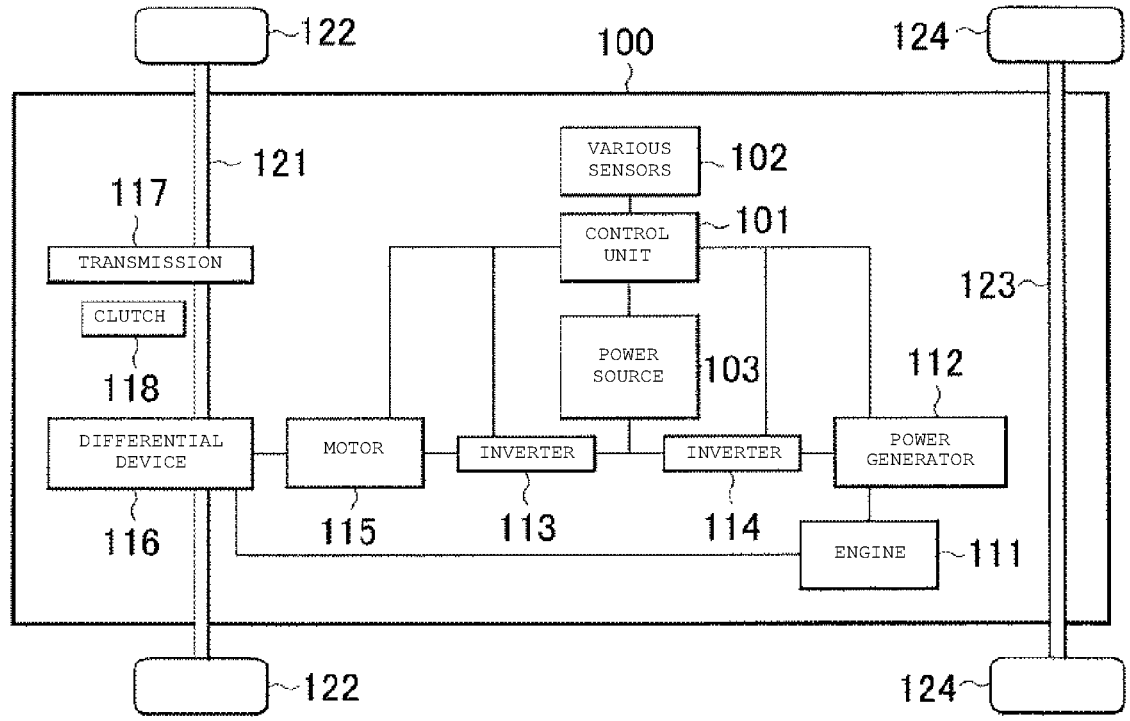
FIGS. 23A, 23B, and 23C are a block diagram showing the configuration of an application example (electric vehicle) of the present disclosure in Example 5, a block diagram showing the configuration of an application example (power storage system) of the present disclosure in Example 5, and a block diagram showing the configuration of an application example (electric tool) of the present disclosure in Example 5, respectively according to an embodiment of the present disclosure.

Next, FIG. 23A shows a block diagram illustrating the configuration of an electric vehicle, such as a hybrid vehicle that is an example of the electric vehicle. The electric vehicle includes, for example, a control unit 101, various sensors 102, a power source 103, an engine 111, a power generator 112, inverters 113 and 114, a driving motor 115, a differential device 116, a transmission 117, and a clutch 118 inside a metal casing 100. In addition, the electric vehicle includes, for example, a front wheel drive shaft 121 connected to the differential device 116 or the transmission 117, a front wheel 122, a rear wheel drive shaft 123, and a rear wheel 124.

The electric vehicle can travel using either the engine 111 or the motor 115 as a driving source, for example. The engine 111 is a main power source, for example, a gasoline engine. In a case where the engine 111 is used as a power source, the driving force (rotational force) of the engine 111 is transmitted to the front wheel 122 or the rear wheel 124 through the differential device 116, the transmission 117, and the clutch 118 that are driving units, for example. The rotational force of the engine 111 is also transmitted to the power generator 112, and the power generator 112 generates AC power using the rotational force. The AC power is converted into DC power through the inverter 114 and stored in the power source 103. On the other hand, in a case where the motor 115 that is a conversion unit is used as a power source, power (DC power) supplied from the power source 103 is converted into AC power through the inverter 113, and the motor 115 is driven using the AC power. The driving force (rotational force) converted from power by the motor 115 is transmitted to the front wheel 122 or the rear wheel 124 through the differential device 116, the transmission 117, and the clutch 118 that are driving units, for example.

When the electric vehicle decelerates through a braking mechanism (not shown), the resistance force at the time of deceleration may be transmitted to the motor 115 as a rotational force, and the motor 115 may generate AC power using the rotational force. The AC power is converted into DC power through the inverter 113, and the DC regenerative power is stored in the power source 103.

The control unit 101 controls the operation of the entire electric vehicle, and includes, for example, a CPU and the like, and also includes the charging device described in each of Examples 1 and 2. The power source 103 includes one or more lithium-ion secondary batteries (not shown) described in Example 3 or 4. The power source 103 can be configured to be connected to an external power source and accumulate power by receiving power supplied from the external power source. The various sensors 102 are used, for example, to control the rotation speed of the engine 111 and to control the opening (throttle opening) of a throttle valve (not shown). The various sensors 102 include, for example, a speed sensor, an acceleration sensor, an engine speed sensor, and the like.

In addition, although the case where the electric vehicle is a hybrid vehicle has been described, the electric vehicle may be a vehicle (electric vehicle) that operates using only the power source 103 and the motor 115 without using the engine 111.

Figure 23B:
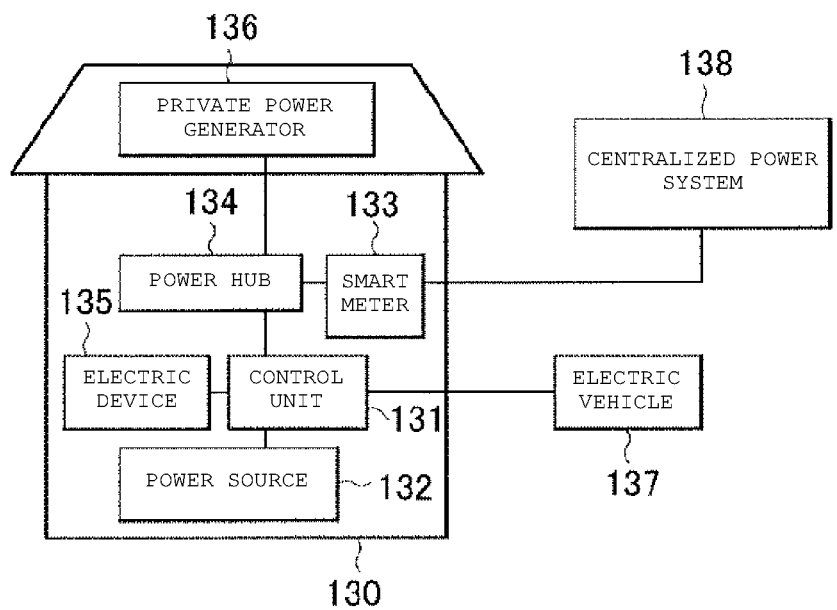

Next, FIG. 23B shows a block diagram showing the configuration of a power storage system (power supply system). The power storage system includes, for example, a control unit 131, a power source 132, a smart meter 133, and a power hub 134 inside a house 130, such as a general house and a commercial building.

The power source 132 is connected to an electric device (electronic device) 135 installed inside the house 130, and can be connected to an electric vehicle 137 stopped outside the house 130, for example. In addition, for example, the power source 132 is connected to a private power generator 136 installed in the house 130 through the power hub 134, and can be connected to an external centralized power system 138 through the smart meter 133 and the power hub 134. The electric device (electronic device) 135 includes, for example, one or more home appliances. As the home appliance, for example, a refrigerator, an air conditioner, a television receiver, and a water heater can be mentioned. The private power generator 136 is, for example, a solar power generator or a wind power generator. Examples of the electric vehicle 137 include an electric vehicle, a hybrid vehicle, an electric motorcycle, an electric bicycle, and Segway (registered trademark). Examples of the centralized power system 138 include a commercial power source, a power generation device, a power transmission network, and a smart grid (next-generation power transmission network). In addition, for example, a thermal power plant, a nuclear power plant, a hydroelectric power plant, and a wind power plant can be mentioned. As the power generation device provided in the centralized power system 138, various solar cells, fuel cells, wind power generation devices, micro hydropower generation devices, geothermal power generation devices, and the like can be exemplified. However, the present disclosure is not limited to these.

The control unit 131 controls the operation of the entire power storage system (including the usage state of the power source 132), and includes, for example, a CPU and the like, and also includes the charging device described in each of Examples 1 and 2. The power source 132 includes one or more lithium-ion secondary batteries (not shown) described in Example 3 or 4. The smart meter 133 is, for example, a network-compatible power meter installed in the house 130 on the power demand side, and can communicate with the power supply side. In addition, for example, the smart meter 133 can efficiently and stably supply energy by controlling the balance between supply and demand in the house 130 while communicating with the outside.

In this power storage system, for example, power is stored in the power source 132 from the centralized power system 138, which is an external power source, through the smart meter 133 and the power hub 134, and is stored in the power source 132 from the private power generator 136, which is an independent power source, through the power hub 134. Since the power stored in the power source 132 is supplied to the electric device (electronic device) 135 and the electric vehicle 137 according to an instruction from the control unit 131, the electric device (electronic device) 135 can be operated and the electric vehicle 137 can be charged. That is, the power storage system is a system that makes it possible to store and supply power in the house 130 using the power source 132.

The power stored in the power source 132 can be arbitrarily used. Therefore, for example, power can be stored in the power source 132 from the centralized power system 138 at midnight when the electricity charge is low, and the power stored in the power source 132 can be used during the day when the electricity charge is high.

The power storage system described above may be installed for each house (one household), or may be installed for a plurality of houses (a plurality of households).

Figure 23C:
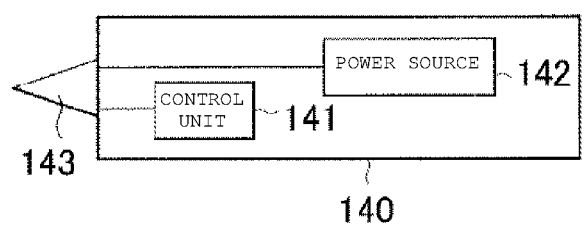

Next, FIG. 23C shows a block diagram showing the configuration of a power tool. The electric tool is, for example, an electric drill, and includes a control unit 141 and a power source 142 inside a tool main body 140 formed of a plastic material or the like. For example, a drill unit 143 that is a movable unit is rotatably attached to the tool main body 140. The control unit 141 controls the operation of the electric tool (including the usage state of the power source 142), and includes, for example, a CPU and the like, and also includes the charging device described in each of Examples 1 and 2. The power source 142 includes one or more lithium-ion secondary batteries (not shown) described in Example 3 or 4. The control unit 141 supplies power from the power source 142 to the drill unit 143 according to an operation on an operation switch (not shown).

Although the present disclosure has been described based on the preferred examples, the present disclosure is not limited to these examples, and various modifications can be made. The charging devices and the charging methods described in the examples are examples, and can be appropriately changed. The electrode structure may be stacked as well as wound.

Hereinafter, a positive electrode member, a negative electrode member, a positive electrode active material, a negative electrode active material, a binder, a conductive agent, a separator, and a non-aqueous electrolyte solution that configure a lithium-ion secondary battery will be described.

The electrolyte layer 28 contains a non-aqueous electrolyte solution and a holding polymer compound, and the non-aqueous electrolyte solution can be held by the holding polymer compound. Since such an electrolyte layer 28 is a gel type electrolyte, high ionic conductivity (for example, 1 mS/cm or more at room temperature) is obtained, and the leakage of a non-aqueous electrolyte solution is prevented. The electrolyte layer 28 may further contain other materials, such as an additive.

The following Table 7 can be exemplified as the composition of a non-aqueous electrolyte solution.

TABLE 7

| |
|---|
| Organic solvent: EC/PC 1/1 by mass ratio |
| Lithium salt configuring a non-aqueous electrolyte solution: $LiPF_6$ 1.0 mol/liter |
| Other additives: Vinylene carbonate (VC) 1% by mass |

In addition, in the electrolyte layer 28 that is a gel type electrolyte, the solvent of the non-aqueous electrolyte solution is a broad concept including not only a liquid material but also an ion conductive material capable of dissociating an electrolyte salt. Therefore, in the case of using a polymer compound having ionic conductivity, the polymer compound is also contained in the solvent. Instead of the gel type electrolyte layer 28, the non-aqueous electrolyte solution may be used as it is. In this case, the electrode structure 21 is impregnated with the non-aqueous electrolyte solution.

Specifically, in the case of forming the electrolyte layer 28, first, a non-aqueous electrolyte solution is prepared. Then, the non-aqueous electrolyte solution, a holding polymer compound, and an organic solvent (dimethyl carbonate) are mixed to prepare a sol type precursor solution. As the holding polymer compound, a copolymer of hexafluoropropylene and vinylidene fluoride (copolymerization amount of hexafluoropropylene=6.9% by mass) is used. Then, after applying the precursor solution onto the positive electrode member 22 and the negative electrode member 24, the precursor solution is dried to form the gel type electrolyte layer 28.

A lithium-ion secondary battery including the gel type electrolyte layer 28 can be manufactured based on, for example, the following three types of procedures.

In the first procedure, first, the positive electrode active material layer 22B is formed on both surfaces of the positive electrode current collector 22A, and the negative electrode active material layer 24B is formed on both surfaces of the negative electrode current collector 24A. On the other hand, a non-aqueous electrolyte solution, a holding polymer compound, and an organic solvent are mixed to prepare a sol type precursor solution. Then, after applying the precursor solution onto the positive electrode member 22 and the negative electrode member 24, the precursor solution is dried to form the gel type electrolyte layer 28. Thereafter, using a welding method or the like, the positive electrode lead portion 23 is attached to the positive electrode current collector 22A, and the negative electrode lead portion 25 is attached to the negative electrode current collector 24A. Then, the positive electrode member 22 and the negative electrode member 24 are laminated with the separator 26, which is formed of a microporous polypropylene film having a thickness of 26 μm, interposed therebetween and wound to manufacture the electrode structure 21, and then the protective tape 29 is attached to the outermost peripheral portion. Then, after folding the exterior member 50 so as to surround the electrode structure 21, the outer peripheral edge portions of the exterior member 50 are bonded to each other using a heat sealing method or the like, so that the electrode structure 21 is sealed inside the exterior member 50. In addition, the adhesive film (acid-modified propylene film having a thickness of 50 μm) 51 is inserted between the positive electrode lead portion 23 and the negative electrode lead portion 25 and the exterior member 50.

Alternatively, in the second procedure, first, the positive electrode member 22 and the negative electrode member 24 are manufactured. Then, the positive electrode lead portion 23 is attached to the positive electrode member 22, and the negative electrode lead portion 25 is attached to the negative electrode member 24. Thereafter, the positive electrode member 22 and the negative electrode member 24 are laminated with the separator 26 interposed therebetween and wound to manufacture a wound body that is a precursor of the electrode structure 21, and then the protective tape 29 is attached to the outermost peripheral portion of the wound body. Then, after folding the exterior member 50 so as to surround the wound body, remaining outer peripheral edge portions excluding the outer peripheral edge portion on one side of the exterior member 50 are bonded using a heat sealing method or the like, so that the wound body is housed inside the bag-shaped exterior member 50. On the other hand, a non-aqueous electrolyte solution, a monomer that is a raw material of a polymer compound, a polymerization initiator, and other materials such as a polymerization inhibitor as necessary are mixed to prepare an electrolyte composition. Then, after injecting the electrolyte composition into the bag-shaped exterior member 50, the exterior member 50 is sealed using a heat sealing method or the like. Thereafter, the monomer is thermally polymerized to form a polymer compound. As a result, the gel type electrolyte layer 28 is formed.

Alternatively, in the third procedure, a wound body is manufactured and housed inside the bag-shaped exterior member 50 in the same manner as in the second procedure except that the separator 26 whose both surfaces are coated with a polymer compound is used. The polymer compound applied onto the separator 26 is, for example, a polymer (homopolymer, copolymer, or multi-component copolymer) containing vinylidene fluoride as a component. Specifically, polyvinylidene fluoride, binary copolymers containing vinylidene fluoride and hexafluoropropylene as components, or ternary copolymers containing vinylidene fluoride, hexafluoropropylene, and chlorotrifluoroethylene as components can be used. One or two or more other polymer compounds may be used together with the polymer containing vinylidene fluoride as a component. Thereafter, a non-aqueous electrolyte solution is prepared and injected into the exterior member 50, and then the cavity of the exterior member 50 is sealed using a heat sealing method or the like.

Then, the exterior member 50 is heated while applying a load, so that the separator 26 is brought into close contact with the positive electrode member 22 and the negative electrode member 24 through the polymer compound. As a result, the non-aqueous electrolyte solution is impregnated into the polymer compound, and the polymer compound is gelled to form the electrolyte layer 28.

In the third procedure, the swelling of the lithium-ion secondary battery is suppressed more than in the first procedure. In addition, in the third procedure, compared with the second procedure, a solvent and a monomer that is a raw material of the polymer compound hardly remain in the electrolyte layer 28, so that the polymer compound forming process is satisfactorily controlled. Therefore, the positive electrode member 22, the negative electrode member 24, the separator 26, and the electrolyte layer 28 are sufficiently in close contact with each other.

The positive electrode member 22 can also be manufactured based on the following method. That is, first, lithium carbonate ($Li_2CO_3$) and cobalt carbonate ($CoCO_3$) are mixed, and then the mixture is fired in an air atmosphere (900° C.×5 hours) to obtain a lithium-containing composite oxide ($LiCoO_2$).

In this case, the mixing ratio is set to, for example, $Li_2CO_3:CoCO_3=0.5:1$ in terms of a molar ratio. Then, 91 parts by mass of the positive electrode active material ($LiCoO_2$), 3 parts by mass of the positive electrode binder (polyvinylidene fluoride), and 6 parts by mass of the positive electrode conductive agent (graphite) are mixed to obtain a positive electrode mixture. Then, the positive electrode mixture is mixed with an organic solvent (N-methyl-2-pyrrolidone) to obtain a paste-like positive electrode mixture slurry. Thereafter, the positive electrode mixture slurry is applied onto both surfaces of the strip-shaped positive electrode current collector 22A using a coating apparatus, and then the positive electrode mixture slurry is dried to form the positive electrode active material layer 22B. Then, the positive electrode active material layer 22B is compression-molded using a roll press.

The negative electrode member 24 can also be manufactured based on the following method. First, 97 parts by mass of a negative electrode active material (graphite) and 3 parts by mass of a negative electrode binder (polyvinylidene fluoride) are mixed to obtain a negative electrode mixture. The average particle diameter $d_{50}$ of graphite is set to 20 μm. In addition, as a negative electrode binder, for example, a mixture of 1.5 parts by mass of an acrylic modified styrene-butadiene copolymer and 1.5 parts by mass of carboxymethyl cellulose is used. Then, the negative electrode mixture is mixed with water to obtain a paste-like negative electrode mixture slurry. Thereafter, the negative electrode mixture slurry is applied onto both surfaces of the strip-shaped negative electrode current collector 24A using a coating apparatus, and then the negative electrode mixture slurry is dried to form the negative electrode active material layer 24B. Then, the negative electrode active material layer 24B is compression-molded using a roll press.

Alternatively, a negative electrode active material (silicon) and a negative electrode binder precursor (polyamic acid) can be mixed to form a negative electrode mixture. In this case, the mixing ratio is set to silicon:polyamic acid=80:20 in terms of a dry mass ratio. The average particle diameter $d_{50}$ of silicon is set to 1 μm. As a solvent for the polyamic acid, N-methyl-2-pyrrolidone and N,N-dimethylacetamide are used. In addition, after compression molding, the negative electrode mixture slurry is heated in a vacuum atmosphere under conditions such as 100° C. and 12 hours. As a result, polyimide that is a negative electrode binder is formed.

In the positive electrode member, a positive electrode active material layer is formed on one surface or both surfaces of the positive electrode current collector.

As materials configuring the positive electrode current collector, for example, copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), and/or palladium (Pd), alloys containing any of these, or conductive materials such as stainless steel can be exemplified. The positive electrode active material layer contains the positive electrode material described above as a positive electrode active material. The positive electrode active material layer may further contain a positive electrode binder and/or a positive electrode conductive agent. As a form of the positive electrode current collector or the negative electrode current collector described below, a foil-like material, a nonwoven fabric-like material, a mesh-like material, and a porous sheet-like material can be exemplified.

In the negative electrode member, a negative electrode active material layer is formed on one surface or both surfaces of the negative electrode current collector.

As materials configuring the negative electrode current collector, for example, copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), and/or palladium (Pd), alloys containing any of these, or conductive materials such as stainless steel can be exemplified. The surface of the negative electrode current collector is preferably roughened from the viewpoint of improving the adhesion of the negative electrode active material layer to the negative electrode current collector based on the so-called anchor effect. In this case, at least the surface of the region of the negative electrode current collector on which the negative electrode active material layer is to be formed may be roughened. Examples of the roughening method include a method of forming fine particles using electrolytic treatment. The electrolytic treatment is a method of providing irregularities on the surface of the negative electrode current collector by forming fine particles on the surface of the negative electrode current collector using an electrolysis method in an electrolytic cell. Alternatively, the negative electrode member can be formed of a lithium foil, a lithium sheet, or a lithium plate. The negative electrode active material layer contains, as a negative electrode active material, a negative electrode material capable of occluding and releasing lithium. The negative electrode active material layer may further contain a negative electrode binder and/or a negative electrode conductive agent. The negative electrode binder and the negative electrode conductive agent can be the same as the positive electrode binder and the positive electrode conductive agent.

Examples of the material configuring the negative electrode active material layer include a carbon material. Since a change in the crystal structure of the carbon material at the time of occlusion and release of lithium is very small, a high energy density can be stably obtained. In addition, since the carbon material also functions as a negative electrode conductive agent, the conductivity of the negative electrode active material layer is improved. Examples of the carbon material include easily graphitizable carbon (soft carbon), non-graphitizable carbon (hard carbon), graphite, and/or a highly crystalline carbon material having a developed crystal structure. However, the plane spacing of the (002) plane in the non-graphitizable carbon is preferably 0.37 nm or more, and the plane spacing of the (002) plane in the graphite is preferably 0.34 nm or less. More specifically, examples of the carbon material include pyrolytic carbons; cokes such as pitch coke, needle coke, and/or petroleum coke; graphites; glassy carbon fibers; organic polymer compound fired body that can be obtained by firing (carbonizing) a polymer compound, such as phenol resin and/or a furan resin, at an appropriate temperature; carbon fiber; activated carbon; carbon blacks; and polymers, such as polyacetylene. In addition, as other carbon materials, low crystalline carbon subjected to heat treatment at a temperature of about 1000° C. or lower can be mentioned, and amorphous carbon can also be mentioned. The shape of the carbon material may be fibrous, spherical, granular, and/or scaly.

Alternatively, examples of the material configuring the negative electrode active material layer include a material containing one or two or more of metal elements or metalloid elements as constituent elements (hereinafter, referred to as a "metal based material"). In this manner, it is possible to obtain a high energy density. The metal based material may be any of a simple substance, an alloy, and a compound, or may be a material containing two or more of these, or a material having a phase of one or two or more of these in at least a part. The alloy includes a material containing one or more metal elements and one or more metalloid elements in addition to a material containing two or more metal elements. In addition, the alloy may contain a nonmetallic element. Examples of the structure of the metal based material include a solid solution, a eutectic (eutectic mixture), an intermetallic compound, and a coexisting material of two or more of these.

Examples of the metal element and the metalloid element include a metal element and a metalloid element capable of forming an alloy together with lithium. Specifically, for example, magnesium (Mg), boron (B), aluminum (Al), gallium (Ga), indium (In), silicon (Si), germanium (Ge), tin (Sn), lead (Pb), Antimony (Sb), bismuth (Bi), cadmium (Cd), silver (Ag), zinc (Zn), hafnium (Hf), zirconium (Zr), yttrium (Y), palladium (Pd), and/or platinum (Pt) can be exemplified. Among these, silicon (Si) and/or tin (Sn) is preferable from the viewpoint that silicon (Si) and/or tin (Sn) has an excellent ability to occlude and release lithium and a significantly high energy density can be obtained.

Examples of the material containing silicon as a constituent element include a simple substance of silicon, a silicon alloy, or a silicon compound, or a material containing two or more of these may be used, or a material having a phase of one or two or more of these in at least a part may be used. Examples of the material containing tin as a constituent element include a simple substance of tin, a tin alloy, or a tin compound, or a material containing two or more of these may be used, or a material having a phase of one or two or more of these in at least a part may be used. The simple substance means a simple substance in a general sense, may contain a small amount of impurities, and does not necessarily mean 100% purity.

As elements other than silicon configuring a silicon alloy or a silicon compound, tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and/or chromium (Cr) can be mentioned, and carbon (C) and/or oxygen (O) can also be mentioned.

As silicon alloys or silicon compounds, specifically, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, SiC, $Si_3N_4$, $Si_2N_2O$, $SiO_v$ ($0<v\leq2$, preferably, $0.2<v<1.4$) and/or LiSiO can be exemplified.

As elements other than tin configuring a tin alloy or a tin compound, silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and/or chromium (Cr) can be mentioned, and carbon (C) and/or oxygen (O) can also be mentioned. As tin alloys or tin compounds, specifically, $SnO_w$ ($0<w\leq2$), $SnSiO_3$, LiSnO and/or $Mg_2Sn$ can be exemplified. In particular, it is preferable that the material containing tin as a constituent element is, for example, a material containing tin (first constituent element) and a second constituent element and a third constituent element (hereinafter, referred to as an "Sn-containing material"). Examples of the second constituent element include cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cesium (Ce), hafnium (Hf), tantalum (Ta), tungsten (W), bismuth (Bi), and/or silicon (Si). In addition, examples of the third constituent element include boron (B), carbon (C), aluminum (Al), and/or phosphorus (P). When the Sn-containing material contains the second constituent element and the third constituent element, high battery capacity, excellent cycle characteristics, and the like can be obtained.

Among these, the Sn-containing material is preferably a material containing tin (Sn), cobalt (Co), and carbon (C) as constituent elements (referred to as an "SnCoC-containing material"). In the SnCoC-containing material, for example, the carbon content is 9.9% by mass to 29.7% by mass, and the content ratio of tin and cobalt {Co/(Sn+Co)} is 20% by mass to 70% by mass.

This is because a high energy density can be obtained. The SnCoC-containing material has a phase containing tin, cobalt, and carbon, and the phase is preferably low crystalline or amorphous. Since this phase is a reaction phase capable of reacting with lithium, excellent characteristics can be obtained due to the presence of the reaction phase. The half-value width (diffraction angle 2θ) of the diffraction peak obtained by X-ray diffraction of this reaction phase is preferably 1° or more in a case where a CuKα ray is used as a specific X-ray and the drawing speed is 1°/minute. This is because lithium is occluded and released more smoothly and the reactivity with the non-aqueous electrolyte solution is reduced. The SnCoC-containing material may have a phase containing a simple substance or a part of each constituent element in addition to a low crystalline or amorphous phase.

Whether or not the diffraction peak obtained by X-ray diffraction corresponds to a reaction phase capable of reacting with lithium can be easily determined by comparing X-ray diffraction charts before and after the electrochemical reaction with lithium. For example, if the position of the diffraction peak changes before and after the electrochemical reaction with lithium, the diffraction peak obtained by X-ray diffraction corresponds to the reaction phase capable of reacting with lithium. In this case, for example, the diffraction peak of the low crystalline or amorphous reaction phase is observed in a range of 2θ=20° to 50°. Such a reaction phase contains, for example, the respective constituent elements described above, and is considered to be low crystallized or amorphous mainly due to the presence of carbon.

In the SnCoC-containing material, it is preferable that at least a part of carbon as a constituent element is bonded to a metal element or a metalloid element. This is because aggregation and crystallization of tin and the like are suppressed. The bonding state of elements can be checked by using, for example, X-ray photoelectron spectroscopy (XPS) using an Al-Kα ray, an Mg-Kα ray, or the like as a soft X-ray source. In a case where at least a part of carbon is bonded to a metal element, a metalloid element, or the like, the peak of a composite wave of the is orbit (Cis) of carbon appears in a region lower than 284.5 eV. In addition, it is assumed that the energy is calibrated so that the peak of the 4f orbit (Au4f) of the gold atom is obtained at 84.0 eV. At this time, since surface-contaminated carbon is usually present on the material surface, the peak of Cis of the surface-contaminated carbon is set to 284.8 eV, and the peak is used as an energy reference. In the XPS measurement, the waveform of the C1s peak is obtained in a form including the peak of surface-contaminated carbon and the peak of carbon in the SnCoC-containing material. Therefore, for example, analysis may be performed using commercially available software, so that both the peaks are separated from each other. In the waveform analysis, the position of the main peak present on the lowest bound energy side is used as the energy reference (284.8 eV).

The SnCoC-containing material is not limited to a material (SnCoC) whose constituent elements are only tin, cobalt, and carbon. For example, in addition to tin, cobalt, and carbon, the SnCoC-containing material may contain one or two or more of silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), and/or bismuth (Bi) as constituent elements.

In addition to the SnCoC-containing materials, a material containing tin, cobalt, iron, and carbon as constituent elements (hereinafter referred to as an "SnCoFeC-containing materials") is also a preferable material. The composition of the SnCoFeC-containing material is arbitrary. As an example, in a case where the iron content is set to be small, the carbon content is 9.9% by mass to 29.7% by mass, the iron content is 0.3% by mass to 5.9% by mass, and the content ratio of tin and cobalt {Co/(Sn+Co)} is 30% by mass to 70% by mass. In addition, in a case where the iron content is set to be large, the carbon content is 11.9% by mass to 29.7% by mass, the ratio of the content of tin, cobalt, and iron {(Co+Fe)/(Sn+Co+Fe)} is 26.4% by mass to 48.5% by mass, and the content ratio of cobalt and iron {Co/(Co+Fe)} is 9.9% by mass to 79.5% by mass. This is because a high energy density can be obtained in such a composition range. The physical properties (half-value width and the like) of the SnCoFeC-containing material are the same as the physical properties of the above-described SnCoC-containing material.

Alternatively, other examples of the material configuring the negative electrode active material layer include metal oxides such as an iron oxide, a ruthenium oxide, and/or a molybdenum oxide; and polymer compounds such as polyacetylene, polyaniline, and/or polypyrrole.

Among these, it is preferable that the material configuring the negative electrode active material layer contains both a carbon material and a metal based material for the following reasons. That is, the metal based material, in particular, a material containing at least one of silicon and tin as a constituent element has an advantage of high theoretical capacity, but easily expands and contracts violently during charging and discharging. On the other hand, the carbon material has a low theoretical capacity, but has an advantage that it is difficult to expand and contract during charging and discharging. Therefore, by using both the carbon material and the metal based material, expansion and contraction during charging and discharging is suppressed while obtaining a high theoretical capacity (in other words, battery capacity).

The positive electrode active material layer and/or the negative electrode active material layer can be formed based on, for example, a coating method. That is, the positive electrode active material layer and/or the negative electrode active material layer can be formed based on a method in which a particle (powder) positive electrode active material or negative electrode active material is mixed with a positive electrode binder, a negative electrode binder, or the like and then the mixture is dispersed in a solvent, such as an organic solvent, and applied to a positive electrode current collector or a negative electrode current collector (for example, a coating method using a spray). However, the coating method is not limited to such a method. In addition, without being limited to the coating method, for example, a negative electrode member can be obtained by molding a negative electrode active material, and a positive electrode member can be obtained by molding a positive electrode active material. For example, a press machine may be used for molding. Alternatively, the positive electrode active material layer and/or the negative electrode active material layer can be formed based on a vapor phase method, a liquid phase method, a thermal spraying method, and/or a firing method (sintering method). The vapor phase method includes PVD methods (physical vapor deposition methods), such as a vacuum deposition method, a sputtering method, an ion plating method, and/or a laser ablation method, and various CVD methods (chemical vapor deposition methods) including a plasma CVD method. Examples of the liquid phase method include an electrolytic plating method or an electroless plating method. The thermal spraying method is a method of spraying a molten or semi-molten positive electrode active material or negative electrode active material onto a positive electrode current collector or a negative electrode current collector. The firing method is, for example, a method in which a mixture dispersed in a solvent is applied to a negative electrode current collector using a coating method and then heat-treated at a temperature higher than the melting point of the negative electrode binder or the like, and an atmosphere firing method, a reaction firing method, and a hot press firing method can be mentioned.

Specifically, as the positive electrode binder and the negative electrode binder, styrene butadiene based rubbers such as styrene butadiene rubber (SBR), fluoro based rubbers, and/or synthetic rubbers such as ethylene propylene diene; fluorine based resins such as polyvinylidene fluoride (PVdF), polyvinyl fluoride, polyimide, polytetrafluoroethylene (PTFE), and/or ethylene tetrafluoroethylene (ETFE), and copolymers and modified products of these fluorine based resins; polyolefin based resins such as polyethylene and/or polypropylene; acrylic based resins such as polyacrylonitrile (PAN) and/or polyacrylic acid esters; and polymer materials such as carboxymethyl cellulose (CMC) can be exemplified, and at least one kind selected from copolymers mainly containing these resin materials and the like can also be exemplified. More specifically, examples of the copolymer of polyvinylidene fluoride include polyvinylidene fluoride-hexafluoropropylene copolymer, polyvinylidene fluoride-tetrafluoroethylene copolymer, polyvinylidene fluoride-chlorotrifluoroethylene copolymer, and/or polyvinylidene fluoride-hexafluoropropylene-tetrafluoroethylene copolymer. In addition, a conductive polymer may be used as a positive electrode binder and a negative electrode binder. As the conductive polymer, for example, substituted or unsubstituted polyaniline, polypyrrole, polythiophene, and (co) polymers formed of one or two or more selected from these can be used.

Examples of the positive electrode conductive agent and the negative electrode conductive agent include carbon materials such as graphite, carbon fiber, carbon black, carbon nanotube, vapor growth carbon fiber (VGCF), acetylene black (AB), and/or ketjen black (KB), and one or two or more of these can be used in combination. Examples of the carbon nanotube include a single wall carbon nanotube (SWCNT) and a multi-wall carbon nanotube (MWCNT), such as a double wall carbon nanotube (DWCNT). In addition, a metal material, a conductive polymer material, or the like may be used as long as the material has conductivity.

In order to prevent lithium from unintentionally precipitating on the negative electrode member during charging, it is preferable that the chargeable capacity of the negative electrode member is larger than the discharge capacity of the positive electrode member. That is, it is preferable that the electrochemical equivalent of the negative electrode material capable of occluding and releasing lithium is larger than the electrochemical equivalent of the positive electrode material. In addition, lithium that precipitates on the negative electrode member is, for example, lithium metal in a case where the electrode reactant is lithium.

The positive electrode lead portion can be attached to the positive electrode current collector based on spot welding or ultrasonic welding. The positive electrode lead portion is preferably a metal foil or a mesh-like one, but may not be a metal as long as the material is electrochemically and chemically stable and is conductive. Examples of the material of the positive electrode lead portion include aluminum (Al) and/or nickel (Ni). The negative electrode lead portion can be attached to the negative electrode current collector based on spot welding or ultrasonic welding.

The negative electrode lead portion is preferably a metal foil or a mesh-like one, but may not be a metal as long as the material is electrochemically and chemically stable and is conductive. Examples of the material of the negative electrode lead portion include copper (Cu) and/or nickel (Ni). The positive electrode lead portion or the negative electrode lead portion can also be a protruding portion when a part of the positive electrode current collector or the negative electrode current collector protrudes from the positive electrode current collector or the negative electrode current collector.

The separator separates the positive electrode member and the negative electrode member from each other, so that lithium ions pass therethrough while preventing a short circuit of current due to contact between the positive electrode member and the negative electrode member. The separator is, for example, a porous film formed of a synthetic resin such as polyolefin based resin (polypropylene resin or polyethylene resin), polyimide resin, polytetrafluoroethylene resin, polyvinylidene fluoride resin, polyphenylene sulfide resin, and/or aromatic polyamide; a porous film formed of ceramic; a glass fiber (for example, including a glass filter); and a non-woven fabric formed of liquid crystal polyester fiber, aromatic polyamide fiber, and/or cellulosic fiber or a non-woven fabric formed of ceramic. Among these, a porous film of polypropylene and/or polyethylene is preferable. Alternatively, the separator can be a laminate film in which two or more kinds of porous films are laminated, or can be a separator coated with an inorganic layer or an inorganic-containing separator. Among these, a porous film formed of a polyolefin based resin is preferable since this has an excellent short-circuit prevention effect and it is possible to improve battery safety due to a shutdown effect. Polyethylene resin is particularly preferable as a material configuring the separator since the shutdown effect can be obtained within a range of 100° C. or higher and 160° C. or lower and the polyethylene resin is excellent in electrochemical stability. In addition, a material obtained by copolymerizing or blending a resin having chemical stability with polyethylene or polypropylene can be used. Alternatively, a porous film may have, for example, a structure of three or more layers in which a polypropylene resin layer, a polyethylene resin layer, and a polypropylene resin layer are sequentially laminated. The thickness of the separator is preferably 5 µm or more and 50 µm or less, and more preferably 7 µm or more and 30 µm or less. If the separator is too thick, the amount of active material filling is reduced to lower the battery capacity, and the ionic conductivity is reduced to deteriorate the current characteristics. Conversely, if the separator is too thin, the mechanical strength of the separator is reduced.

In addition, the separator may have a structure in which a resin layer is provided on one side or both sides of a porous film as a base material. Examples of the resin layer include a porous matrix resin layer carrying an inorganic substance. Since oxidation resistance can be obtained by adopting such a structure, it is possible to suppress deterioration of the separator. Examples of the material configuring the matrix resin layer include polyvinylidene fluoride (PVdF), hexafluoropropylene (HFP), and/or polytetrafluoroethylene (PTFE), and copolymers thereof can also be used. Examples of the inorganic substance include a metal, a semiconductor, or an oxide or nitride thereof. For example, aluminum (Al) and/or titanium (Ti) can be mentioned as the metal, and silicon (Si) and/or boron (B) can be mentioned as the semiconductor. In addition, it is preferable that the inorganic substance is substantially non-conductive and has a large heat capacity. If the heat capacity is large, the inorganic substance is useful as a heat sink when heat is generated, and it is possible to suppress the thermal runaway of the battery more effectively. Examples of such an inorganic substance include alumina ($Al_2O_3$), boehmite (alumina monohydrate), talc, boron nitride (BN), aluminum nitride (AlN), oxides such as titanium dioxide ($TiO_2$) and/or silicon oxide, and/or nitrides. As the particle size of the inorganic substance, 1 nm to 10 µm can be mentioned. If the particle size of the inorganic substance is smaller than 1 nm, the inorganic substance is difficult to obtain, and it is not worth the cost even if the inorganic substance can be obtained. If the particle size of the inorganic substance is larger than 10 µm, the distance between electrodes becomes large. Therefore, since the amount of active material filling cannot be sufficiently obtained in a limited space, the battery capacity is reduced. The inorganic substance may be contained in a porous film as a base material. The resin layer can be obtained, for example, by applying a slurry formed of a matrix resin, a solvent, and an inorganic substance onto a base material (porous film), making the base material having a slurry applied thereonto pass through a poor solvent for the matrix resin and the good solvent bath for the solvent for phase separation, and then performing drying.

As the piercing strength of the separator, 100 gf to 1 kgf, preferably 100 gf to 480 gf can be mentioned. If the piercing strength is low, a short circuit may occur, and if the piercing strength is high, the ionic conductivity may be reduced. As the air permeability of the separator, 30 seconds/100 cc to 1000 seconds/100 cc, preferably 30 seconds/100 cc to 680 seconds/100 cc can be mentioned. If the air permeability is too low, a short circuit may occur, and if the air permeability is too high, the ionic conductivity may be reduced.

Examples of lithium salt configuring a non-aqueous electrolyte solution suitable for use in the lithium-ion secondary battery include $LiPF_6$, $LiClO_4$, $LiBF_4$, $LiAsF_6$, $LiSbF_6$, $LiTaF_6$, $LiNbF_6$, $LiSiF_6$, $LiAlCl_4$, $LiCF_3SO_3$, $LiCH_3SO_3$, $LiN(CF_3SO_2)_2$, $LiC(CF_3SO_2)_3$, $LiC_4F_9SO_3$, $Li(FSO_2)_2N$, $Li(CF_3SO_2)_2N$, $Li(C_2F_5SO_2)_2N$, $Li(CF_3SO_2)_3C$, $LiBF_3(C_2F_5)$, $LiB(C_2O_4)_2$, $LiB(C_6F_5)_4$, $LiPF_3(C_2F_5)_3$, ½$Li_2B_{12}F_{12}$, $Li_2SiF_6$, LiCl, LiBr, LiI, difluoro [oxolato-O, O'] lithium borate, and/or lithium bisoxalate borate. However, the lithium salt is not limited to these.

In addition, as the organic solvent, cyclic carbonates, such as ethylene carbonate (EC), propylene carbonate (PC) and/or butylene carbonate (BC), can be used, and it is preferable to use one of ethylene carbonate and propylene carbonate, or it is more preferable to use a mixture of both. In this manner, it is possible to improve the cycle characteristics. In addition, as a solvent, from the viewpoint of obtaining high ionic conductivity, these cyclic carbonates can also be used in combination with a chain carbonate, such as diethyl carbonate, dimethyl carbonate, ethylmethyl carbonate, or methylpropyl carbonate. Alternatively, the solvent may contain 2,4-difluoroanisole and/or vinylene carbonate. 2,4-difluoroanisole can improve the discharge capacity, and vinylene carbonate can improve the cycle characteristics. Therefore, it is preferable to use a mixture of these because the discharge capacity and the cycle characteristics can be improved.

Alternatively, examples of the organic solvent include: chain carbonate esters such as dimethyl carbonate (DMC), ethyl methyl carbonate (EMC), diethyl carbonate (DEC), dipropyl carbonate (DPC), propyl methyl carbonate (PMC), propyl ethyl carbonate (PEC), and/or fluoroethylene carbonate (FEC); cyclic ethers such as tetrahydrofuran (THF), 2-methyltetrahydrofuran (2-MeTHF), 1,3-dioxolane (DOL), and/or 4-methyl-1,3-dioxolane (4-MeDOL); chain esters such as 1,2-dimethoxyethane (DME) and/or 1,2-diethoxyethane (DEE); cyclic esters such as γ-butyrolactone (GBL) and/or γ-valerolactone (GVL); and chain esters such as methyl acetate, ethyl acetate, propyl acetate, methyl formate, ethyl formate, propyl formate, methyl butyrate, methyl propionate, ethyl propionate, and/or propyl propionate. Alternatively, examples of the organic solvent include: tetrahydropyran, 1,3-dioxane, 1,4-dioxane, N,N-dimethylformamide (DMF), N,N-dimethylacetamide (DMA), N-methylpyrrolidinone (NMP), N-methyloxazolidinone (NMO), N,N'-dimethylimidazolidinone (DMI), dimethyl sulfoxide (DMSO), trimethyl phosphate (TMP), nitromethane (NM), nitroethane (NE), sulfolane (SL), methyl sulfolane, acetonitrile (AN), anisole, propionitrile, glutaronitrile (GLN), adiponitrile (ADN), methoxyacetonitrile (MAN), 3-methoxypropionitrile (MPN), diethyl ether, butylene carbonate, 3-methoxypropironitrile, N,N-dimethylformamide, dimethyl sulfoxide, and/or trimethyl phosphate. Alternatively, an ionic liquid can be used. As the ionic liquid, a known one can be used, and may be selected as necessary.

The electrolyte layer can also be formed of a non-aqueous electrolyte solution and a holding polymer compound. The non-aqueous electrolyte solution is held by, for example, a holding polymer compound. Since the electrolyte layer in such a form is a gel type electrolyte or a solid type electrolyte, high ionic conductivity (for example, 1 mS/cm or more at room temperature) is obtained, and the leakage of a non-aqueous electrolyte solution is prevented. The electrolyte can be a liquid electrolyte, or can be a gel type electrolyte, or a solid type electrolyte.

As the holding polymer compound, specifically, polyacrylonitrile, polyvinylidene fluoride, polytetrafluoroethylene, polyhexafluoropropylene, polyethylene oxide, polypropylene oxide, polyphosphazene, polysiloxane, polyvinyl fluoride (PVF), polychlorotrifluoroethylene (PCTFE), perfluoroalkoxy fluororesin (PFA), ethylene tetrafluoride-hexafluoropropylene copolymer (FEP), ethylene-tetrafluoroethylene copolymer (ETFE), ethylene-chlorotrifluoroethylene copolymer (ECTFE), polyvinyl acetate, polyvinyl alcohol, polymethyl methacrylate, polyacrylic acid, polymethacrylic acid, styrene-butadiene rubber, nitrile-butadiene rubber, polystyrene, polycarbonate, and/or vinyl chloride can be exemplified. These may be used alone or in combination. In addition, the holding polymer compound may be a copolymer. As the copolymer, specifically, polyvinylidene fluoride-hexafluoropropylene copolymer and the like can be exemplified. Among these, from the viewpoint of electrochemical stability, polyvinylidene fluoride is preferable as a homopolymer, and polyvinylidene fluoride-hexafluoropropylene copolymer is preferable as a copolymer. In addition, a filler may contain a compound having high heat resistance, such as $Al_2O_3$, $SiO_2$, $TiO_2$, and/or BN (boron nitride).

In addition, the present disclosure is further described according to an embodiment of the present disclosure.

[A01]<Charging Device: First Aspect>

A charging device for charging a lithium-ion secondary battery based on at least a constant voltage method, in which, before starting charging with a constant voltage or while performing charging with a constant voltage, a current pulse having a peak current value $i_1$ larger than a charge current value $i_0$ at that point in time is applied at least once.

[A02] The charging device described in [A01], in which the lithium-ion secondary battery is charged based on a constant current-constant voltage method, and a current pulse is applied before starting charging with a constant voltage after completing charging with a constant current.

[A03] The charging device described in [A01] or [A02], in which charging is performed without interruption.

[A04] The charging device described in any one of [A01] to [A03], in which $1<i_1/i_0\leq 10$ is satisfied.

[A05] The charging device described in any one of [A01] to [A04], in which a time during which a current pulse is applied is 0.01 seconds or more and 10 seconds or less.

[A06] The charging device described in any one of [A01] to [A05], in which the number of times of application of a current pulse is one.

[A07] The charging device described in any one of [A01] to [A06], in which, assuming that an impedance of the lithium-ion secondary battery and a charging end set current value when ending charging with a constant voltage after applying a current pulse are $Z_A$ and $I_{comp-A}$ and an impedance of the lithium-ion secondary battery and a charging end set current value when ending charging with a constant voltage in a case where no current pulse is applied are $Z_B$ and $I_{comp-B}$, $I_{comp-A}=(Z_B/Z_A)\times I_{comp-B}$ is satisfied.

[A08] The charging device described in any one of [A01] to [A06], in which, assuming that a charging end set current value when ending charging with a constant voltage after applying a current pulse is $I_{comp-A}$ and a charging end set current value when ending charging with a constant voltage in a case where no current pulse is applied is $I_{comp-B}$, $I_{comp-B}<I_{comp-A}\leq 5\times I_{comp-B}$ is satisfied.

[A09] The charging device described in any one of [A01] to [A06], in which, assuming that a charging end set time when ending charging with a constant voltage after applying a current pulse is $t_{comp-A}$ and a charging end set time when ending charging with a constant voltage in a case where no current pulse is applied is $t_{comp-B}$, $0.7 \times t_{comp-B} \leq t_{comp-A} < t_{comp-B}$ is satisfied.

[A10] The charging device described in any one of [A01] to [A09], in which the lithium-ion secondary battery contains a positive electrode material whose crystal structure is different between when the lithium-ion secondary battery is fully charged and when the lithium-ion secondary battery is fully discharged, and a change in the crystal structure of the positive electrode material according to charging and discharging is reversible.

[A11] The charging device described in any one of [A01] to [A09], in which the positive electrode material of the lithium-ion secondary battery contains $Li_xCoO_2$.

[B01]<Charging Device: Second Aspect>

A charging device for charging a lithium-ion secondary battery, in which a positive electrode material contains $Li_xCoO_2$, based on at least a constant voltage method, the device including: x value calculation means for calculating a value of x during charging of the lithium-ion secondary battery; and temperature measurement means for measuring a temperature of the positive electrode material during charging of the lithium-ion secondary battery, in which a point in time, at which a current pulse having a peak current value $i_1$ larger than a charge current value $i_0$ immediately before applying a current pulse is applied at least once, is determined based on the value of x calculated by the x value calculation means and a value of the temperature of the positive electrode material measured by the temperature measurement means.

[B02] The charging device described in [B01], in which charging is performed without interruption.

[B03] The charging device described in [B01] or [B02], in which $1 < i_1/i_0 \leq 10$ is satisfied.

[B04] The charging device described in any one of [B01] to [B03], in which a time during which a current pulse is applied is 0.01 seconds or more and 10 seconds or less.

[B05] The charging device described in any one of [B01] to [B04], in which the number of times of application of a current pulse is one.

[B06] The charging device described in any one of [B01] to [B05], in which, assuming that an impedance of the lithium-ion secondary battery and a charging end set current value when ending charging with a constant voltage after applying a current pulse are $Z_A$ and $I_{comp-A}$ and an impedance of the lithium-ion secondary battery and a charging end set current value when ending charging with a constant voltage in a case where no current pulse is applied are $Z_B$ and $I_{comp-B}$, $I_{comp-A} = (Z_B/Z_A) \times I_{comp-B}$ is satisfied.

[B07] The charging device described in any one of [B01] to [B05], in which, assuming that a charging end set current value when ending charging with a constant voltage after applying a current pulse is $I_{comp-A}$ and a charging end set current value when ending charging with a constant voltage in a case where no current pulse is applied is $I_{comp-B}$, $I_{comp-B} \leq I_{comp-A} \leq 5 \times I_{comp-B}$ is satisfied.

[B08] The charging device described in any one of [B01] to [B05], in which, assuming that a charging end set time when ending charging with a constant voltage after applying a current pulse is $t_{comp-A}$ and a charging end set time when ending charging with a constant voltage in a case where no current pulse is applied is $t_{comp-B}$, $0.7 \times t_{comp-B} \leq t_{comp-A} < t_{comp-B}$ is satisfied.

[C01]<Charging Method: First Aspect>

A charging method for charging a lithium-ion secondary battery based on at least a constant voltage method, the method including: before starting charging with a constant voltage or while performing charging with a constant voltage, applying a current pulse having a peak current value $i_1$ larger than a charge current value $i_0$ at that point at least once.

[C02] The charging method described in [C01], in which the lithium-ion secondary battery is charged based on a constant current-constant voltage method, and a current pulse is applied before starting charging with a constant voltage after completing charging with a constant current.

[C03] The charging method described in [C01] or [C02], in which charging is performed without interruption.

[C04] The charging method described in any one of [C01] to [C03], in which $1 < i_1/i_0 \leq 10$ is satisfied.

[C05] The charging method described in any one of [C01] to [C04], in which a time during which a current pulse is applied is 0.01 seconds or more and 10 seconds or less.

[C06] The charging method described in any one of [C01] to [C05], in which the number of times of application of a current pulse is one.

[C07] The charging method described in any one of [C01] to [C06], in which, assuming that an impedance of the lithium-ion secondary battery and a charging end set current value when ending charging with a constant voltage after applying a current pulse are $Z_A$ and $I_{comp-A}$ and an impedance of the lithium-ion secondary battery and a charging end set current value when ending charging with a constant voltage in a case where no current pulse is applied are $Z_B$ and $I_{comp-B}$, $I_{comp-A} = (Z_B/Z_A) \times I_{comp-B}$ is satisfied.

[C08] The charging method described in any one of [C01] to [C06], in which, assuming that a charging end set current value when ending charging with a constant voltage after applying a current pulse is $I_{comp-A}$ and a charging end set current value when ending charging with a constant voltage in a case where no current pulse is applied is $I_{comp-B}$, $I_{comp-B} \leq I_{comp-A} \leq 5 \times I_{comp-B}$ is satisfied.

[C09] The charging method described in any one of [C01] to [C06], in which, assuming that a charging end set time when ending charging with a constant voltage after applying a current pulse is $t_{comp-A}$ and a charging end set time when ending charging with a constant voltage in a case where no current pulse is applied is $t_{comp-B}$, $0.7 \times t_{comp-B} \leq t_{comp-A} < t_{comp-B}$ is satisfied.

[C10] The charging method described in any one of [C01] to [C09], in which the lithium-ion secondary battery contains a positive electrode material whose crystal structure is different between when the lithium-ion secondary battery is fully charged and when the lithium-ion secondary battery is fully discharged, and a change in the crystal structure of the positive electrode material according to charging and discharging is reversible.

[C11] The charging method described in any one of [C01] to [C09], in which the positive electrode material of the lithium-ion secondary battery contains $Li_xCoO_2$.

[D01]<Charging Method: Second Aspect>

A charging method for charging a lithium-ion secondary battery, in which a positive electrode material contains $Li_xCoO_2$, based on at least a constant voltage method, the method including: calculating a value of x and measuring a temperature of the positive electrode material during charging of the lithium-ion secondary battery; and determining a point in time, at which a current pulse having a peak current value $i_1$ larger than a charge current value $i_0$ immediately before applying a current pulse is applied at least once, based on the calculated value of x and a value of the measured temperature of the positive electrode material.

[D02] The charging method described in [D01], in which charging is performed without interruption.

[D03] The charging method described in [D01] or [D02], in which $1<i_1/i_0 \leq 10$ is satisfied.

[D04] The charging method described in any one of [D01] to [D03], in which a time during which a current pulse is applied is 0.01 seconds or more and 10 seconds or less.

[D05] The charging method described in any one of [D01] to [D04], in which the number of times of application of a current pulse is one.

[D06] The charging method described in any one of [D01] to [D05], in which, assuming that an impedance of the lithium-ion secondary battery and a charging end set current value when ending charging with a constant voltage after applying a current pulse are $Z_A$ and $I_{comp-A}$ and an impedance of the lithium-ion secondary battery and a charging end set current value when ending charging with a constant voltage in a case where no current pulse is applied are $Z_B$ and $I_{comp-B}$, $I_{comp-A}=(Z_B/Z_A) \times I_{comp-B}$ is satisfied.

[D07] The charging method described in any one of [D01] to [D05], in which, assuming that a charging end set current value when ending charging with a constant voltage after applying a current pulse is $I_{comp-A}$ and a charging end set current value when ending charging with a constant voltage in a case where no current pulse is applied is $I_{comp-B}$, $I_{comp-B}<I_{comp-A} \leq 5 \times I_{comp-B}$ is satisfied.

[D08] The charging method described in any one of [D01] to [D05], in which, assuming that a charging end set time when ending charging with a constant voltage after applying a current pulse is $t_{comp-A}$ and a charging end set time when ending charging with a constant voltage in a case where no current pulse is applied is $t_{comp-B}$, $0.7 \times t_{comp-B} \leq t_{comp-A} < t_{comp-B}$ is satisfied.

[E01]<<Battery Pack>>

A battery pack including a lithium-ion secondary battery, control means for controlling the lithium-ion secondary battery, and an exterior member in which the lithium-ion secondary battery is housed, in which the control means includes the charging device described in any one of [A01] to [B08].

[E02]<<Electric Vehicle>>

An electric vehicle including a conversion device that receives power supplied from a lithium-ion secondary battery and converts the power into a driving force of a vehicle and a control device that performs information processing relevant to vehicle control based on information regarding the lithium-ion secondary battery, in which the control device includes the charging device described in any one of [A01] to [B08].

[E03]<<Power Storage System>>

A power storage system including a lithium-ion secondary battery and the charging device described in any one of [A01] to [B08].

[E04]<<Electric Tool>>

An electric tool including a lithium-ion secondary battery, a movable unit that receives power supplied from the lithium-ion secondary battery, and the charging device described in any one of [A01] to [B08].

[E05]<<Electronic Device>>

An electronic device including a lithium-ion secondary battery and the charging device described in any one of [A01] to [B08].

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A charging device for charging a lithium-ion secondary battery based on at least a constant voltage method, wherein, before starting charging with a constant voltage or while performing charging with a constant voltage, a first current pulse having a peak current value $i_1$ larger than a charge current value $i_0$ is applied at least once, and wherein the lithium-ion secondary battery is charged based on a constant current-constant voltage method, and a second current pulse is applied before starting charging with the constant voltage after completing charging with a constant current.

2. The charging device according to claim 1, wherein charging is configured to be performed without interruption.

3. The charging device according to claim 1, wherein $1<i_1/i_0 \leq 10$ is satisfied.

4. The charging device according to claim 1, wherein a time during which the first current pulse is applied is 0.01 seconds or more and 10 seconds or less.

5. The charging device according to claim 1, wherein the number of times of application of the first current pulse is one.

6. The charging device according to claim 1, wherein, an impedance of the lithium-ion secondary battery and a charging end set current value when ending charging with the constant voltage after applying the first current pulse are $Z_A$ and $I_{comp-A}$, an impedance of the lithium-ion secondary battery and a charging end set current value when ending charging with the constant voltage in a case where no first current pulse is applied are $Z_B$ and $I_{comp-B}$, and wherein $I_{comp-A}=(Z_B/Z_A) \times I_{comp-B}$ is satisfied.

7. The charging device according to claim 1, wherein, a charging end set current value when ending charging with the constant voltage after applying the current pulse is $I_{comp-A}$, a charging end set current value when ending charging with the constant voltage in a case where no first current pulse is applied is $I_{comp-B}$, and wherein $I_{comp-B}<I_{comp-A} \leq 5 \times I_{comp-B}$ is satisfied.

8. The charging device according to claim 1, wherein, a charging end set time when ending charging with the constant voltage after applying the current pulse is $t_{comp-A}$, a charging end set time when ending charging with the constant voltage in a case where no first current pulse is applied is $t_{comp-B}$, and wherein $0.7 \times t_{comp-B} \leq t_{comp-A} < t_{comp-B}$ is satisfied.

9. The charging device according to claim 1, wherein the lithium-ion secondary battery includes a positive electrode material, wherein a first crystal structure of the positive electrode material in a case that the lithium-ion secondary battery is fully charged is different from a second crystal structure of the positive electrode material in a case that the lithium-ion secondary battery is fully discharged, and wherein a change between the first and second crystal structures of the positive electrode material according to charging and discharging is reversible.

10. The charging device according to claim 1, wherein the positive electrode material of the lithium-ion secondary battery includes $Li_xCoO_2$.

11. A charging device for charging a lithium-ion secondary battery, in which a positive electrode material includes $Li_xCoO_2$, based on at least a constant voltage method, the device comprising:
- an x value calculator configured to calculate a value of x during charging of the lithium-ion secondary battery; and
- a temperature detector configured to measure a temperature of the positive electrode material during charging of the lithium-ion secondary battery,
  wherein a point in time, at which a first current pulse having a peak current value $i_1$ larger than a charge current value $i_0$ immediately before applying the first current pulse is applied at least once, is determined based on the value of x calculated by the x value calculator and a value of the temperature of the positive electrode material measured by the temperature detector.

12. A charging method for charging a lithium-ion secondary battery by the charging device according to claim 11.

13. A charging method for charging a lithium-ion secondary battery based on at least a constant voltage method, the method comprising: before starting charging with a constant voltage or while performing charging with a constant voltage, applying a first current pulse having a peak current value ii larger than a charge current value $i_0$ at least once, wherein
- the lithium-ion secondary battery is charged based on a constant current-constant voltage method, and
- a second current pulse is applied before starting charging with the constant voltage after completing charging with a constant current.

* * * * *